(12) United States Patent
Deckard et al.

(10) Patent No.: US 12,485,981 B2
(45) Date of Patent: Dec. 2, 2025

(54) ELECTRIC RECREATIONAL VEHICLE

(71) Applicant: Polaris Industries Inc., Medina, MN (US)

(72) Inventors: Aaron D. Deckard, Zionsville, IN (US); Dillon B. Schwalbach, St. Paul, MN (US); David F. Buehler, Seedorf (CH); Louis J. Brady, Chisago City, MN (US); Stacey E. Stewart, Stillwater, MN (US); Forrest W. Johnson, Stacy, MN (US); Yassin M. Kelay, Sugiez (CH); Jeff S. Lovold, Roseau, MN (US); Jason C. Plugge, Mahtomedi, MN (US); John B. Pircon, Stacy, MN (US); Markus Hoffet, Aarberg (CH); Wayne M. Kolden, Scandia, MN (US); Aaron Reay, Lindstrom, MN (US); Wangnan Zhong, Forest Lake, MN (US); Colin R. Dickey, Cambridge, MN (US)

(73) Assignee: Polaris Industries Inc., Medina, MN (US)

(*) Notice: Subject to any disclaimer, the term of this patent is extended or adjusted under 35 U.S.C. 154(b) by 892 days.

(21) Appl. No.: 17/702,050

(22) Filed: Mar. 23, 2022

(65) Prior Publication Data
US 2022/0306222 A1    Sep. 29, 2022

Related U.S. Application Data

(60) Provisional application No. 63/232,004, filed on Aug. 11, 2021, provisional application No. 63/165,244, filed on Mar. 24, 2021.

(51) Int. Cl.
*B62D 63/04* (2006.01)
*B60G 3/20* (2006.01)
(Continued)

(52) U.S. Cl.
CPC ............... *B62D 63/04* (2013.01); *B60G 3/20* (2013.01); *B60K 1/00* (2013.01); *B60K 17/22* (2013.01);
(Continued)

(58) Field of Classification Search
CPC .... B62D 63/04; B62D 21/183; B62D 25/168; B62D 33/02; B60L 50/60; B60L 2200/22;
(Continued)

(56) References Cited

U.S. PATENT DOCUMENTS

| | | | |
|---|---|---|---|
| 1,138,122 | A | 5/1915 | Lambert et al. |
| 1,551,594 | A | 9/1925 | Walter |

(Continued)

FOREIGN PATENT DOCUMENTS

| | | | |
|---|---|---|---|
| CA | 2569129 A1 | 6/2007 | |
| CA | 3130333 A1 | 4/2022 | |

(Continued)

OTHER PUBLICATIONS

Trombetta Tympanium, "Bear DC Contractor Specifications," 2003, 2 pages, available at www.trombetta.com.

(Continued)

*Primary Examiner* — Jason D Shanske
*Assistant Examiner* — Matthew James O'Neill
(74) *Attorney, Agent, or Firm* — MERCHANT & GOULD P.C.

(57) ABSTRACT

A electric vehicle including a plurality of ground engaging members, a frame assembly supported by the plurality of ground engaging members, the frame assembly including a front frame assembly, a middle frame assembly, and a rear frame assembly, a seating area supported by the middle frame assembly, electric powertrain components supported (Continued)

by the frame assembly to provide power to at least one ground engaging member, and a shrouding assembly.

19 Claims, 58 Drawing Sheets

(51) Int. Cl.
| | |
|---|---|
| *B60K 1/00* | (2006.01) |
| *B60K 17/22* | (2006.01) |
| *B60L 50/60* | (2019.01) |
| *B60Q 1/18* | (2006.01) |
| *B60R 21/13* | (2006.01) |
| *B62D 21/18* | (2006.01) |
| *B62D 25/16* | (2006.01) |
| *B62D 33/02* | (2006.01) |

(52) U.S. Cl.
CPC ............... *B60L 50/60* (2019.02); *B60Q 1/18* (2013.01); *B60R 21/13* (2013.01); *B62D 21/183* (2013.01); *B62D 25/168* (2013.01); *B62D 33/02* (2013.01); *B60K 2001/006* (2013.01); *B60L 2200/22* (2013.01)

(58) Field of Classification Search
CPC . B60G 3/20; B60K 1/00; B60K 17/22; B60K 2001/006; B60Q 1/18; B60R 21/13
See application file for complete search history.

(56) References Cited

U.S. PATENT DOCUMENTS

| | | | |
|---|---|---|---|
| 1,989,585 A | 1/1935 | Bigelow | |
| 2,508,686 A | 5/1950 | Rice | |
| 2,623,612 A | 12/1952 | Scheiterlein | |
| 2,678,231 A | 5/1954 | Barenyi | |
| 3,294,190 A | 12/1966 | Tosun et al. | |
| 3,523,592 A | 8/1970 | Fenton | |
| 3,616,872 A | 11/1971 | Taylor | |
| 3,694,661 A | 9/1972 | Minowa | |
| 3,708,028 A | 1/1973 | Hafer | |
| 3,732,671 A | 5/1973 | Allen et al. | |
| 3,874,472 A | 4/1975 | Deane | |
| 4,010,725 A | 3/1977 | White | |
| 4,022,272 A | 5/1977 | Miller | |
| 4,042,054 A | 8/1977 | Ward | |
| 4,150,655 A | 4/1979 | Forlai et al. | |
| 4,217,970 A | 8/1980 | Chika | |
| 4,254,843 A | 3/1981 | Han et al. | |
| 4,267,895 A | 5/1981 | Eggert, Jr. | |
| 4,337,406 A | 6/1982 | Binder | |
| 4,388,583 A | 6/1983 | Krueger | |
| 4,404,936 A | 9/1983 | Tatebe et al. | |
| 4,405,028 A | 9/1983 | Price | |
| 4,405,029 A | 9/1983 | Hunt | |
| 4,433,744 A * | 2/1984 | Muhlbacher | B60K 1/00 180/312 |
| 4,434,934 A | 3/1984 | Moser et al. | |
| 4,470,389 A | 9/1984 | Mitadera et al. | |
| 4,602,694 A | 7/1986 | Weldin | |
| 4,638,172 A | 1/1987 | Williams | |
| 4,685,430 A | 8/1987 | Ap | |
| 4,688,529 A | 8/1987 | Mitadera et al. | |
| 4,697,660 A | 10/1987 | Wu et al. | |
| 4,779,905 A | 10/1988 | Ito et al. | |
| 4,898,261 A | 2/1990 | Winberg et al. | |
| 5,018,490 A | 5/1991 | Martin | |
| 5,036,939 A | 8/1991 | Johnson et al. | |
| 5,148,883 A | 9/1992 | Tanaka et al. | |
| 5,212,431 A | 5/1993 | Origuchi et al. | |
| 5,251,588 A | 10/1993 | Tsujii et al. | |
| 5,251,721 A | 10/1993 | Ortenheim | |
| 5,255,733 A | 10/1993 | King | |
| 5,264,764 A | 11/1993 | Kuang | |
| 5,287,772 A | 2/1994 | Aoki et al. | |
| 5,313,191 A | 5/1994 | Yamashita et al. | |
| 5,318,355 A | 6/1994 | Asanuma et al. | |
| 5,341,280 A | 8/1994 | Divan et al. | |
| 5,359,247 A | 10/1994 | Baldwin et al. | |
| 5,377,791 A | 1/1995 | Kawashima et al. | |
| 5,382,833 A | 1/1995 | Wirges | |
| 5,401,056 A | 3/1995 | Eastman | |
| 5,407,130 A | 4/1995 | Uyeki et al. | |
| 5,408,965 A | 4/1995 | Fulton et al. | |
| 5,422,822 A | 6/1995 | Toyota et al. | |
| 5,460,234 A | 10/1995 | Matsuura et al. | |
| 5,489,003 A | 2/1996 | Ohyama et al. | |
| 5,528,148 A | 6/1996 | Rogers | |
| 5,546,901 A | 8/1996 | Acker et al. | |
| 5,549,153 A | 8/1996 | Baruschke et al. | |
| 5,550,445 A | 8/1996 | Nii | |
| 5,558,057 A | 9/1996 | Everts | |
| 5,561,359 A | 10/1996 | Matsuura et al. | |
| 5,583,418 A | 12/1996 | Honda et al. | |
| 5,583,751 A | 12/1996 | Nakazawa et al. | |
| 5,586,613 A | 12/1996 | Ehsani | |
| 5,614,809 A | 3/1997 | Kiuchi et al. | |
| 5,621,304 A | 4/1997 | Kiuchi et al. | |
| 5,625,558 A | 4/1997 | Togai et al. | |
| 5,644,202 A | 7/1997 | Toriyama et al. | |
| 5,647,534 A | 7/1997 | Kelz et al. | |
| 5,673,668 A | 10/1997 | Pallett et al. | |
| 5,690,186 A | 11/1997 | Sugioka et al. | |
| 5,738,062 A | 4/1998 | Everts et al. | |
| 5,788,597 A | 8/1998 | Boll et al. | |
| 5,804,935 A | 9/1998 | Radev | |
| 5,828,192 A | 10/1998 | Kawaguchi et al. | |
| 5,842,534 A | 12/1998 | Frank | |
| 5,860,403 A | 1/1999 | Hirano et al. | |
| 5,867,009 A | 2/1999 | Kiuchi et al. | |
| 5,883,496 A | 3/1999 | Esaki et al. | |
| 5,934,397 A | 8/1999 | Schaper | |
| 5,947,075 A | 9/1999 | Ryu et al. | |
| 5,950,590 A | 9/1999 | Everts et al. | |
| 5,960,764 A | 10/1999 | Araki | |
| 5,960,901 A | 10/1999 | Hanagan | |
| 5,971,290 A | 10/1999 | Echigoya et al. | |
| 6,019,183 A | 2/2000 | Shimasaki et al. | |
| 6,030,316 A | 2/2000 | Kadota | |
| 6,041,877 A | 3/2000 | Yamada et al. | |
| 6,047,678 A | 4/2000 | Kurihara et al. | |
| 6,107,779 A | 8/2000 | Hara et al. | |
| 6,114,784 A | 9/2000 | Nakano | |
| 6,119,636 A | 9/2000 | Fan | |
| 6,152,098 A | 11/2000 | Becker et al. | |
| 6,178,947 B1 | 1/2001 | Machida et al. | |
| 6,184,603 B1 | 2/2001 | Hamai et al. | |
| 6,196,168 B1 | 3/2001 | Eckerskorn et al. | |
| 6,198,183 B1 | 3/2001 | Baeumel et al. | |
| 6,209,518 B1 | 4/2001 | Machida et al. | |
| 6,213,079 B1 | 4/2001 | Watanabe | |
| 6,213,081 B1 | 4/2001 | Ryu et al. | |
| 6,216,660 B1 | 4/2001 | Ryu et al. | |
| 6,217,758 B1 | 4/2001 | Lee | |
| 6,227,160 B1 | 5/2001 | Kurihara et al. | |
| 6,276,331 B1 | 8/2001 | Machida et al. | |
| 6,328,004 B1 | 12/2001 | Rynhart | |
| 6,332,504 B1 | 12/2001 | Adds | |
| 6,333,620 B1 | 12/2001 | Schmitz et al. | |
| 6,334,364 B1 | 1/2002 | Suzuki | |
| 6,353,786 B1 | 3/2002 | Yamada et al. | |
| 6,359,344 B1 | 3/2002 | Klein et al. | |
| 6,360,149 B1 | 3/2002 | Kwon et al. | |
| 6,362,602 B1 | 3/2002 | Kozarekar | |
| 6,394,061 B2 | 5/2002 | Ryu et al. | |
| 6,397,795 B2 | 6/2002 | Hare | |
| 6,427,797 B1 | 8/2002 | Chang | |
| 6,504,259 B1 | 1/2003 | Kuroda et al. | |
| 6,510,829 B2 | 1/2003 | Ito et al. | |
| 6,513,492 B1 | 2/2003 | Bauerle et al. | |
| 6,520,133 B1 | 2/2003 | Wenger et al. | |
| RE38,012 E | 3/2003 | Ochab et al. | |
| 6,528,918 B2 | 3/2003 | Paulus-Neues et al. | |

(56) References Cited

U.S. PATENT DOCUMENTS

| | | |
|---|---|---|
| 6,557,515 B2 | 5/2003 | Furuya et al. |
| 6,561,315 B2 | 5/2003 | Furuya et al. |
| 6,568,494 B2 | 5/2003 | Takahashi |
| 6,591,896 B1 | 7/2003 | Hansen |
| 6,622,804 B2 | 9/2003 | Schmitz et al. |
| 6,640,766 B2 | 11/2003 | Furuya et al. |
| 6,661,108 B1 | 12/2003 | Yamada et al. |
| 6,675,562 B2 | 1/2004 | Lawrence |
| 6,702,052 B1 | 3/2004 | Wakashiro et al. |
| 6,769,391 B1 | 8/2004 | Lee et al. |
| 6,777,846 B2 | 8/2004 | Feldner et al. |
| 6,786,187 B2 | 9/2004 | Nagai et al. |
| 6,809,429 B1 | 10/2004 | Frank |
| 6,810,977 B2 | 11/2004 | Suzuki |
| 6,820,583 B2 | 11/2004 | Maier |
| 6,822,353 B2 | 11/2004 | Koga et al. |
| 6,825,573 B2 | 11/2004 | Suzuki et al. |
| 6,837,325 B2 | 1/2005 | Shimizu |
| 6,886,531 B1 | 5/2005 | Kawakami et al. |
| 6,909,200 B2 | 6/2005 | Bouchon |
| 6,915,770 B2 | 7/2005 | Lu |
| 6,923,282 B2 | 8/2005 | Chernoff et al. |
| 6,930,405 B2 | 8/2005 | Gunji |
| 6,935,297 B2 | 8/2005 | Honda et al. |
| 6,954,045 B2 | 10/2005 | Nishikawa et al. |
| 6,966,803 B2 | 11/2005 | Hara et al. |
| 7,004,134 B2 | 2/2006 | Higuchi |
| 7,017,542 B2 | 3/2006 | Wilton et al. |
| 7,036,616 B1 | 5/2006 | Kejha |
| 7,055,454 B1 | 6/2006 | Whiting et al. |
| 7,073,482 B2 | 7/2006 | Kirchberger |
| 7,073,613 B2 | 7/2006 | Wakitani et al. |
| 7,100,562 B2 | 9/2006 | Terada et al. |
| 7,104,242 B2 | 9/2006 | Nishi et al. |
| 7,108,091 B2 | 9/2006 | Guidry et al. |
| 7,114,585 B2 | 10/2006 | Man et al. |
| 7,134,517 B1 | 11/2006 | Kaiser et al. |
| 7,140,640 B2 | 11/2006 | Tronville et al. |
| 7,165,522 B2 | 1/2007 | Malek et al. |
| 7,204,219 B2 | 4/2007 | Sakurai |
| 7,208,847 B2 | 4/2007 | Taniguchi |
| 7,210,550 B2 | 5/2007 | Yonehana et al. |
| 7,216,943 B2 | 5/2007 | Nishikawa et al. |
| 7,224,132 B2 | 5/2007 | Cho et al. |
| 7,237,512 B2 | 7/2007 | Washita et al. |
| 7,243,632 B2 | 7/2007 | Hu |
| 7,249,644 B2 | 7/2007 | Honda et al. |
| 7,258,183 B2 | 8/2007 | Leonardi et al. |
| 7,261,172 B2 | 8/2007 | Tsukada et al. |
| 7,264,073 B2 | 9/2007 | Nakagawa et al. |
| D552,509 S | 10/2007 | Walkup et al. |
| 7,287,508 B2 | 10/2007 | Kurihara |
| 7,325,526 B2 | 2/2008 | Kawamoto |
| 7,325,866 B2 | 2/2008 | Horton et al. |
| 7,380,621 B2 | 6/2008 | Yoshida |
| 7,389,837 B2 | 6/2008 | Tamai et al. |
| 7,395,804 B2 | 7/2008 | Takemoto et al. |
| 7,404,462 B2 | 7/2008 | Tokumura et al. |
| 7,412,310 B2 | 8/2008 | Brigham et al. |
| 7,441,615 B2 | 10/2008 | Borroni-Bird et al. |
| 7,441,809 B1 | 10/2008 | Coombs et al. |
| 7,449,793 B2 | 11/2008 | Cho et al. |
| 7,451,808 B2 | 11/2008 | Busse et al. |
| 7,455,134 B2 | 11/2008 | Severinsky et al. |
| 7,472,766 B2 | 1/2009 | Yamamoto et al. |
| 7,484,582 B2 | 2/2009 | Iwashita et al. |
| 7,497,285 B1 | 3/2009 | Radev |
| 7,497,288 B2 | 3/2009 | Tsukada et al. |
| 7,537,070 B2 | 5/2009 | Maslov et al. |
| 7,560,882 B2 | 7/2009 | Clark et al. |
| 7,667,342 B2 | 2/2010 | Matsumoto et al. |
| D615,905 S | 5/2010 | Arnell |
| 7,715,968 B2 | 5/2010 | Mori |
| 7,740,092 B2 | 6/2010 | Bender |
| 7,747,363 B1 | 6/2010 | Tang |
| D619,931 S | 7/2010 | Arnell |
| D620,393 S | 7/2010 | Arnell |
| D621,423 S | 8/2010 | Nakanishi et al. |
| 7,769,505 B2 | 8/2010 | Rask et al. |
| 7,775,311 B1 | 8/2010 | Hardy et al. |
| 7,821,224 B2 | 10/2010 | Baglino et al. |
| D626,453 S | 11/2010 | Arnell |
| 7,832,513 B2 | 11/2010 | Verbrugge et al. |
| 7,834,528 B2 | 11/2010 | Numajiri et al. |
| 7,834,582 B2 | 11/2010 | Luan et al. |
| 7,849,945 B2 | 12/2010 | Ross et al. |
| 7,884,574 B2 | 2/2011 | Fukumura et al. |
| 7,905,540 B2 | 3/2011 | Kiley et al. |
| 7,913,782 B1 | 3/2011 | Foss et al. |
| 7,921,945 B2 | 4/2011 | Harris |
| 7,931,110 B2 | 4/2011 | Nishiura et al. |
| 7,994,745 B2 | 8/2011 | Fujino et al. |
| 8,002,067 B2 | 8/2011 | Nishiura et al. |
| 8,007,401 B2 | 8/2011 | Saito et al. |
| 8,011,461 B2 | 9/2011 | Rodriguez et al. |
| 8,033,954 B2 | 10/2011 | Theobald et al. |
| 8,035,247 B2 | 10/2011 | Ichikawa |
| 8,038,573 B2 | 10/2011 | Kozub et al. |
| 8,039,976 B2 | 10/2011 | Sato et al. |
| 8,042,993 B2 | 10/2011 | Van Maanen |
| 8,047,451 B2 | 11/2011 | McNaughton |
| 8,050,851 B2 | 11/2011 | Aoki et al. |
| 8,074,753 B2 | 12/2011 | Tahara et al. |
| 8,075,436 B2 | 12/2011 | Bachmann |
| 8,167,070 B2 | 5/2012 | Takamura et al. |
| 8,182,393 B2 | 5/2012 | Gillingham et al. |
| 8,215,427 B2 | 7/2012 | Rouaud et al. |
| 8,240,748 B2 | 8/2012 | Chapman |
| 8,256,549 B2 | 9/2012 | Crain et al. |
| 8,269,457 B2 | 9/2012 | Wenger et al. |
| D670,198 S | 11/2012 | Li et al. |
| 8,302,724 B2 | 11/2012 | Gillingham et al. |
| 8,316,977 B2 | 11/2012 | Tsumiyama et al. |
| 8,323,147 B2 | 12/2012 | Wenger et al. |
| 8,353,265 B2 | 1/2013 | Pursifull |
| 8,356,472 B2 | 1/2013 | Hiranuma et al. |
| 8,386,109 B2 | 2/2013 | Nicholls |
| 8,387,594 B2 | 3/2013 | Wenger et al. |
| D679,627 S | 4/2013 | Li et al. |
| 8,449,048 B2 | 5/2013 | Bourqui et al. |
| 8,464,817 B2 | 6/2013 | Usami et al. |
| 8,469,133 B2 | 6/2013 | Kaiser et al. |
| 8,480,538 B2 | 7/2013 | Gillingham et al. |
| 8,496,079 B2 | 7/2013 | Wenger et al. |
| 8,496,268 B2 | 7/2013 | Theodore |
| D689,396 S | 9/2013 | Wang |
| 8,547,218 B2 | 10/2013 | Tamaki et al. |
| 8,555,851 B2 | 10/2013 | Wenger et al. |
| 8,567,541 B2 | 10/2013 | Wenger et al. |
| 8,583,302 B2 | 11/2013 | Akimoto et al. |
| D694,668 S | 12/2013 | Li et al. |
| 8,641,133 B1 | 2/2014 | Scaringe et al. |
| 8,657,058 B2 | 2/2014 | Takagi |
| 8,662,239 B2 | 3/2014 | Takagi |
| 8,668,033 B2 | 3/2014 | Koike et al. |
| 8,701,801 B2 | 4/2014 | Itou et al. |
| 8,714,289 B2 | 5/2014 | Olsen et al. |
| 8,783,396 B2 | 7/2014 | Bowman |
| 8,789,634 B2 | 7/2014 | Nitawaki |
| D713,297 S | 9/2014 | Bose et al. |
| D716,186 S | 10/2014 | Tada |
| 8,862,414 B2 | 10/2014 | Leport et al. |
| 8,957,618 B2 | 2/2015 | Tadano et al. |
| D724,997 S | 3/2015 | Brew et al. |
| 8,968,949 B2 | 3/2015 | Hermann et al. |
| 9,004,535 B2 | 4/2015 | Wu |
| 9,033,083 B2 | 5/2015 | Kashiwagi |
| 9,045,014 B1 | 6/2015 | Verhoff et al. |
| 9,045,163 B2 | 6/2015 | Theodore |
| 9,057,317 B2 | 6/2015 | Vuk et al. |
| 9,096,133 B2 | 8/2015 | Kohler et al. |
| 9,162,558 B2 | 10/2015 | Stenberg et al. |
| 9,180,771 B2 | 11/2015 | Yukishima et al. |
| 9,187,083 B2 | 11/2015 | Wenger et al. |

(56) References Cited

U.S. PATENT DOCUMENTS

| | | |
|---|---|---|
| 9,216,637 B2 | 12/2015 | Crain et al. |
| 9,272,636 B2 | 3/2016 | Ichikawa |
| 9,287,595 B2 | 3/2016 | Fujii et al. |
| 9,302,578 B2 | 4/2016 | Suzuki et al. |
| 9,327,586 B2 | 5/2016 | Miyashiro |
| 9,346,421 B2 | 5/2016 | Miyashiro |
| 9,373,828 B2 | 6/2016 | Kawatani et al. |
| 9,421,872 B2 | 8/2016 | Tsuji et al. |
| 9,446,659 B1 | 9/2016 | Blain et al. |
| 9,457,668 B2 | 10/2016 | Matsuda |
| 9,500,273 B2 | 11/2016 | Suzuki et al. |
| 9,527,378 B2 | 12/2016 | Nozaki et al. |
| 9,533,570 B2 | 1/2017 | Matsuda et al. |
| 9,545,968 B2 | 1/2017 | Miyashiro et al. |
| 9,561,735 B2 | 2/2017 | Nozaki |
| 9,579,983 B2 | 2/2017 | Inoue |
| D786,133 S | 5/2017 | Song et al. |
| 9,649,923 B2 | 5/2017 | Perlo et al. |
| 9,656,640 B1 | 5/2017 | Verhoff et al. |
| 9,660,236 B2 | 5/2017 | Kondo et al. |
| 9,694,665 B2 | 7/2017 | Matsuda |
| 9,694,713 B2 | 7/2017 | Kawai |
| 9,783,203 B2 | 10/2017 | Koike et al. |
| 9,802,605 B2 | 10/2017 | Wenger et al. |
| 9,981,544 B2 | 5/2018 | Ito et al. |
| 9,994,122 B2 | 6/2018 | Nakayama |
| 10,023,039 B2 | 7/2018 | Takaki et al. |
| 10,029,571 B2 | 7/2018 | Ito et al. |
| 10,046,667 B2 | 8/2018 | Orimo |
| 10,096,847 B2 | 10/2018 | Mito et al. |
| 10,112,475 B2 | 10/2018 | Sakai et al. |
| 10,112,675 B2 | 10/2018 | Takenaka et al. |
| 10,131,248 B2 | 11/2018 | Tang |
| 10,270,314 B2 | 4/2019 | Matsuda |
| 10,293,853 B2 | 5/2019 | Koike et al. |
| 10,322,769 B2 | 6/2019 | Tanaka |
| 10,334,777 B2 | 7/2019 | Uemura et al. |
| 10,439,477 B2 | 10/2019 | Pinkley et al. |
| 10,477,759 B2 | 11/2019 | Matsuda et al. |
| 10,603,997 B2 | 3/2020 | Bergstrom et al. |
| 10,611,425 B2 | 4/2020 | Miyashiro et al. |
| 10,696,149 B2 | 6/2020 | Pearce et al. |
| 10,714,735 B2 | 7/2020 | Leport et al. |
| 10,821,854 B2 | 11/2020 | Ito et al. |
| 10,944,137 B2 | 3/2021 | Yamagishi et al. |
| 10,967,903 B2 | 4/2021 | Uemura et al. |
| 10,992,007 B2 | 4/2021 | Kohda |
| 11,021,071 B2 | 6/2021 | Ito et al. |
| 11,034,226 B2 | 6/2021 | Kochi et al. |
| 11,124,074 B2 | 9/2021 | Harvey et al. |
| 11,145,144 B2 | 10/2021 | Manji et al. |
| 11,148,530 B2 | 10/2021 | Sakai |
| 11,180,019 B2 | 11/2021 | Matsushima et al. |
| 11,225,156 B2 | 1/2022 | Miller et al. |
| 11,226,025 B2 | 1/2022 | Yoneda et al. |
| 11,273,716 B2 | 3/2022 | Matsuda et al. |
| 11,351,860 B2 | 6/2022 | Raja et al. |
| 11,396,225 B2 | 7/2022 | Ito et al. |
| 11,407,407 B2 | 8/2022 | Hara et al. |
| 11,415,096 B2 | 8/2022 | Lebreux et al. |
| 11,433,771 B2 | 9/2022 | Matsuda et al. |
| 11,485,212 B2 | 11/2022 | Ito et al. |
| 11,486,420 B2 | 11/2022 | Uemura et al. |
| 11,489,226 B2 | 11/2022 | Yamada |
| 2001/0011051 A1 | 8/2001 | Hattori et al. |
| 2001/0020554 A1 | 9/2001 | Yanase et al. |
| 2001/0039938 A1 | 11/2001 | Machida et al. |
| 2001/0043808 A1 | 11/2001 | Matsunaga et al. |
| 2002/0011100 A1 | 1/2002 | Pursifull |
| 2002/0074177 A1 | 6/2002 | Pasquini et al. |
| 2002/0094908 A1 | 7/2002 | Urasawa et al. |
| 2002/0104704 A1 | 8/2002 | Chang |
| 2002/0162224 A1 | 11/2002 | Gabbianelli et al. |
| 2002/0179354 A1 | 12/2002 | White |
| 2003/0034187 A1 | 2/2003 | Hisada et al. |
| 2003/0040827 A1 | 2/2003 | Chernoff et al. |
| 2003/0070849 A1 | 4/2003 | Whittaker |
| 2003/0104900 A1 | 6/2003 | Takahashi et al. |
| 2003/0144773 A1 | 7/2003 | Sumitomo |
| 2003/0162631 A1 | 8/2003 | Williams |
| 2004/0002808 A1 | 1/2004 | Hashimoto et al. |
| 2004/0031451 A1 | 2/2004 | Atschreiter et al. |
| 2004/0063535 A1 | 4/2004 | Ibaraki |
| 2004/0079569 A1 | 4/2004 | Awakawa |
| 2004/0130224 A1 | 7/2004 | Mogi et al. |
| 2004/0134698 A1 | 7/2004 | Yamamoto et al. |
| 2004/0168455 A1 | 9/2004 | Nakamura |
| 2004/0177827 A1 | 9/2004 | Hoyte et al. |
| 2004/0226761 A1 | 11/2004 | Takenaka et al. |
| 2005/0052080 A1 | 3/2005 | Maslov et al. |
| 2005/0055140 A1 | 3/2005 | Brigham et al. |
| 2005/0056472 A1 | 3/2005 | Smith et al. |
| 2005/0079953 A1 | 4/2005 | Zieles et al. |
| 2005/0115748 A1 | 6/2005 | Lanier |
| 2005/0253433 A1 | 11/2005 | Brown et al. |
| 2005/0279539 A1 | 12/2005 | Chiou et al. |
| 2006/0027618 A1 | 2/2006 | Williams |
| 2006/0033337 A1 | 2/2006 | Kojima et al. |
| 2006/0066106 A1 | 3/2006 | Yang et al. |
| 2006/0073929 A1 | 4/2006 | Porter |
| 2006/0112695 A1 | 6/2006 | Neubauer et al. |
| 2006/0130888 A1 | 6/2006 | Yamaguchi et al. |
| 2006/0162973 A1 | 7/2006 | Harris et al. |
| 2006/0231304 A1 | 10/2006 | Severinsky et al. |
| 2007/0027609 A1 | 2/2007 | Watanabe |
| 2007/0050095 A1 | 3/2007 | Nelson et al. |
| 2007/0080006 A1 | 4/2007 | Yamaguchi |
| 2007/0114080 A1 | 5/2007 | Kaiser et al. |
| 2007/0114081 A1 | 5/2007 | Iwanaka et al. |
| 2007/0144800 A1 | 6/2007 | Stone |
| 2007/0145942 A1 | 6/2007 | Yamamoto et al. |
| 2007/0251742 A1 | 11/2007 | Adams et al. |
| 2007/0259747 A1 | 11/2007 | Thomas et al. |
| 2007/0289792 A1 | 12/2007 | Bataille et al. |
| 2008/0022981 A1 | 1/2008 | Keyaki et al. |
| 2008/0060866 A1 | 3/2008 | Worman |
| 2008/0083392 A1 | 4/2008 | Kurihara et al. |
| 2008/0121443 A1 | 5/2008 | Clark et al. |
| 2008/0157592 A1 | 7/2008 | Bax et al. |
| 2008/0178830 A1 | 7/2008 | Sposato |
| 2008/0184978 A1 | 8/2008 | Sagawa et al. |
| 2008/0185199 A1 | 8/2008 | Kimura et al. |
| 2008/0202483 A1 | 8/2008 | Procknow |
| 2008/0236920 A1 | 10/2008 | Swindell et al. |
| 2008/0257625 A1 | 10/2008 | Stranges |
| 2008/0271937 A1 | 11/2008 | King et al. |
| 2008/0299448 A1 | 12/2008 | Buck et al. |
| 2008/0308334 A1 | 12/2008 | Leonard et al. |
| 2009/0000849 A1 | 1/2009 | Leonard et al. |
| 2009/0014223 A1 | 1/2009 | Jones et al. |
| 2009/0014246 A1 | 1/2009 | Lin |
| 2009/0015023 A1 | 1/2009 | Fleckner |
| 2009/0020348 A1 | 1/2009 | Horii et al. |
| 2009/0038875 A1 | 2/2009 | Michalke et al. |
| 2009/0064642 A1 | 3/2009 | Sato et al. |
| 2009/0065279 A1 | 3/2009 | Bessho et al. |
| 2009/0071737 A1 | 3/2009 | Leonard et al. |
| 2009/0071739 A1 | 3/2009 | Leonard et al. |
| 2009/0079384 A1 | 3/2009 | Harris |
| 2009/0090573 A1 | 4/2009 | Boone |
| 2009/0091101 A1 | 4/2009 | Leonard et al. |
| 2009/0091137 A1 | 4/2009 | Nishida et al. |
| 2009/0121518 A1 | 5/2009 | Leonard et al. |
| 2009/0143929 A1 | 6/2009 | Eberhard et al. |
| 2009/0177345 A1 | 7/2009 | Severinsky et al. |
| 2009/0179509 A1 | 7/2009 | Gerundt et al. |
| 2009/0183938 A1 | 7/2009 | Cover et al. |
| 2009/0236877 A1 | 9/2009 | Peschansky et al. |
| 2009/0256415 A1 | 10/2009 | Bourqui et al. |
| 2009/0301830 A1* | 12/2009 | Kinsman ............... F16F 9/0218 188/289 |
| 2009/0302590 A1 | 12/2009 | Van et al. |
| 2009/0314462 A1 | 12/2009 | Yahia et al. |
| 2010/0012412 A1 | 1/2010 | Deckard et al. |

(56) References Cited

U.S. PATENT DOCUMENTS

| | | |
|---|---|---|
| 2010/0019538 A1 | 1/2010 | Kiley et al. |
| 2010/0019722 A1 | 1/2010 | Sanchez |
| 2010/0060015 A1 | 3/2010 | Buker |
| 2010/0065344 A1 | 3/2010 | Collings, III |
| 2010/0090657 A1 | 4/2010 | Fazakas |
| 2010/0090797 A1 | 4/2010 | Koenig et al. |
| 2010/0096199 A1 | 4/2010 | Raynor |
| 2010/0121512 A1 | 5/2010 | Takahashi et al. |
| 2010/0131134 A1 | 5/2010 | Wallace |
| 2010/0147606 A1 | 6/2010 | Kalenborn et al. |
| 2010/0155170 A1 | 6/2010 | Melvin et al. |
| 2010/0162989 A1 | 7/2010 | Aamand et al. |
| 2010/0211242 A1 | 8/2010 | Kelty et al. |
| 2010/0314182 A1 | 12/2010 | Crain et al. |
| 2010/0314183 A1 | 12/2010 | Olsen et al. |
| 2010/0314184 A1 | 12/2010 | Stenberg et al. |
| 2010/0317484 A1 | 12/2010 | Gillingham et al. |
| 2010/0317485 A1* | 12/2010 | Gillingham ........... B60K 17/356 180/242 |
| 2010/0320959 A1 | 12/2010 | Tomberlin et al. |
| 2011/0036658 A1 | 2/2011 | Cantemir et al. |
| 2011/0048821 A1 | 3/2011 | Dial |
| 2011/0061961 A1 | 3/2011 | Liu et al. |
| 2011/0094225 A1 | 4/2011 | Kistner et al. |
| 2011/0139521 A1 | 6/2011 | Ichikawa |
| 2011/0147106 A1 | 6/2011 | Wenger et al. |
| 2011/0148184 A1 | 6/2011 | Suzuki et al. |
| 2011/0168688 A1 | 7/2011 | Rankin et al. |
| 2011/0174561 A1 | 7/2011 | Bowman |
| 2011/0226539 A1 | 9/2011 | Huss et al. |
| 2011/0289896 A1 | 12/2011 | Sasahara et al. |
| 2012/0037437 A1 | 2/2012 | Fernandez-Mateo |
| 2012/0111528 A1 | 5/2012 | Takeuchi et al. |
| 2012/0116628 A1 | 5/2012 | Clark et al. |
| 2012/0125022 A1 | 5/2012 | Maybury et al. |
| 2012/0209463 A1 | 8/2012 | Gibbs et al. |
| 2012/0226405 A1 | 9/2012 | Gillingham et al. |
| 2012/0247855 A1 | 10/2012 | Mimura et al. |
| 2012/0255799 A1 | 10/2012 | Kohler et al. |
| 2012/0326410 A1 | 12/2012 | West et al. |
| 2013/0006458 A1 | 1/2013 | Bhattarai et al. |
| 2013/0060410 A1 | 3/2013 | Crain et al. |
| 2013/0168168 A1 | 7/2013 | Takagi |
| 2013/0173119 A1 | 7/2013 | Izawa |
| 2013/0240273 A1 | 9/2013 | Langer et al. |
| 2013/0270022 A1 | 10/2013 | Matsuda |
| 2013/0270024 A1 | 10/2013 | Matsuda |
| 2013/0274983 A1 | 10/2013 | Matsuda |
| 2013/0282218 A1 | 10/2013 | Matsuda |
| 2013/0282219 A1 | 10/2013 | Matsuda |
| 2014/0058609 A1 | 2/2014 | Matsuda |
| 2014/0262583 A1 | 9/2014 | Url |
| 2014/0297086 A1 | 10/2014 | Matsuda et al. |
| 2014/0336858 A1 | 11/2014 | Matsushima et al. |
| 2014/0367184 A1 | 12/2014 | Matsuda |
| 2015/0047917 A1 | 2/2015 | Burt et al. |
| 2016/0046193 A1 | 2/2016 | Park |
| 2016/0243950 A1 | 8/2016 | Amari |
| 2016/0288829 A1 | 10/2016 | Ito et al. |
| 2016/0318579 A1 | 11/2016 | Miyashiro |
| 2016/0347159 A1 | 12/2016 | Perlo et al. |
| 2017/0055443 A1 | 3/2017 | Fujii et al. |
| 2018/0287416 A1 | 10/2018 | Saita |
| 2018/0290689 A1 | 10/2018 | Yoshii |
| 2018/0326867 A1 | 11/2018 | Yoneda |
| 2018/0345817 A1 | 12/2018 | Yamamoto et al. |
| 2019/0003477 A1 | 1/2019 | Graves et al. |
| 2019/0176884 A1 | 6/2019 | Manji et al. |
| 2019/0185077 A1 | 6/2019 | Smith et al. |
| 2019/0232802 A1 | 8/2019 | Chen |
| 2019/0391589 A1 | 12/2019 | Komorida et al. |
| 2020/0075907 A1 | 3/2020 | Shimazaki et al. |
| 2020/0086741 A1 | 3/2020 | Sadakiyo et al. |
| 2020/0130612 A1 | 4/2020 | Seegert et al. |
| 2020/0204043 A1 | 6/2020 | Matsushima |
| 2020/0231135 A1 | 7/2020 | Ito et al. |
| 2020/0254864 A1 | 8/2020 | Bergstrom et al. |
| 2020/0341468 A1 | 10/2020 | Arima et al. |
| 2021/0129696 A1* | 5/2021 | Westfall ............ H01R 13/6205 |
| 2021/0155228 A1 | 5/2021 | Van et al. |
| 2021/0156705 A1 | 5/2021 | Pietryka et al. |
| 2021/0221254 A1 | 7/2021 | Abe |
| 2021/0237802 A1* | 8/2021 | Chalifour ............... B62D 27/00 |
| 2021/0302995 A1 | 9/2021 | Hashizume et al. |
| 2021/0331554 A1 | 10/2021 | Mancini et al. |
| 2021/0345550 A1 | 11/2021 | Uemura et al. |
| 2022/0009589 A1 | 1/2022 | Matsushita |
| 2022/0017181 A1 | 1/2022 | Suzuki et al. |
| 2022/0033024 A1 | 2/2022 | Okabe et al. |
| 2022/0063764 A1 | 3/2022 | Matsushita |
| 2022/0080818 A1 | 3/2022 | Yamada et al. |
| 2022/0111722 A1 | 4/2022 | Hsu et al. |
| 2022/0111929 A1 | 4/2022 | Matsushita |
| 2022/0185090 A1 | 6/2022 | Matsuoka et al. |
| 2022/0266908 A1 | 8/2022 | Kemp et al. |
| 2022/0340044 A1 | 10/2022 | Roebuck et al. |
| 2022/0355787 A1 | 11/2022 | Bernatchez et al. |
| 2022/0379730 A1 | 12/2022 | Bernatchez |

FOREIGN PATENT DOCUMENTS

| | | |
|---|---|---|
| CN | 1268997 | 10/2000 |
| CN | 1284603 A | 2/2001 |
| CN | 100376775 C | 3/2008 |
| CN | 101348158 A | 1/2009 |
| CN | 201211849 Y | 3/2009 |
| CN | 101445044 A | 6/2009 |
| CN | 101701547 A | 5/2010 |
| CN | 101708694 A | 5/2010 |
| CN | 101878146 A | 11/2010 |
| CN | 102159414 A | 8/2011 |
| CN | 102300734 A | 12/2011 |
| CN | 103107383 A | 5/2013 |
| CN | 103958260 A | 7/2014 |
| CN | 104627293 A | 5/2015 |
| CN | 104627294 A | 5/2015 |
| CN | 105793143 A | 7/2016 |
| CN | 108688454 A | 10/2018 |
| CN | 209150176 U | 7/2019 |
| CN | 110875448 A | 3/2020 |
| CN | 110931669 A | 3/2020 |
| CN | 111106269 A | 5/2020 |
| CN | 212148705 U | 12/2020 |
| CN | 214728163 U | 11/2021 |
| CN | 216750438 U | 6/2022 |
| DE | 3825349 A1 | 2/1989 |
| DE | 4427322 A1 | 2/1996 |
| DE | 4447138 A1 | 12/1997 |
| DE | 19642956 A1 | 4/1998 |
| DE | 19735021 A1 | 2/1999 |
| DE | 102005003077 A1 | 8/2006 |
| DE | 102007024126 A1 | 12/2008 |
| EP | 0511654 A2 | 11/1992 |
| EP | 0856427 A1 | 8/1998 |
| EP | 0898352 A1 | 2/1999 |
| EP | 1077149 A2 | 2/2001 |
| EP | 1205331 A2 | 5/2002 |
| EP | 1318064 A2 | 6/2003 |
| EP | 1382475 A1 | 1/2004 |
| EP | 1433697 A2 | 6/2004 |
| EP | 2145808 A1 | 1/2010 |
| EP | 2441653 A1 | 4/2012 |
| EP | 2643871 A1 | 10/2013 |
| EP | 2660093 A1 | 11/2013 |
| EP | 2660096 A1 | 11/2013 |
| EP | 2660097 A1 | 11/2013 |
| EP | 2660136 A1 | 11/2013 |
| EP | 2662271 A1 | 11/2013 |
| EP | 2542460 B1 | 4/2014 |
| EP | 2767464 A1 | 8/2014 |
| EP | 2772383 A1 | 9/2014 |
| EP | 2772384 A1 | 9/2014 |
| EP | 2799325 A1 | 11/2014 |
| EP | 3536591 A1 | 9/2019 |

(56) References Cited

FOREIGN PATENT DOCUMENTS

| | | | |
|---|---|---|---|
| EP | 3865383 A1 | 8/2021 |
| FR | 2941424 A1 | 7/2010 |
| FR | 2990182 A1 | 11/2013 |
| GB | 2349483 A | 11/2000 |
| GB | 2431704 A | 5/2007 |
| GB | 2454349 A | 5/2009 |
| IN | 201927029775 | 1/2020 |
| IN | 202014024948 | 1/2021 |
| IN | 202017040303 | 1/2021 |
| IN | 202117003877 | 3/2021 |
| IN | 202117033151 | 10/2021 |
| IN | 202117043149 | 12/2021 |
| IN | 202117016735 | 1/2022 |
| IN | 202117054607 | 4/2022 |
| IN | 202117012702 | 8/2022 |
| IN | 202214005888 | 9/2022 |
| JP | 58-126434 | 7/1983 |
| JP | 59-039933 | 3/1984 |
| JP | 60-209616 A | 10/1985 |
| JP | 61-135910 | 6/1986 |
| JP | 2724565 B2 | 3/1998 |
| JP | 2900174 B2 | 6/1999 |
| JP | 2988993 B2 | 12/1999 |
| JP | 2994507 B2 | 12/1999 |
| JP | 2000-102115 A | 4/2000 |
| JP | 3051236 B2 | 6/2000 |
| JP | 3113308 B2 | 11/2000 |
| JP | 2001-116090 A | 4/2001 |
| JP | 2001-119801 A | 4/2001 |
| JP | 2001-119802 A | 4/2001 |
| JP | 3276081 B2 | 4/2002 |
| JP | 3312814 B2 | 8/2002 |
| JP | 3325625 B2 | 9/2002 |
| JP | 2002-325369 A | 11/2002 |
| JP | 2002-362140 A | 12/2002 |
| JP | 2003-134611 A | 5/2003 |
| JP | 2005-130629 A | 5/2005 |
| JP | 2005-139942 A | 6/2005 |
| JP | 2005-299469 A | 10/2005 |
| JP | 2006-056289 A | 3/2006 |
| JP | 2007-064080 A | 3/2007 |
| JP | 2007-278228 A | 10/2007 |
| JP | 4039572 B2 | 1/2008 |
| JP | 2008-029071 A | 2/2008 |
| JP | 4043690 B2 | 2/2008 |
| JP | 2008-067499 A | 3/2008 |
| JP | 4071751 B2 | 4/2008 |
| JP | 2008-136275 A | 6/2008 |
| JP | 2008-301590 A | 12/2008 |
| JP | 4233714 B2 | 3/2009 |
| JP | 2009-173147 A | 8/2009 |
| JP | 2009-220765 A | 10/2009 |
| JP | 4347315 B2 | 10/2009 |
| JP | 2009-281330 A | 12/2009 |
| JP | 4401286 B2 | 1/2010 |
| JP | 2010-064744 A | 3/2010 |
| JP | 2010-269636 A | 12/2010 |
| JP | 2011-045184 A | 3/2011 |
| JP | 4659857 B2 | 3/2011 |
| JP | 2011-088625 A | 5/2011 |
| JP | 2011-110383 A | 6/2011 |
| JP | 2011-120393 A | 6/2011 |
| JP | 4805328 B2 | 11/2011 |
| JP | 2012-046077 A | 3/2012 |
| JP | 4986787 B2 | 7/2012 |
| JP | 2012-209993 A | 10/2012 |
| JP | 5301520 B2 | 9/2013 |
| JP | 2013-247750 A | 12/2013 |
| JP | 5419513 B2 | 2/2014 |
| JP | 5450351 B2 | 3/2014 |
| JP | 5509811 B2 | 6/2014 |
| JP | 2014-155410 A | 8/2014 |
| JP | 2014-195360 A | 10/2014 |
| JP | 2014-210451 A | 11/2014 |
| JP | 5731258 B2 | 6/2015 |
| JP | 5743590 B2 | 7/2015 |
| JP | 5847632 B2 | 1/2016 |
| JP | 5966749 B2 | 8/2016 |
| JP | 2016-155477 A | 9/2016 |
| JP | 2016-196204 A | 11/2016 |
| JP | 2017-034929 A | 2/2017 |
| JP | 2017-190071 A | 10/2017 |
| JP | 2018-166358 A | 10/2018 |
| JP | 2018-174690 A | 11/2018 |
| JP | 2018-202945 A | 12/2018 |
| JP | 2019-035447 A | 3/2019 |
| JP | 2019-037043 A | 3/2019 |
| JP | 2019-072183 A | 5/2019 |
| JP | 2019-073147 A | 5/2019 |
| JP | 2019-106786 A | 6/2019 |
| JP | 6572586 B2 | 9/2019 |
| JP | 2019-168326 A | 10/2019 |
| JP | 2019-187019 A | 10/2019 |
| JP | 6639833 B2 | 2/2020 |
| JP | 2020-048261 A | 3/2020 |
| JP | 2020-048296 A | 3/2020 |
| JP | 2020-074816 A | 5/2020 |
| JP | 2021-046008 A | 3/2021 |
| JP | 2021-049943 A | 4/2021 |
| JP | 2021-114878 A | 8/2021 |
| JP | 6925923 B2 | 8/2021 |
| JP | 2021-132464 A | 9/2021 |
| JP | 2021-154835 A | 10/2021 |
| JP | 6989539 B2 | 1/2022 |
| JP | 7000472 B2 | 1/2022 |
| JP | 2022-028977 A | 2/2022 |
| JP | 7184124 B2 | 12/2022 |
| KR | 10-2008-0028174 A | 3/2008 |
| TW | 200925018 A | 6/2009 |
| TW | M422500 U | 2/2012 |
| TW | I455442 B | 10/2014 |
| TW | I482718 B | 5/2015 |
| TW | M607821 U | 2/2021 |
| WO | 92/05974 A1 | 4/1992 |
| WO | 98/04431 A1 | 2/1998 |
| WO | 00/15455 A2 | 3/2000 |
| WO | 03/70543 A1 | 8/2003 |
| WO | 2004/067361 A1 | 8/2004 |
| WO | 2004/085194 A1 | 10/2004 |
| WO | 2007/148225 A2 | 12/2007 |
| WO | 2008/115463 A1 | 9/2008 |
| WO | 2009/017533 A1 | 2/2009 |
| WO | 2009/059407 A1 | 5/2009 |
| WO | 2010/081979 A1 | 7/2010 |
| WO | 2010/113707 A1 | 10/2010 |
| WO | 2011/145441 A1 | 11/2011 |
| WO | 2012/026196 A1 | 3/2012 |
| WO | 2012/060195 A1 | 5/2012 |
| WO | 2012/070220 A1 | 5/2012 |
| WO | 2012/117204 A1 | 9/2012 |
| WO | 2013/051195 A1 | 4/2013 |
| WO | 2013/095420 A1 | 6/2013 |
| WO | 2014/194409 A1 | 12/2014 |
| WO | 2016/052233 A1 | 4/2016 |
| WO | 2017/204323 A1 | 11/2017 |
| WO | 2019/065310 A1 | 4/2019 |
| WO | 2019/220418 A2 | 11/2019 |
| WO | 2020/066340 A1 | 4/2020 |
| WO | 2021/084520 A2 | 5/2021 |
| WO | 2022/099910 A1 | 5/2022 |
| WO | 2022/137774 A1 | 6/2022 |
| WO | 2022/162159 A1 | 8/2022 |

OTHER PUBLICATIONS

All-Terrain Vehicles Magazine, "Bad Boy Partners with G-Force on Project," Jan. 29, 2009, 2 pages, available at http://www.atvmag.com/article.asp?nid=1324, accessed on Jun. 11, 2010.

DeWALT DCD130, "Instruction Manual Guide D'utilisation Manual de instrucciones," pp. 44.

Heitner, Range extender hybrid vehicle, Intersociety Energy Conversion Engineering Conference Proceedings, vol. 4, pp. 323-338, 1991.

(56) References Cited

OTHER PUBLICATIONS

Photograph of Bad Boy buggies(R All Electric 4WD vehicle, 1 page. Undated.
Photograph of Ruff & Tuff vehicle, 1 page. Undated.
Polaris Ranger, "2020 Owner's Manual," pp. 125.
Research on Generator Set Control of Ranger Extender Pure Electric Vehicles, Fang, et al., Power and Energy Conference (APPEEC), 2010 Asia-Pacific, Mar. 31, 2010; 4 pages.

\* cited by examiner

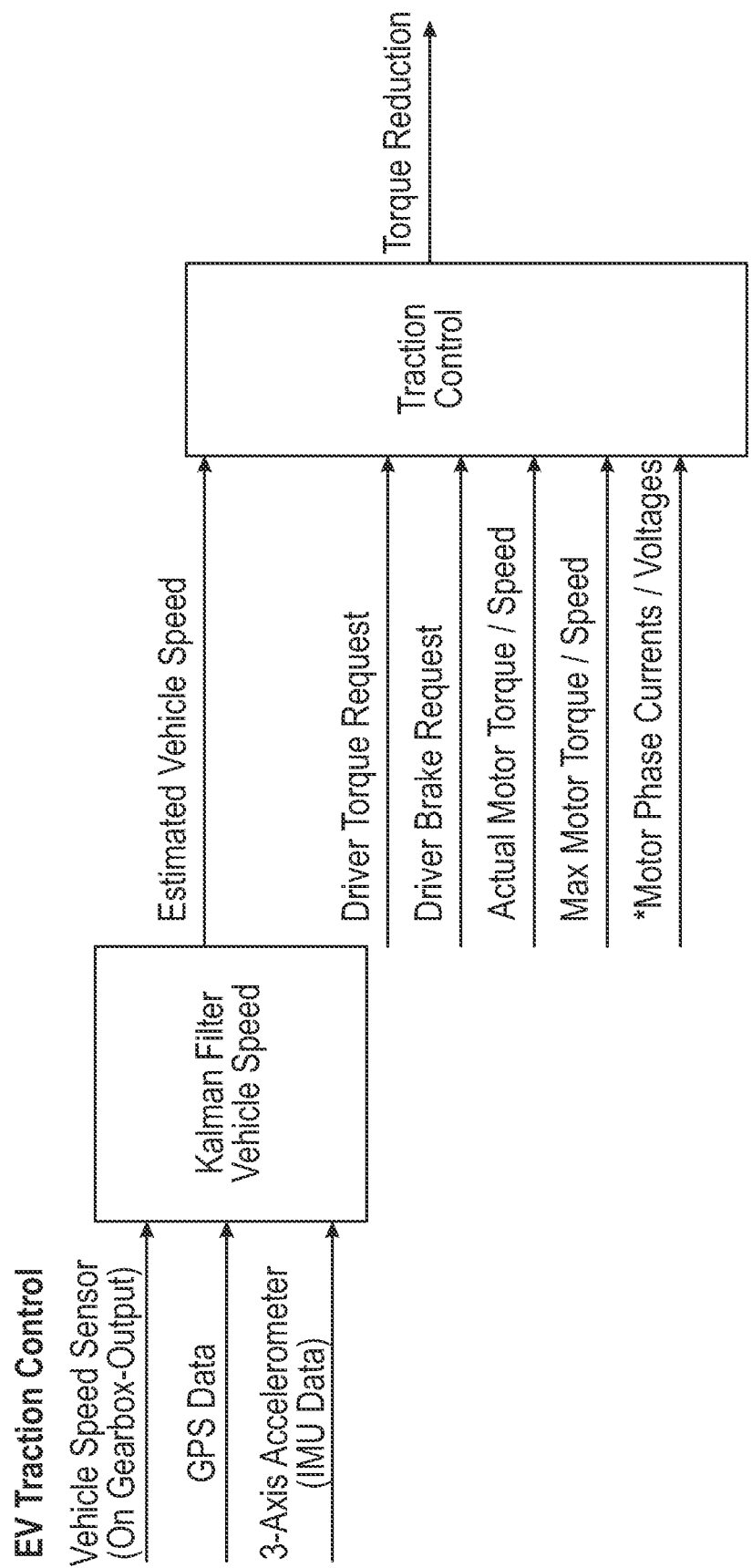

ELECTRIC RECREATIONAL VEHICLE

RELATED APPLICATION

This application is related to U.S. Provisional Application Ser. No. 63/165,244, filed Mar. 24, 2021, titled ELECTRIC VEHICLE WITH SHROUDING ASSEMBLY, and U.S. Provisional Application Ser. No. 63/232,004, filed Aug. 11, 2021, titled ELECTRIC RECREATIONAL VEHICLE, the entire disclosures of which are expressly incorporated by reference herein.

TECHNICAL FIELD

The present disclosure relates generally to a recreational vehicle and more particularly to an electric recreational vehicle.

BACKGROUND

Recreational vehicles, such as all-terrain vehicles (ATVs), utility vehicles (UVs), and side-by-side vehicles, are widely used for recreational purposes. These vehicles may include various types of powertrains, including internal combustion engine-based, electric, and hybrid powertrains.

It is with respect to these and other general considerations that embodiments have been described. Also, although relatively specific problems have been discussed, it should be understood that the embodiments should not be limited to solving the specific problems identified in the background.

SUMMARY

As set forth above, embodiments provided herein relate to vehicle hazardous condition detection for a recreational vehicle. Exemplary embodiments include but are not limited to the following examples.

In an exemplary embodiment of the present disclosure, an electric vehicle having a vehicle maximum lateral width is provided. The electric vehicle comprising: a plurality of ground engaging members; a frame assembly supported by the plurality of ground engaging members, the frame assembly including a front frame assembly, a middle frame assembly, and a rear frame assembly; a seating area supported by the middle frame assembly; a roll cage extending over the seating area; electric powertrain components supported by the frame assembly, the electric powertrain components including an electric motor and a drive train operative to provide power from the electric motor to at least one ground engaging member; and a shrouding assembly coupled to the rear frame assembly, the shrouding assembly having a maximum shrouding lateral width, the maximum shrouding lateral width being less than the vehicle maximum lateral width.

In an example thereof, the shrouding assembly includes a left side shroud portion extending from a lower portion of the rear frame assembly to an upper portion of the rear frame assembly.

In a variation thereof, the electric vehicle further comprises a left rear suspension moveably coupling a first one of the plurality of ground engaging members to the frame, the left suspension including first suspension arm moveably coupled to the frame assembly and a second suspension arm moveably coupled to the frame assembly independent of the first suspension arm, wherein the left side shroud portion is positioned completely forward of a first connection point of the first suspension arm to the frame assembly.

In a further example thereof, the shrouding assembly includes a top shroud portion extending across a longitudinal centerline of the electric vehicle. In a variation thereof, the electric vehicle further comprises a cargo bed supported by the rear frame assembly, the top shroud portion extending under the cargo bed. In a further variation thereof, the top shroud portion is coupled to the rear frame assembly independent of the cargo bed. In yet a further variation, the top shroud portion is connected to the cargo bed.

In another exemplary embodiment thereof, an electric vehicle is provided. The electric vehicle comprising: a plurality of ground engaging members; a frame assembly supported by the plurality of ground engaging members, the frame assembly including a front frame assembly, a middle frame assembly, and a rear frame assembly; a first rear suspension having a first suspension arm moveably coupled to the frame and a second suspension arm moveably coupled to the frame independent of the first suspension arm, the first suspension coupling a first ground engaging member of the plurality of ground engaging members to the frame assembly; a seating area supported by the middle frame assembly; a roll cage extending over the seating area; a cargo box coupled to the frame assembly; electric powertrain components supported by the frame assembly, the electric powertrain components including an electric motor and a drive train operative to provide power from the electric motor to at least one ground engaging member; and a shrouding assembly coupled to the rear frame assembly, the shrouding assembly including a top portion extending across a longitudinal centerline of the electric vehicle and a first side portion extending downward from the top portion.

In an example thereof, the first side portion is completely forward of a first connection of the first suspension arm to the frame assembly.

In a further exemplary embodiment thereof, an electric vehicle is provided. The electric vehicle comprising: a plurality of ground engaging members; a frame assembly supported by the plurality of ground engaging members, the frame assembly including a front frame assembly, a middle frame assembly, and a rear frame assembly; a seating area supported by the middle frame assembly; a cargo bed supported by the rear frame assembly; and an electric powertrain supported by the frame assembly. The electric powertrain including: one or more batteries positioned under the seating area; a unit mounted to the frame assembly through a plurality of mounts. The unit including: at least one frame member; an electric motor electrically coupled to the one or more batteries and coupled to the at least one frame member; a transmission coupled to the at least one frame member; and a flexible endless coupler operatively coupling an output of the electric motor to an input of the transmission. The electric vehicle further comprising a driveshaft operative to provide power from the transmission to at least one ground engaging member.

In an example thereof, the electric motor is carried by a cradle which is rotatably coupled to the at least one frame member.

In a further example thereof, the unit includes at least one tensioner which rotates the electric motor away from the transmission to increase a tension on the flexible endless connector.

In another example thereof, the electric vehicle further comprises a shrouding assembly coupled to the frame assembly. In a variation thereof, the shrouding assembly includes a top shroud member extending across a top of the unit. In a further variation thereof, the top shroud member includes an air conduit formed on a lower side and a fan positioned to move air through the air conduit. In yet a further variation thereof, the top shroud member and the electric motor cooperate to form a second air conduit over a top of the electric motor. In still another variation thereof, air passing through the second air conduit enters the air conduit of the top shroud member. In yet still another variation thereof, the unit further comprises a motor controller operatively coupled to the electric motor and a cooling system to regulate a temperature of the electric motor. In a variation thereof, the cooling system is air cooled. In another variation thereof, the cooling system is liquid cooled. In a further variation thereof, the cooling system includes a radiator positioned rearward of the fan of the top shroud member.

In still another example thereof, the electric vehicle further comprises: a light bar supported by the frame, the light bar including a plurality of individually controllable zones including a first central zone, a second zone having a first second zone section on a first side of the first central zone and a second second zone section on a second side of the first central zone, and a third zone having a first third zone section on the first side of the first central zone and a second third zone section on the second side of the first central zone. The electric vehicle further comprises a lighting controller operatively coupled to each of the first central zone, the second zone, and the third zone of the light bar, the lighting controller controls at least one illumination characteristic of each of the first central zone, the second zone, and the third zone of the light bar to indicate a charging status of the one or more batteries of electric powertrain.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein:

FIG. 53 is a schematic view of a controls assembly of the electric vehicle of FIG. 1 with respect to the flow diagram of FIG. 52;

Figure 1:
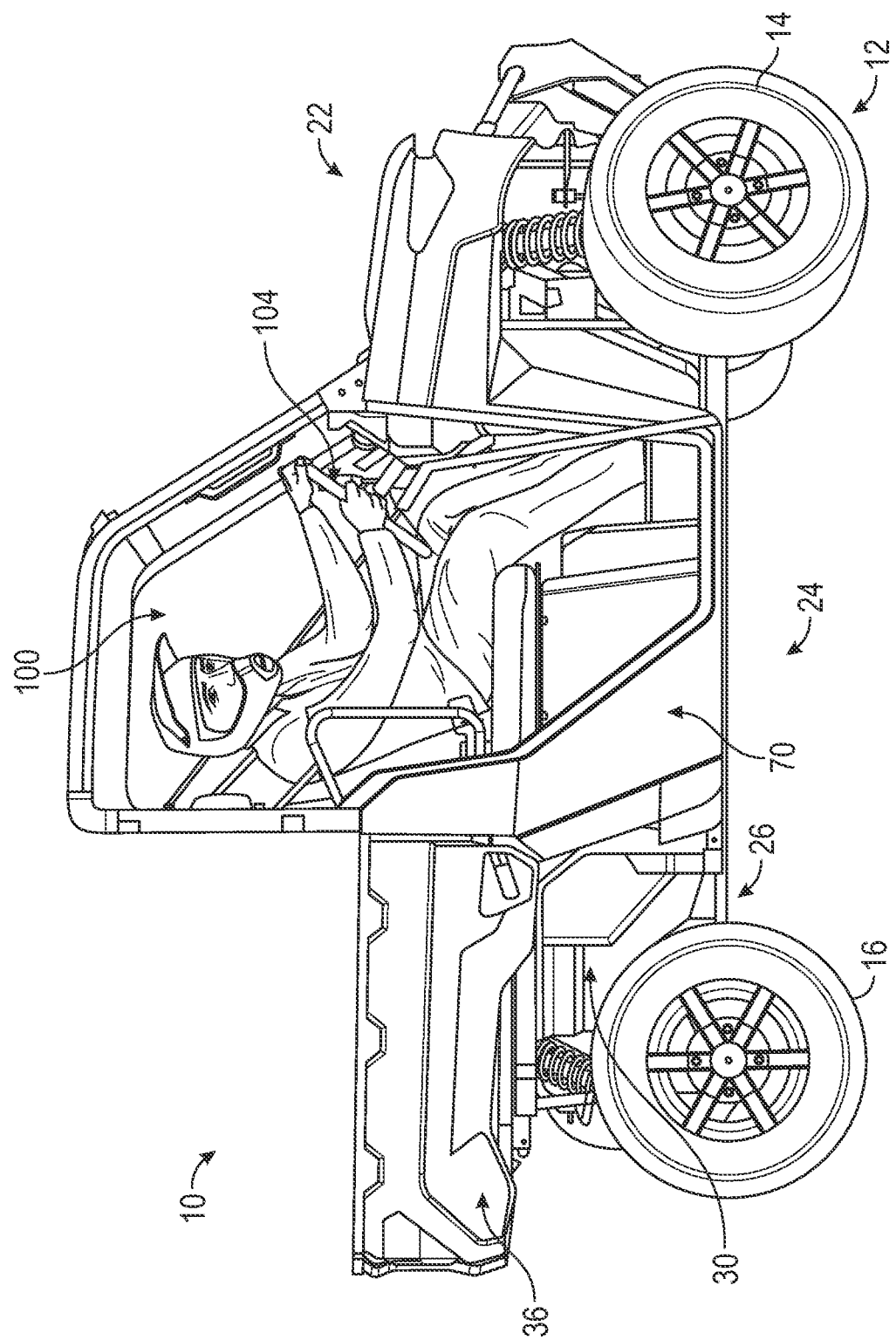
FIG. 1 illustrates a side view of an exemplary recreational vehicle of the present disclosure.

Corresponding reference characters indicate corresponding parts throughout the several views. Although the drawings represent embodiments of the present disclosure, the drawings are not necessarily to scale, and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION OF THE DRAWINGS

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
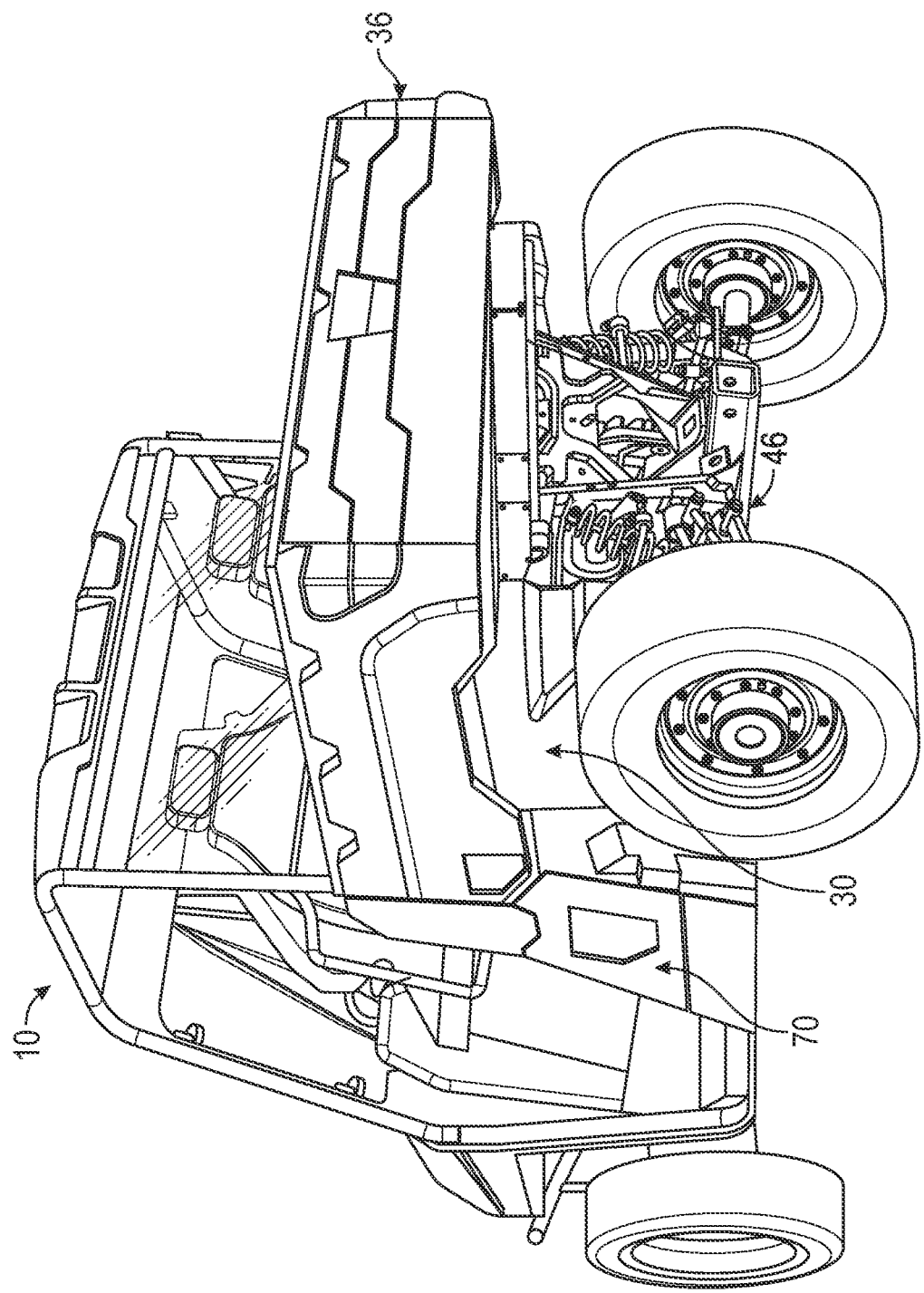
FIG. 2 illustrates a rear left perspective view of the exemplary recreational vehicle of FIG. 1.

Referring to FIGS. 1 and 2, an illustrative embodiment of an exemplary electric vehicle 10 is shown. Electric vehicle 10 is configured for off-road conditions. It should be appreciated that electric vehicle 10 is an exemplary recreational vehicle, particularly a side-by-side off road vehicle. Electric vehicle 10 includes a plurality of ground engaging members 12, illustratively front wheels 14 and rear wheels 16. Exemplary ground engaging members include skis, endless tracks, wheels, and other suitable devices which support the electric vehicle 10 relative to the ground. In one embodiment, one or more of the ground engaging members 12 may be include tracks, such as the Prospector II Tracks available from Polaris Industries Inc., located at 2100 Highway 55 in Medina, MN 55340 such as those shown in U.S. Pat. No. 7,673,711 and U.S. Pat. No. 10,118,477 or non-pneumatic tires, such as those shown in U.S. Pat. No. 8,176,957 and U.S. Pat. No. 8,104,524.

Figure 4:
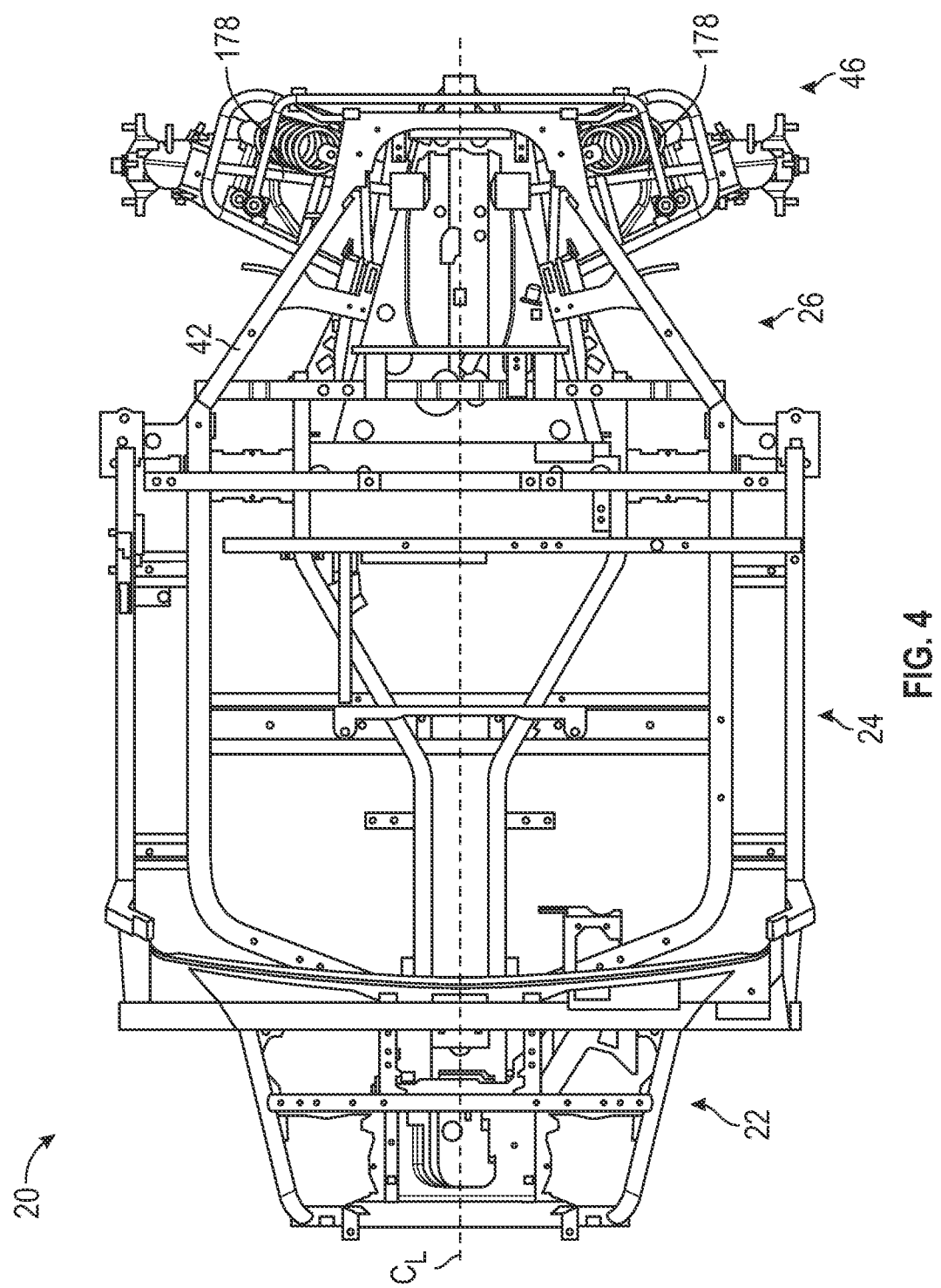
FIG. 4 illustrates a top view of a frame assembly and rear suspension assembly of the exemplary recreational vehicle FIG. 1.
Figure 5:
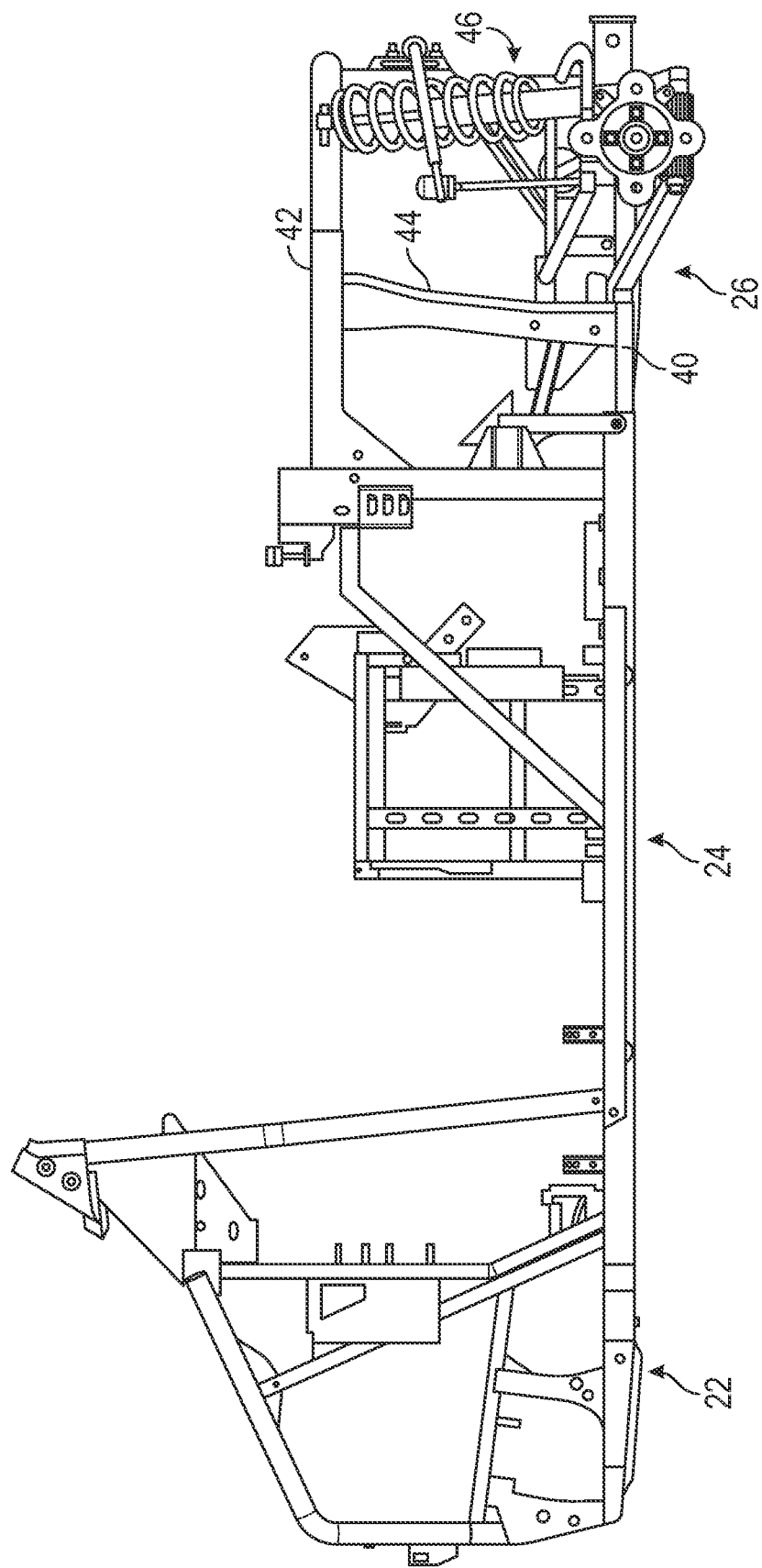
FIG. 5 illustrates a side view of a frame assembly and rear suspension assembly of the exemplary recreational vehicle FIG. 1.
Figure 6:
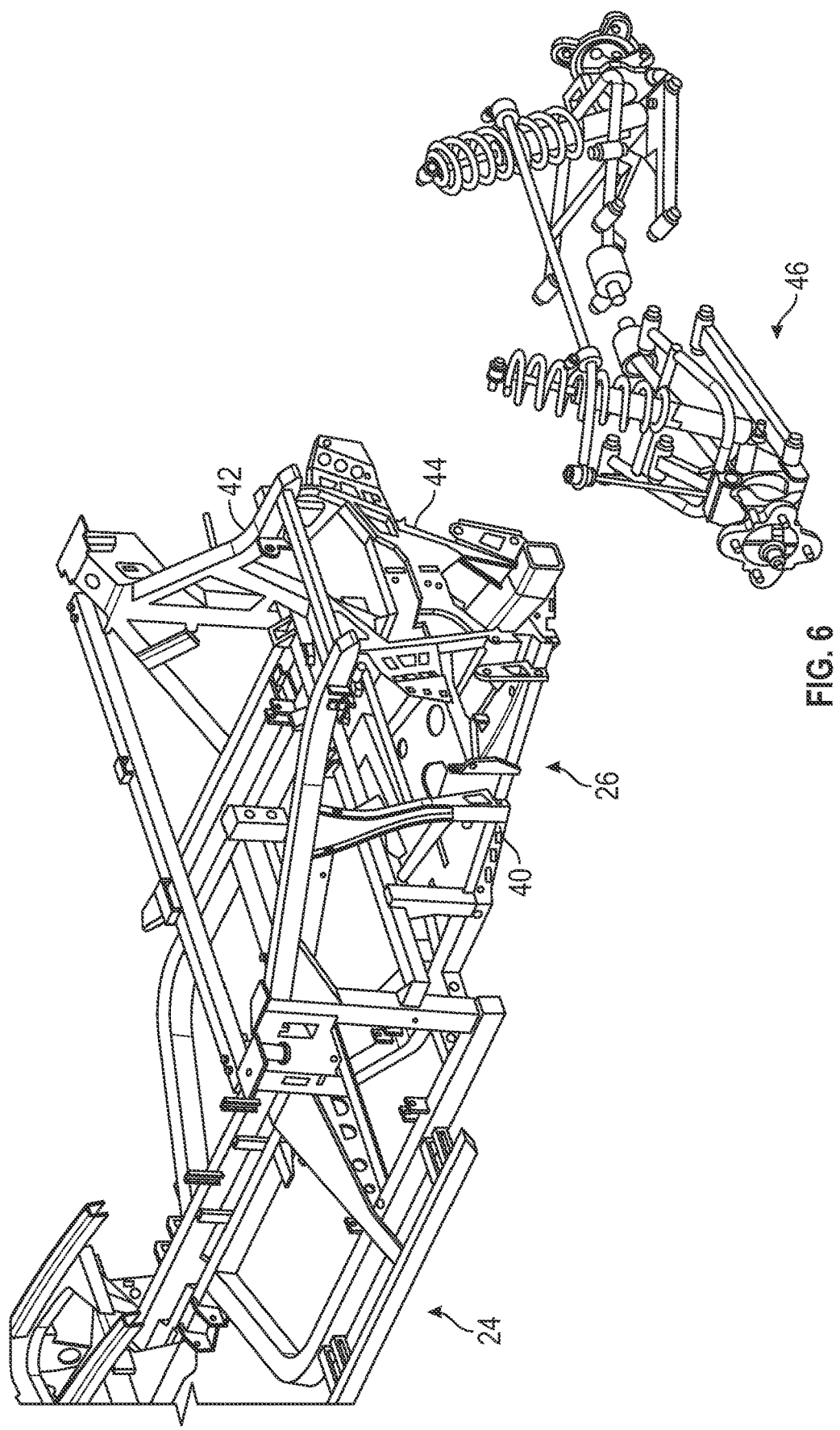
FIG. 6 illustrates a rear left exploded view of a frame assembly and rear suspension assembly of the exemplary recreational vehicle FIG. 1.

Electric vehicle 10 further includes a frame assembly 20 supported above a ground surface by the plurality of ground engaging members 12. The ground surface may be generally level or undulating dirt, grass, concrete, or other surface. Frame assembly 20 extends along a longitudinal centerline $C_L$ (see FIG. 4) of the electric vehicle 10. Frame assembly 20 includes cast portions, sheet metal portions, weldments, tubular components or a combination thereof. Referring to FIG. 4, frame assembly 20 includes a front frame assembly 22, a middle frame assembly 24, and a rear frame assembly 26. Middle frame assembly 24 is positioned between front frame assembly 22 and rear frame assembly 26 and is configured to support, among other components, a plurality of seats. Rear frame assembly 26 extends rearwardly from middle frame assembly 24. Front frame assembly 22 extends forwardly of middle frame assembly 24. Each of front frame assembly 22 and rear frame assembly 26 narrow at their respective ends longitudinally away from middle frame assembly 24.

Figure 7:
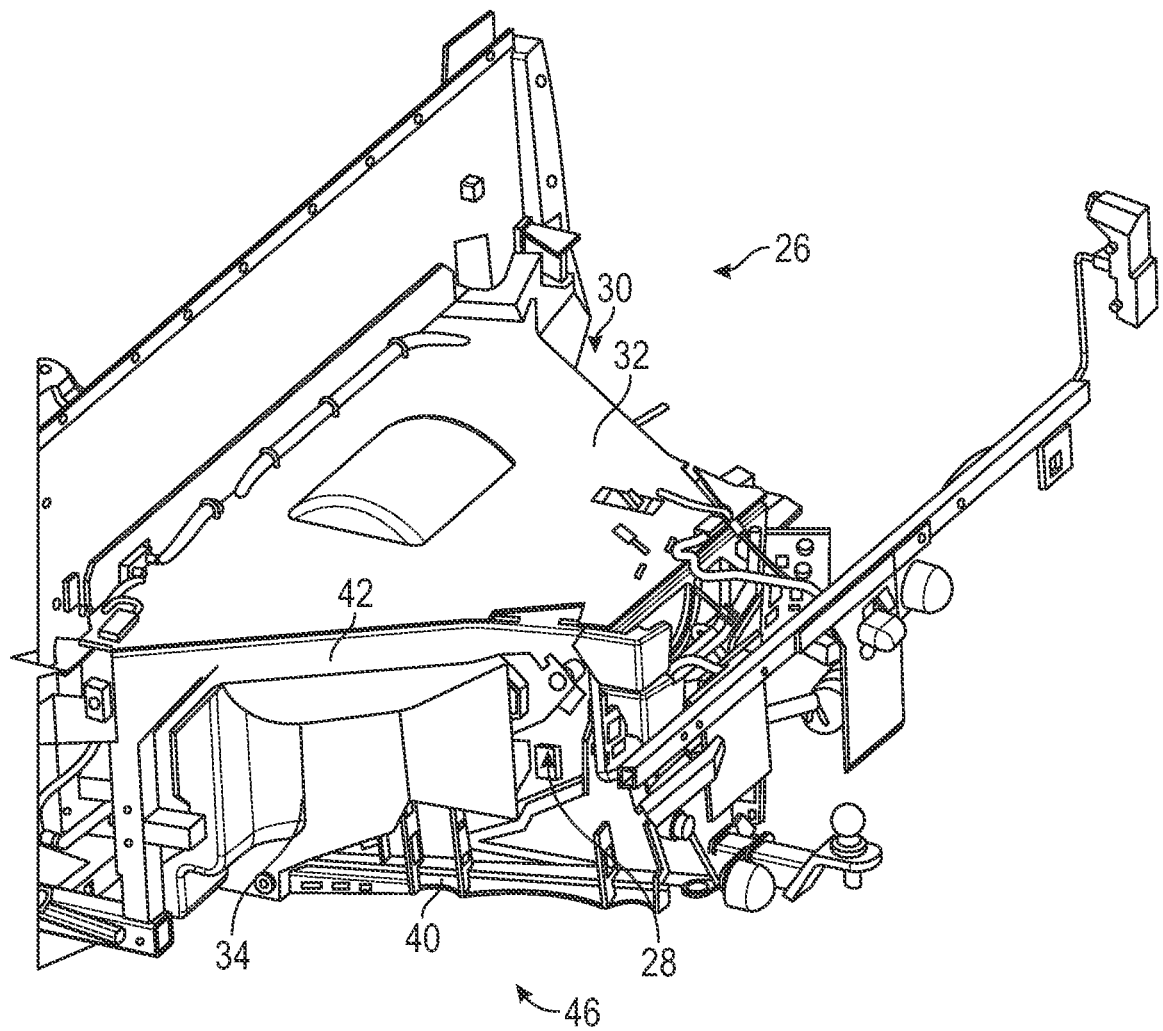
FIGS. 7 and 8 illustrate rear left perspective views of a shrouding assembly of the exemplary recreational vehicle FIG. 1.
Figure 8:
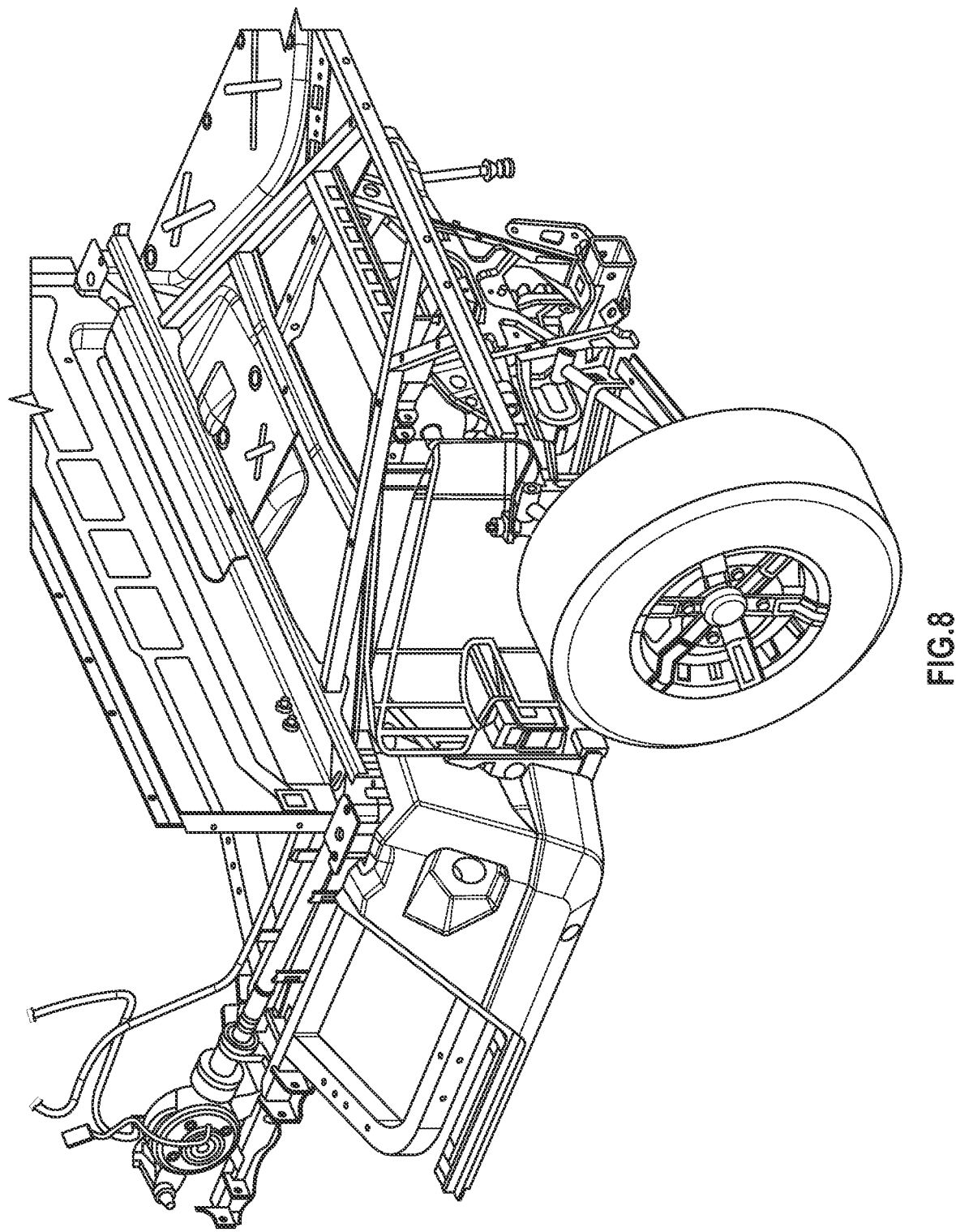

Frame assembly 20 supports electric powertrain components 28 (see FIGS. 7 and 8). Electric powertrain components 28 may include numerous high voltage carrying components including chargers, batteries, electric motors, and/or a drive train that provides power from the electric motor to at least one ground engaging member. An exemplary embodiment and arrangement of electric powertrain components 28 is shown in FIG. 9.

Figure 9:
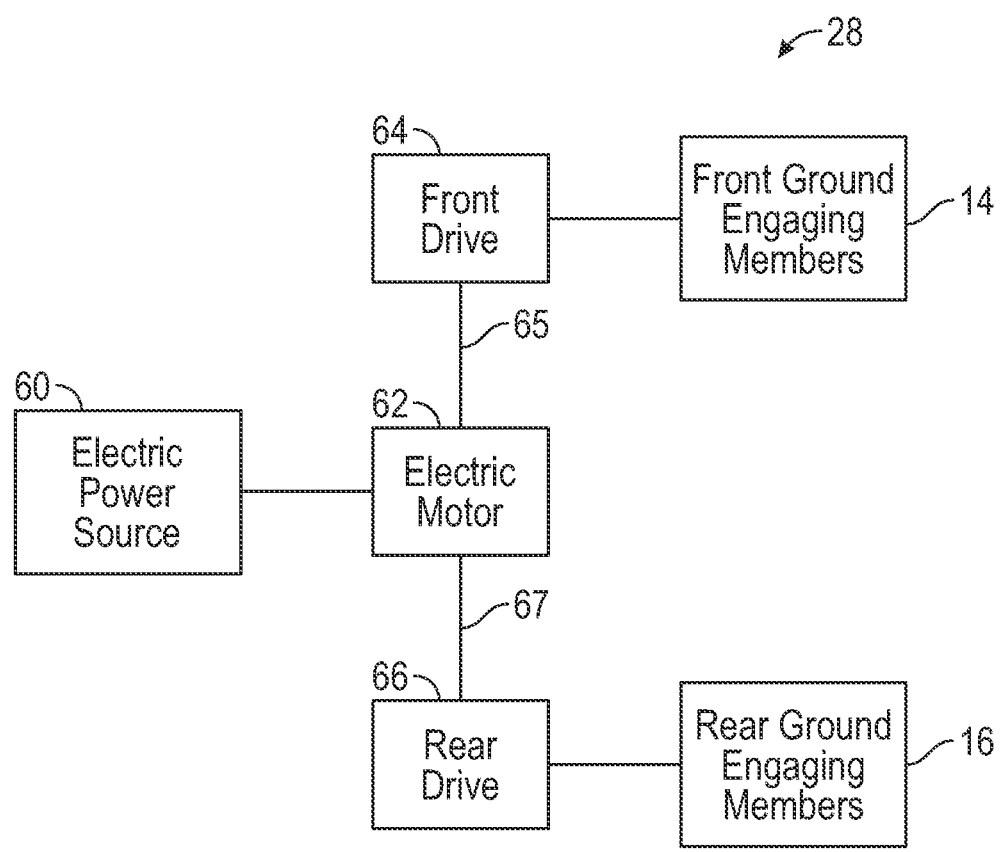
FIG. 9 illustrates a representative view of an electric powertrain of the exemplary recreational vehicle FIG. 1.

Referring to FIG. 9, electric powertrain components 28 includes an electric power source 60 which provides power to an electric motor 62. Electric power source 60 may include one or more batteries or other energy storage systems capable of providing electrical power to electric motor 62. An output shaft of electric motor 62 is operatively coupled to a front drive 64 through drive shaft 65 to power one or more of front wheels 14 and through a drive shaft 67 to a rear drive 66 to power one or more of rear wheels 16. In embodiments, a separate electric motor 62 is provided to power each of front drive 64 and rear drive 66. In embodiments, a separate electric motor 62 is provided to power each of front wheels 14 and rear wheels 16. In embodiments, front drive 64 and rear drive 66 can be operatively coupled together independent of electric motor 62. Thus, one of front drive 64 and rear drive 66 can receive power from electric motor 62 and provide power to the other of front drive 64 and rear drive 66. Further, in embodiments, one or more speed reduction units may be included in the driveline at any point between the electric motor 62 and the front wheels 14 and/or rear wheels 16.

In embodiments, at least a portion of electric powertrain components 28 are shielded from the outside environment with a shrouding assembly 30 coupled to frame assembly 20. In the illustrated embodiments, shrouding assembly 30 is supported by rear frame assembly 26. In embodiments, shrouding assembly 30 is positioned under a cargo box 36 of electric vehicle 10. It should be appreciated that shrouding assembly 30 is separate from cargo box 36. Cargo box 36 is rotatably coupled to frame assembly 20 at a rear portion of cargo box 36. Cargo box 36 is coupled to frame 20 independent of shrouding assembly 30. Shrouding assembly 30 does not move with cargo box 36.

In the illustrative embodiment, shrouding assembly 30 is positioned relative to electric powertrain components 28 such that shrouding assembly 30 provides splash and spray protection from the outside environment during operation, power washing, and/or keep debris from entering the electric powertrain component space. Additionally or alternatively, shrouding assembly 30 is adapted to protect a user (e.g., a driver, a passenger, and/or a technician) from unintended or uninformed interaction with the high voltage systems (e.g., electric powertrain components 28). Additionally or alternatively, shrouding assembly 30 is adapted to provide a way to seal off or direct venting gases from batteries and/or provide ducting of moving air for cooling of electric powertrain hardware. Additionally or alternatively, in some embodiments, shrouding assembly 30 may also attenuate airborne noise of electric powertrain components 28 and provide an acoustic barrier for a quieter electric vehicle (EV) experience. Additionally or alternatively, shrouding assembly 30 may also provide a cosmetic coverage of electric vehicle 10 for a cleaner more premium aesthetic. In addition, to shrouding assembly 30, electric vehicle 10 incudes one or more body panels 70 (see FIGS. 1 and 2) that may provide shielding for electric powertrain 28.

The electric vehicle 10 further includes a plurality of suspension systems which couple the ground engaging members 12 to the frame assembly 20. For example, a rear suspensions system 46 couples the rear wheels 16 to the rear frame assembly 26. Exemplary suspension systems are disclosed in U.S. Pat. No. 10,369,886; U.S. patent application Ser. No. 16/013,210, filed Jun. 20, 2018, titled VEHICLE HAVING SUSPENSION WITH CONTINUOUS DAMPING CONTROL; U.S. patent application Ser. No. 16/529,001, filed Aug. 1, 2019, titled ADJUSTABLE VEHICLE SUSPENSION SYSTEM; U.S. patent application Ser. No. 15/816,368, filed Nov. 17, 2017, titled ADJUSTABLE VEHICLE SUSPENSION SYSTEM; and U.S. patent application Ser. No. 16/198,280, filed Nov. 21, 2018, titled VEHICLE HAVING ADJUSTABLE COMPRESSION AND REBOUND DAMPING, the entire disclosures of which are expressly incorporated by reference herein.

As shown in FIG. 1, middle frame assembly 24 is configured to support seating for an operator and one or more passengers. In the illustrative embodiment, the seating includes an operator/driver seat and a passenger seat; however, the seating may also include rear seats for additional passengers. Exemplary seating includes straddle seats, bench seats, bucket seats, and other suitable support members.

Additionally, electric vehicle 10 illustratively does not include doors and has an open cab with mesh closures. However, it should be appreciated that, in some embodiments, electric vehicle 10 may include two doors, four doors, or another suitable number of doors. In other embodiments, electric vehicle 10 may include half lower doors, quarter lower doors, or soft canvas doors. Further, electric vehicle 10 has a roll cage and is an open-air vehicle.

Referring now to FIGS. 3-6, detailed views of frame assembly 20 of electric vehicle 10 with rear suspension system 46 are shown. For example, rear frame assembly 26 includes a lower tubular frame structure 40 having a skid plate attached thereto, an upper tubular frame structure 42, and a plurality of upstanding tubular connectors 44 connecting the lower tubular frame structure 40 and the upper tubular frame structure 42. Lower tubular frame structure 40, upper tubular frame structure 42, and the plurality of connectors 44 create an electric powertrain component space for at least portions of the electric powertrain components 28. As discussed above, electric powertrain components 28 may include numerous high voltage carrying components, and shrouding assembly 30 provides physical barrier or protection of the electric powertrain components 28 from the environment. Detailed views of the integrated shrouding assembly 30 are shown in FIGS. 7 and 8.

Figure 3:
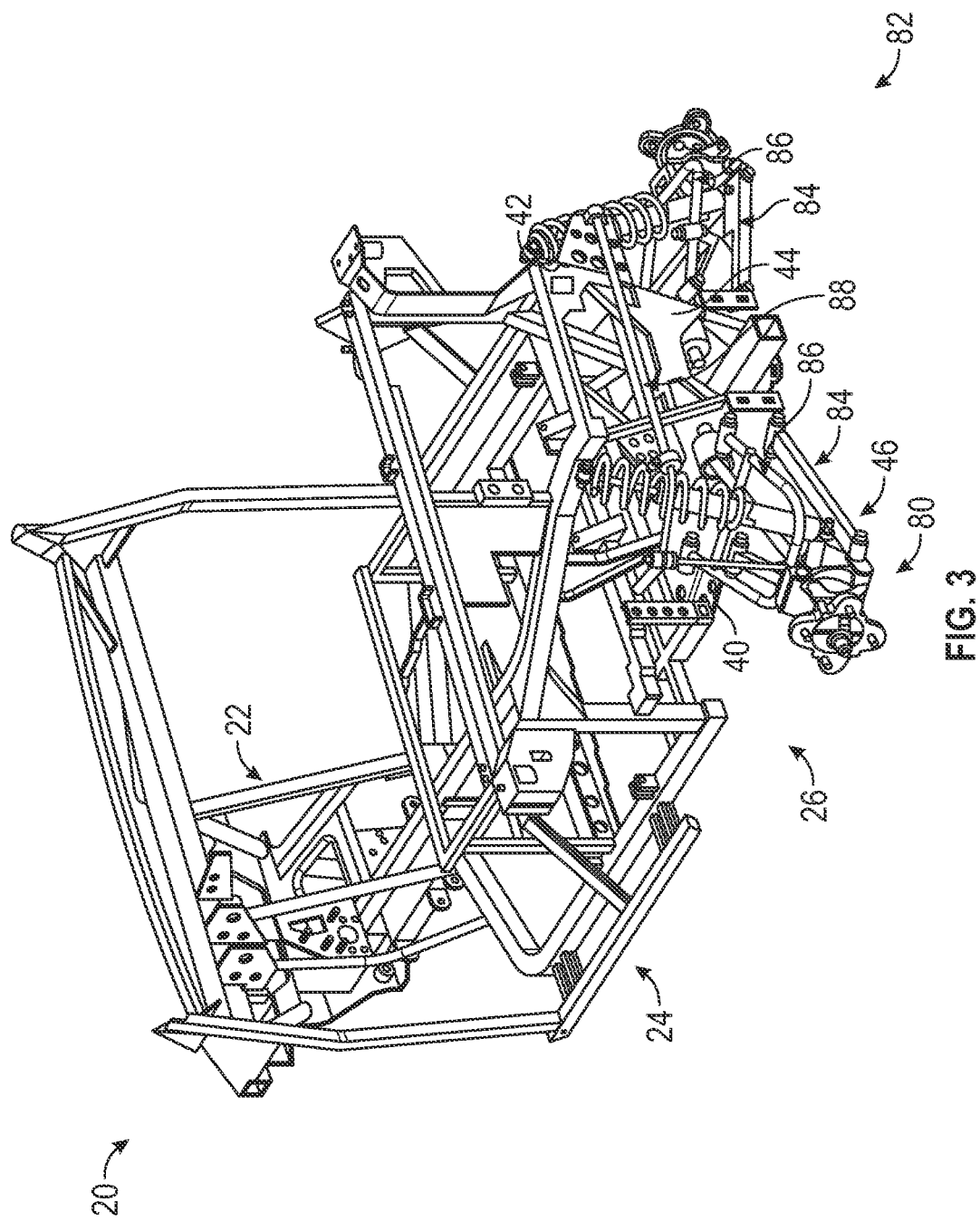
FIG. 3 illustrates a rear left perspective view of a frame assembly and rear suspension assembly of the exemplary recreational vehicle FIG. 1.

Referring to FIG. 3, rear suspension 46 includes an independent left suspension 80 for the left side rear wheel 16 and a right suspension 82 for the right side rear wheel 16. Each of left suspension 80 and right suspension 82 include a lower suspension arm 84 and an upper suspension arm 86, both of which are rotatably coupled to frame assembly 20. Each of left suspension 80 and right suspension 82 are coupled together through a sway bar 88 which is independently coupled to frame assembly 20. Each of left suspension 80 and right suspension 82 further include a shock absorber independently coupled to frame assembly 20 independent of lower suspension arm 84 and upper suspension arm 86.

Referring now to FIGS. 7 and 8, shrouding assembly 30 is positioned rearwardly relative to the plurality of seats of the electric vehicle 10 and above the lower panel 40 of the rear frame assembly 26. The integrated shrouding assembly 30 includes a top panel 32 and side panels 34 to partially surround the electric powertrain components 28. Specifically, in the illustrative embodiment, top panel 32 is positioned on top of upper frame 42 of rear frame assembly 26, and side panels 34 are positioned between upper frame 42 and lower panel 40 of rear frame assembly 26 and are attached thereto. Each of the top panel 32 and the side panels 34 of the integrated shrouding assembly 30 may be made of single or multilayer barrier materials, such as metal, plastic, adhere materials, composite, and/or other suitable materials.

The combination of top panel 32 and side panels 34 of shrouding assembly 30 creates barriers at least partially surrounding electric powertrain components 28 that are supported by frame assembly 20, such as supported by lower frame portion 40 of rear frame assembly 26. Such barriers provide protection of electric powertrain components 28 from the environment and/or attenuate airborne noise of electric powertrain components 28. As described above, the barriers may also protect a user (e.g., a driver, a passenger, and/or a technician) from unintended or uninformed interaction with the high voltage systems (e.g., the electric powertrain components 28). Additionally, the positions of top panel 32 and side panels 34 of shrouding assembly 30 relative to electric powertrain components 28 allows air to flow over the electric powertrain components 28 for cooling and gas venting evacuation.

Moreover, because electric powertrain components 28 are positioned underneath cargo box 36, shrouding assembly 30 may keep debris from the cargo box 36 from entering the electric powertrain component space. It should be appreciated that shrouding assembly 30 is separate from cargo box 36. As shown in FIG. 8, the cargo box 36 is positioned above shrouding assembly 30. Specifically, a cargo frame 38 is coupled to upper frame 42 of rear frame assembly 26 and is adapted to support cargo box 36. As shown in FIG. 8, top panel 32 of shrouding assembly 30 is positioned between cargo box 36 and electric powertrain components 28 supported on rear frame assembly 26.

Figure 10:
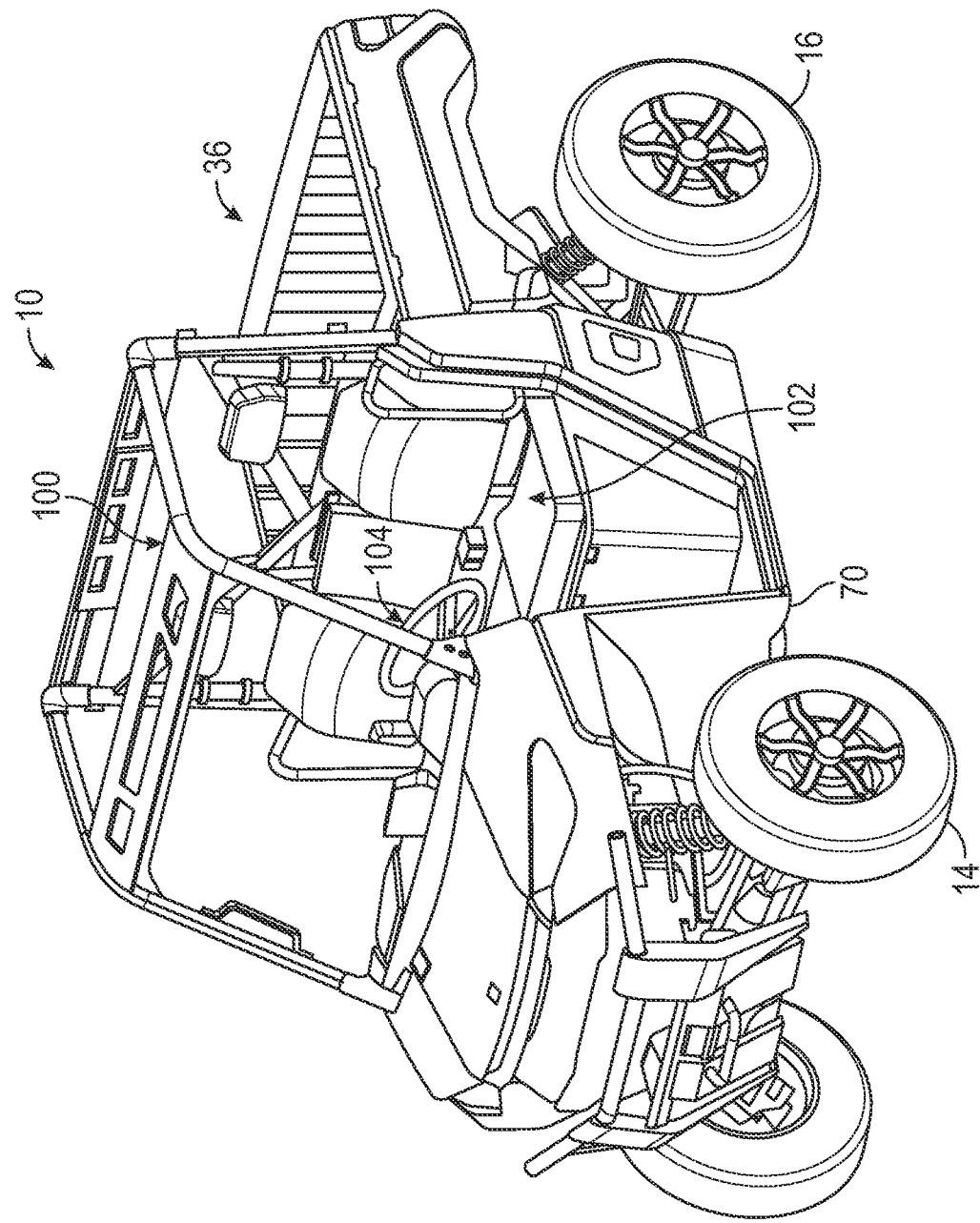
FIG. 10 illustrates a left front perspective view of the exemplary recreational vehicle FIG. 1.
Figure 11:
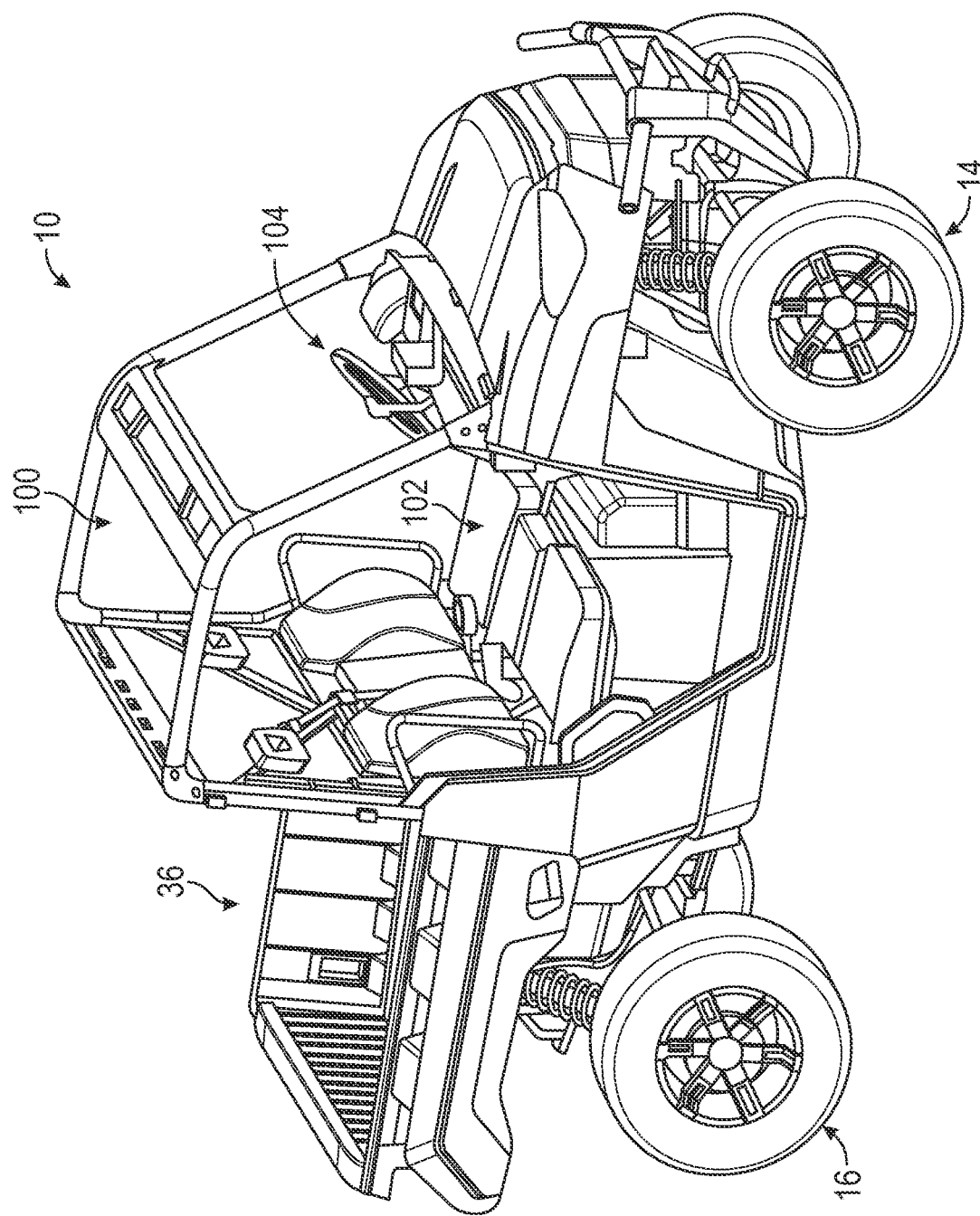
FIG. 11 illustrates a right front perspective view of the exemplary recreational vehicle FIG. 1.
Figure 12:
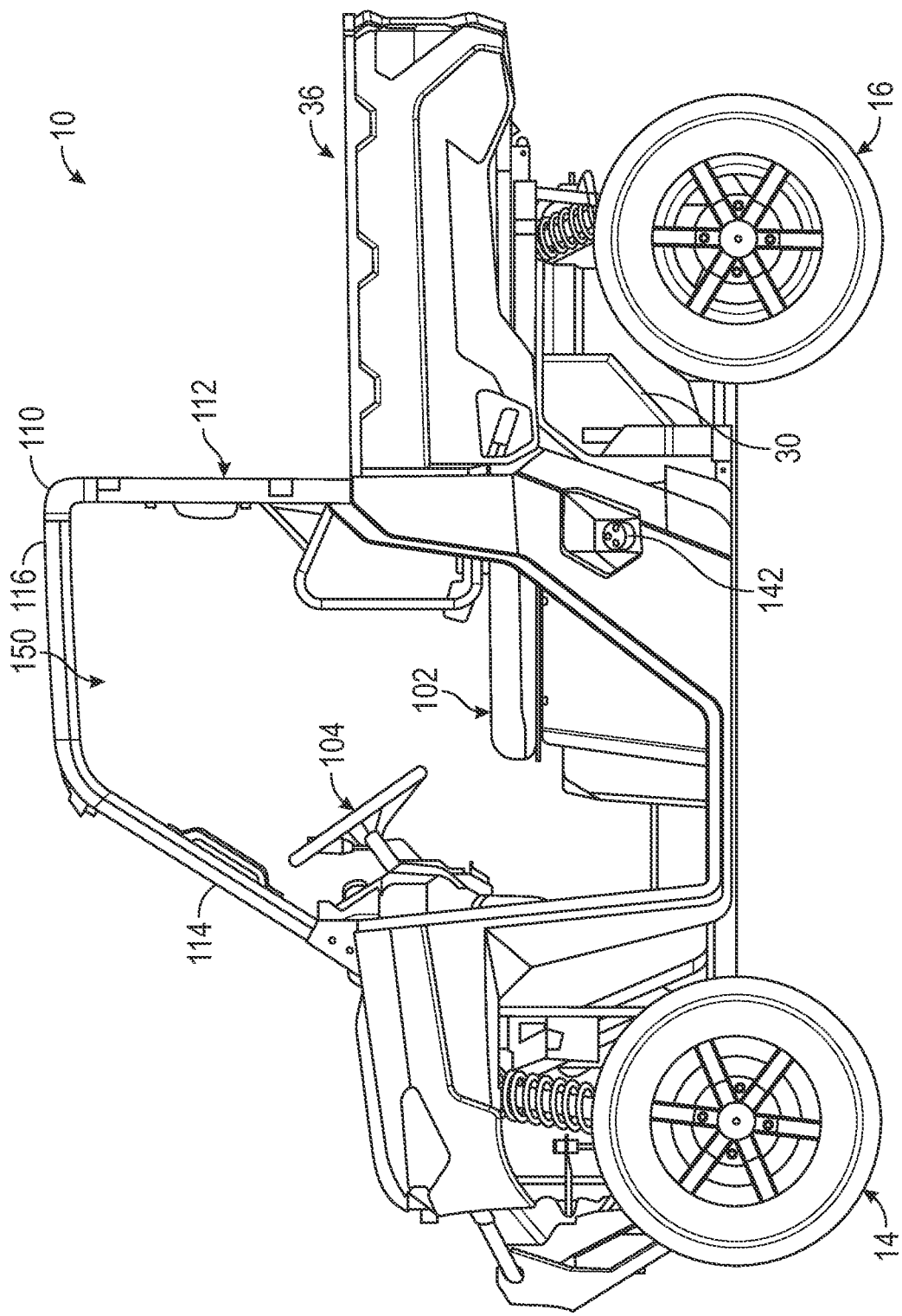
FIG. 12 illustrates a left side view of the exemplary recreational vehicle FIG. 1 with the door covering the charge port removed.

Referring to FIGS. 10-47, additional details regarding electric vehicle 10 are disclosed. Referring to FIG. 10, electric vehicle 10 includes an operator area 100 having seats 102. Seats 102 are illustrated as a bench seat but other exemplary seats such as bucket seats may be included. Operator area 100 further includes a steering input 104, illustratively a steering wheel is operatively coupled to front wheels 14 to alter a direction of travel of electric vehicle 10. Referring to FIG. 12, operator area 100 is covered by a roll cage 110 including a rear portion 112 coupled to frame assembly 20 and positioned rearward of seats 102 and forward of cargo box 36, a front portion 114 coupled to frame assembly 20 and positioned forward of steering input 104, and a middle portion 116 connecting rear portion 112 and front portion 114.

Figure 18:
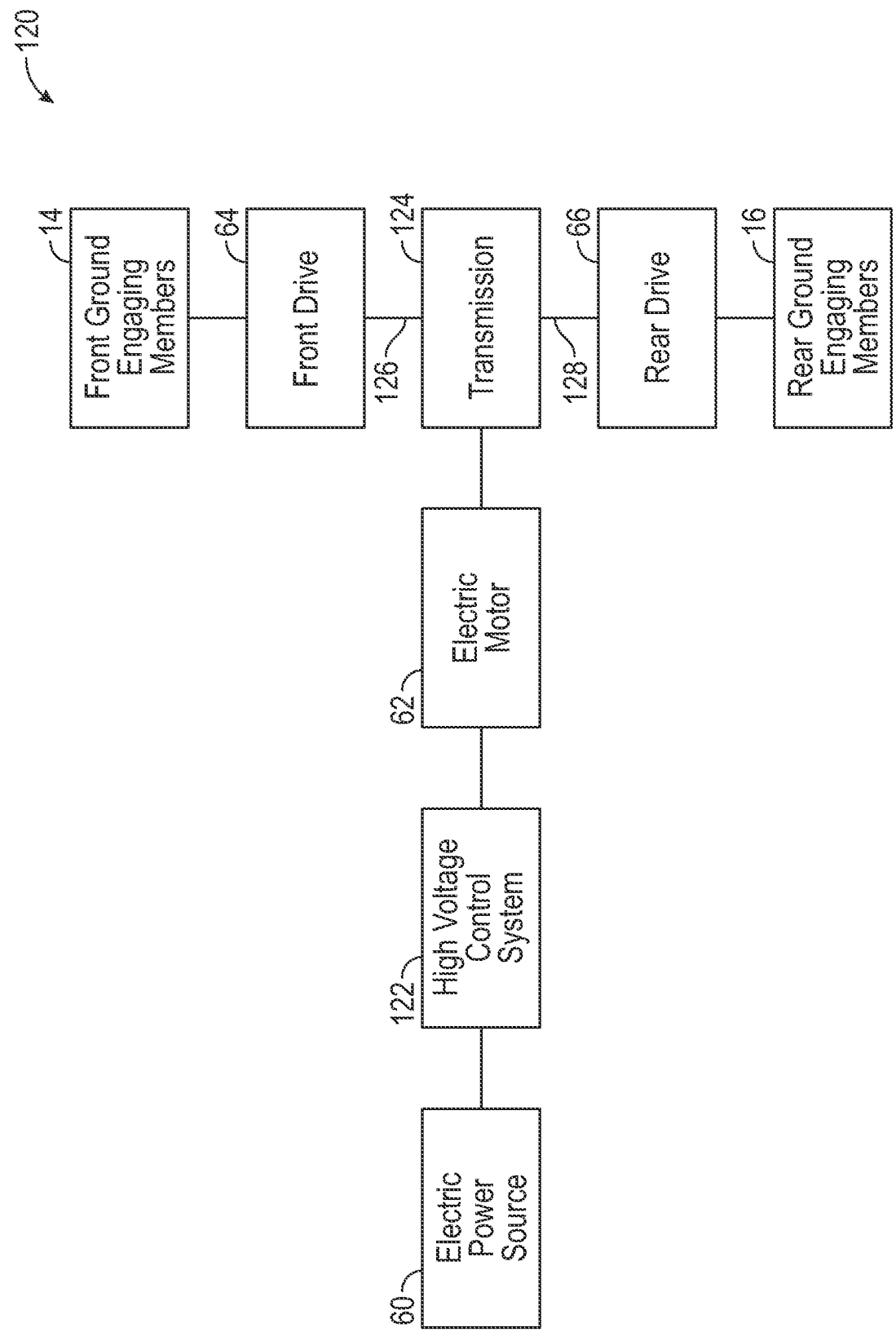
FIG. 18 illustrates a representative view of an electric powertrain of the exemplary recreational vehicle FIG. 1.

Referring to FIG. 18, an exemplary electric powertrain 120 for electric vehicle 10 is illustrated. Electric powertrain 120 includes an electric power source 60 which provides power to an electric motor 62. The electric power is provided by a high voltage control system 122. In embodiments, electric power source 60 provides a DC electric power and high voltage control system 122 includes an inverter to produce AC electric power thereform and various control hardware and/or software, such as pulse width modulation circuitry and controls, to control a power level of the AC electric power supplied to electric motor 62. Electric power source 60 may include one or more batteries or other energy storage systems capable of providing electrical power to electric motor 62. An output shaft of electric motor 62 is operatively coupled to a transmission 124. A first output 126 of transmission 124 is operatively coupled front drive 64 to power one or more of front wheels 14 and a second output 128 of transmission 124 is operatively coupled to rear drive 66 to power one or more of rear wheels 16.

In embodiments, transmission 124 includes a shiftable transmission having a plurality of gear settings. Exemplary shiftable transmissions include a low setting, a high setting (higher speed than low setting), a neutral setting wherein an output of transmission 124 is free to rotate relative to an input of transmission 124, and a park setting wherein the output of transmission 124 is held fixed. Further, electric motor 62 may be run in a first direction which results in electric vehicle 10 moving in a forward direction in either of the low setting of transmission 124 or the high setting of transmission 124 and in a second direction which results in electric vehicle 10 moving in a reverse direction in either of the low setting of transmission 124 or the high setting of transmission 124.

Figure 55:
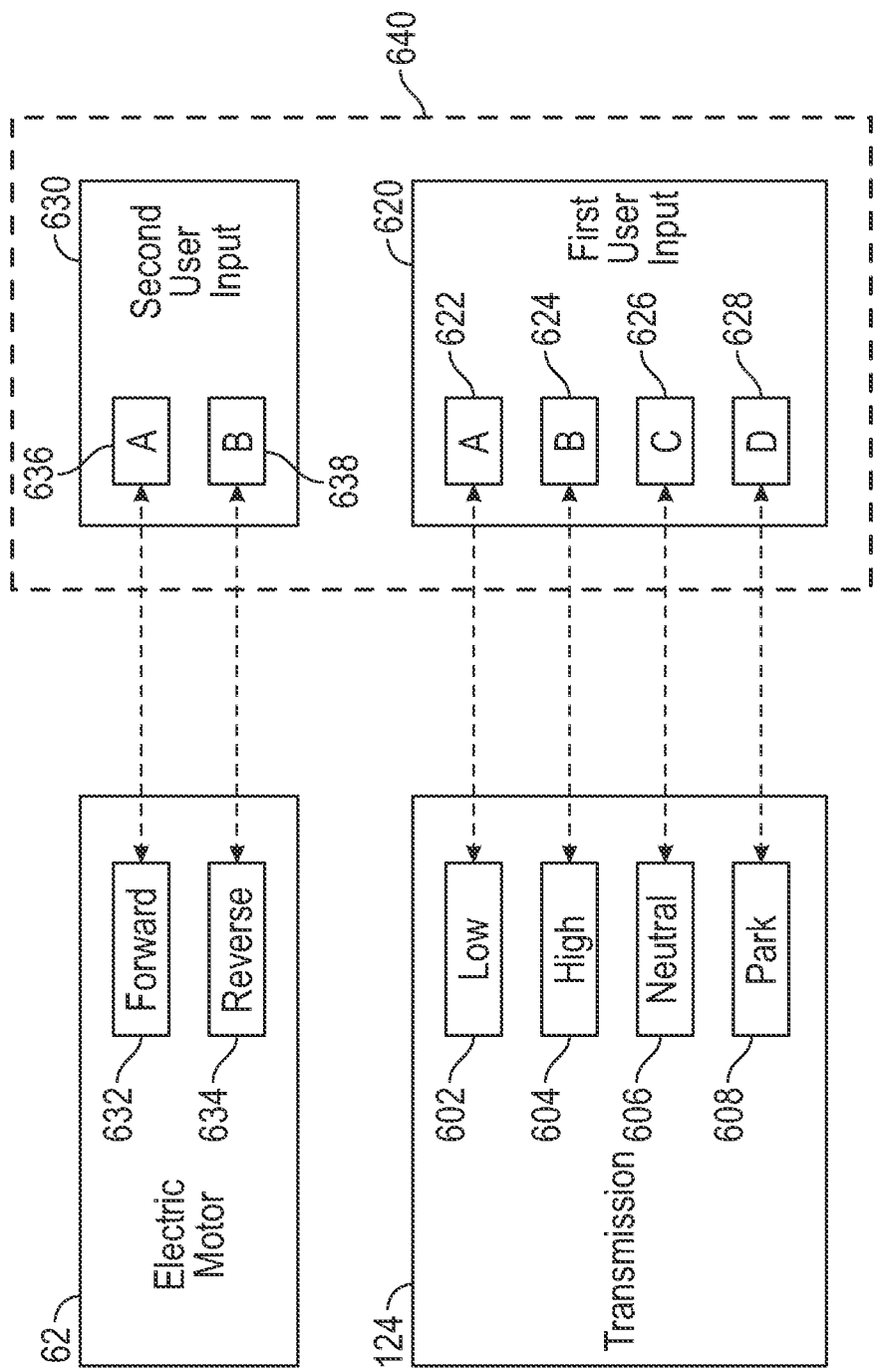
FIG. 55 is an exemplary schematic view of inputs for a drive train of the electric vehicle of FIG. 1.

Referring to FIG. 55, a representation of transmission 124 having four settings: a low setting 602, a high setting 604, a neutral setting 606, and a park setting 608 is shown. Each of low setting 602, high setting 604, neutral setting 606, and park setting 608 is selectable with a first user input 620 which has a first position 622 which corresponds to transmission 124 being in low setting 602, a second position 624 which corresponds to transmission 124 being in high setting 604, a third position 626 which corresponds to transmission 124 being in neutral setting 606, and a fourth position 628 which corresponds to transmission 124 being in park setting 608. Exemplary first user inputs 620 include levers, dials, sliders, twist grips, and other suitable input devices having multiple selectable positions. In embodiments, first user input 620 moves in a single degree of freedom either rotational or translational.

Electric motor 62 also has a forward setting 632 wherein an output of electric motor 62 rotates in a first direction and a reverse setting 634 wherein the output of electric motor 62 rotates in a second direction, opposite the first direction of forward setting 632. Each of forward setting 632 and reverse setting 634 is selectable with a second user input 630 which has a first position 636 which corresponds to electric motor 62 being in forward setting 632 and a second position 638 which corresponds to electric motor 62 being in reverse setting 634. Exemplary second user inputs 630 include levers, dials, sliders, toggle switches, switches, twist grips, and other suitable input devices having multiple selectable positions. In embodiments, second user input 630 moves in a single degree of freedom either rotational or translational.

In embodiments, both of first user input 620 and second user input 630 are carried by a common support 640. In examples support 640 supports first user input 620 and first user input 620 supports second user input 630 such that common support 640 supports both first user input 620 and second user input 630.

Figure 56:
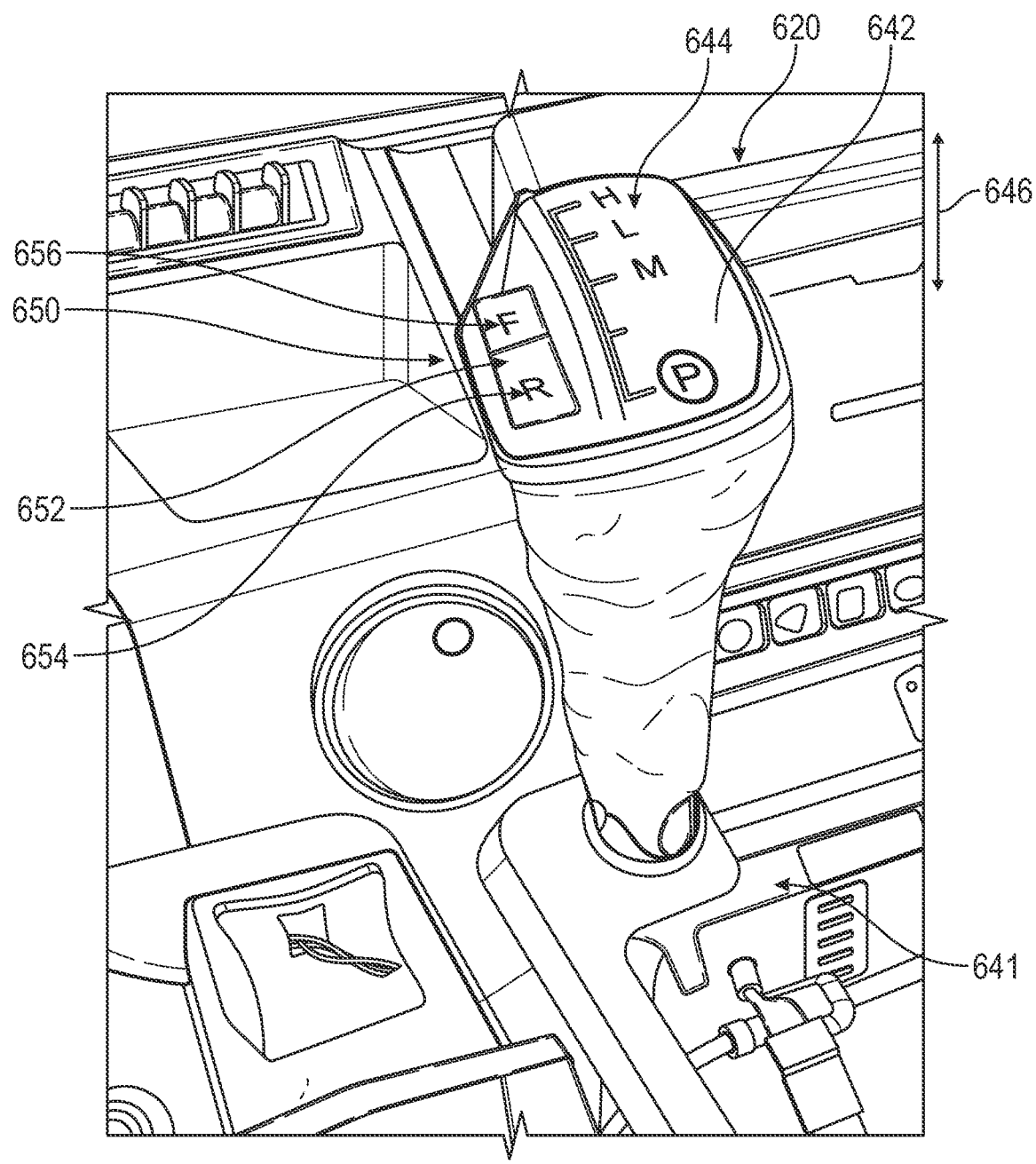
FIG. 56 is an exemplary input for a drive train of the electric vehicle of FIG. 1.

Referring to FIG. 56, an exemplary embodiment of first user input 620 and second user input 630 are shown. First user input 620 is a gear shift lever 641 having an operator grip portion 642 which includes indicia 644 for each of first position 622, second position 624, third position 626, and fourth position 628 of first user input 620. Gear shift lever 641 is rotatable about a pivot (not shown) in direction 646 to select a desired one of first position 622, second position 624, third position 626, and fourth position 628 of first user input 620. The pivot serves as the common support 640. In embodiments, a linkage (not shown) couples first user input 620 to transmission 124 such that the corresponding one of low setting 602, high setting 604, neutral setting 606, and park setting 608 of transmission 124 is set through the linkage. In embodiments, a sensor monitors a position of gear shift lever 641 and provides an indication to a transmission controller (not shown) which electronically sets the corresponding one of low setting 602, high setting 604, neutral setting 606, and park setting 608 of transmission 124.

An exemplary embodiment of second user input 630, a toggle switch 650 is shown. Toggle switch 650 includes indicia 652 for each of first position 636 and second position 638 of second user input 630. Depressing a portion 654 of toggle switch 650 corresponding to an "R" indicia, second position 638 is selected and a controller of high voltage control system 122 operatively coupled to toggle switch 650 sets electric motor 62 to reverse setting 634. Similarly, by depressing a portion 656 of toggle switch 650 corresponding to an "F" indicia, first position 636 is selected and a controller of high voltage control system 122 operatively coupled to toggle switch 650 sets electric motor 62 to forward setting 632.

Figure 16:
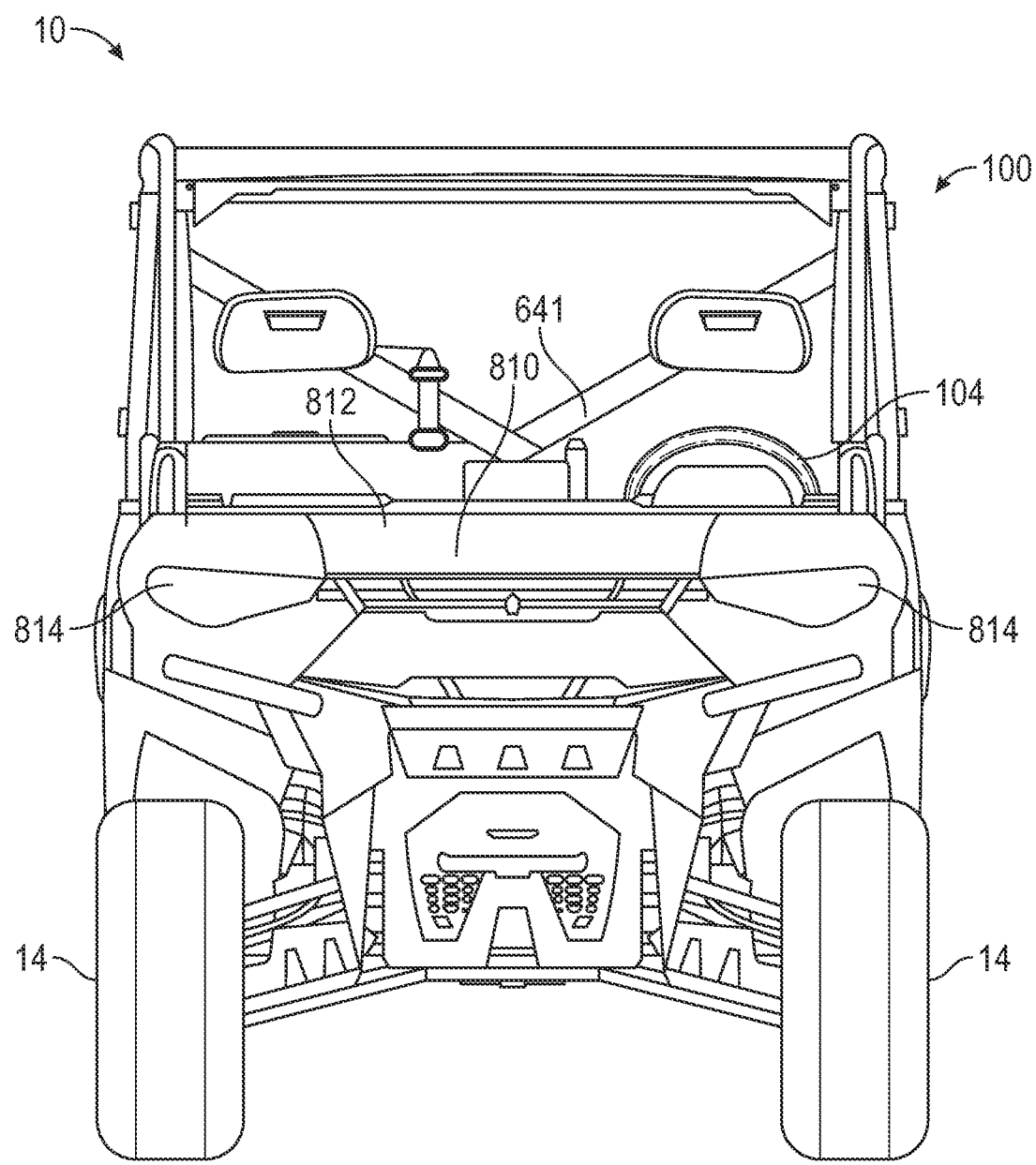
FIG. 16 illustrates a front view of the exemplary recreational vehicle FIG. 1.
Figure 17:
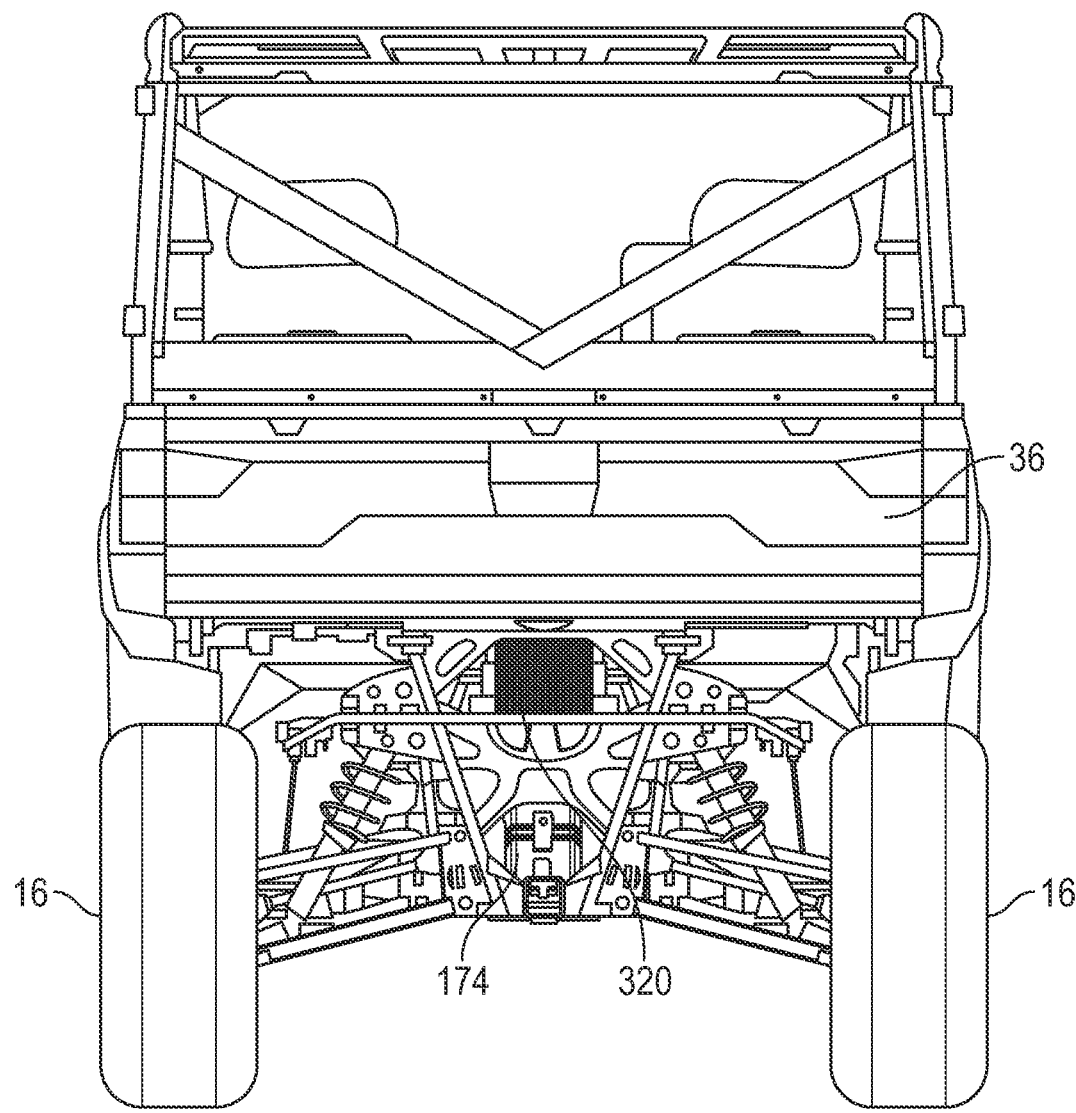
FIG. 17 illustrates a rear view of the exemplary recreational vehicle FIG. 1.

In embodiments, gear shift lever 641 is positioned to a right side of steering input 104 (see FIG. 16). By gripping operator grip portion 642 of gear shift lever 641 an operator may easily select one of first position 622, second position 624, third position 626, and fourth position 628 of first user input 620 and one of first position 636 and second position 638 of second user input 630 with the same hand and without letting go of operator grip portion 642 of gear shift lever 641. In embodiments, such as when plowing with electric vehicle 10, an operator may select first position 622 with gear shift lever 641 and keep their hand on operator grip portion 642 to select between first position 636 and second position 638 of second user input 630 to move electric vehicle 10 rearward and forward. In embodiments, electric motor 62 will only be switched between forward setting 632 and reverse setting 634 when electric vehicle 10 is at a stop. In embodiments, second user input 630 may be used to request a change to electric motor 62, such as switching from forward setting 632 to reverse setting 634 while electric vehicle 10 is moving and high voltage control system 122 will delay acting on the request until electric vehicle 10 is at a stop. An advantage, among others, of gear shift lever 641 is it allows selection of either of first position 636 or second position 638 while transmission 124 is in either of low setting 602 or high setting 604 on a single control.

Figure 13:
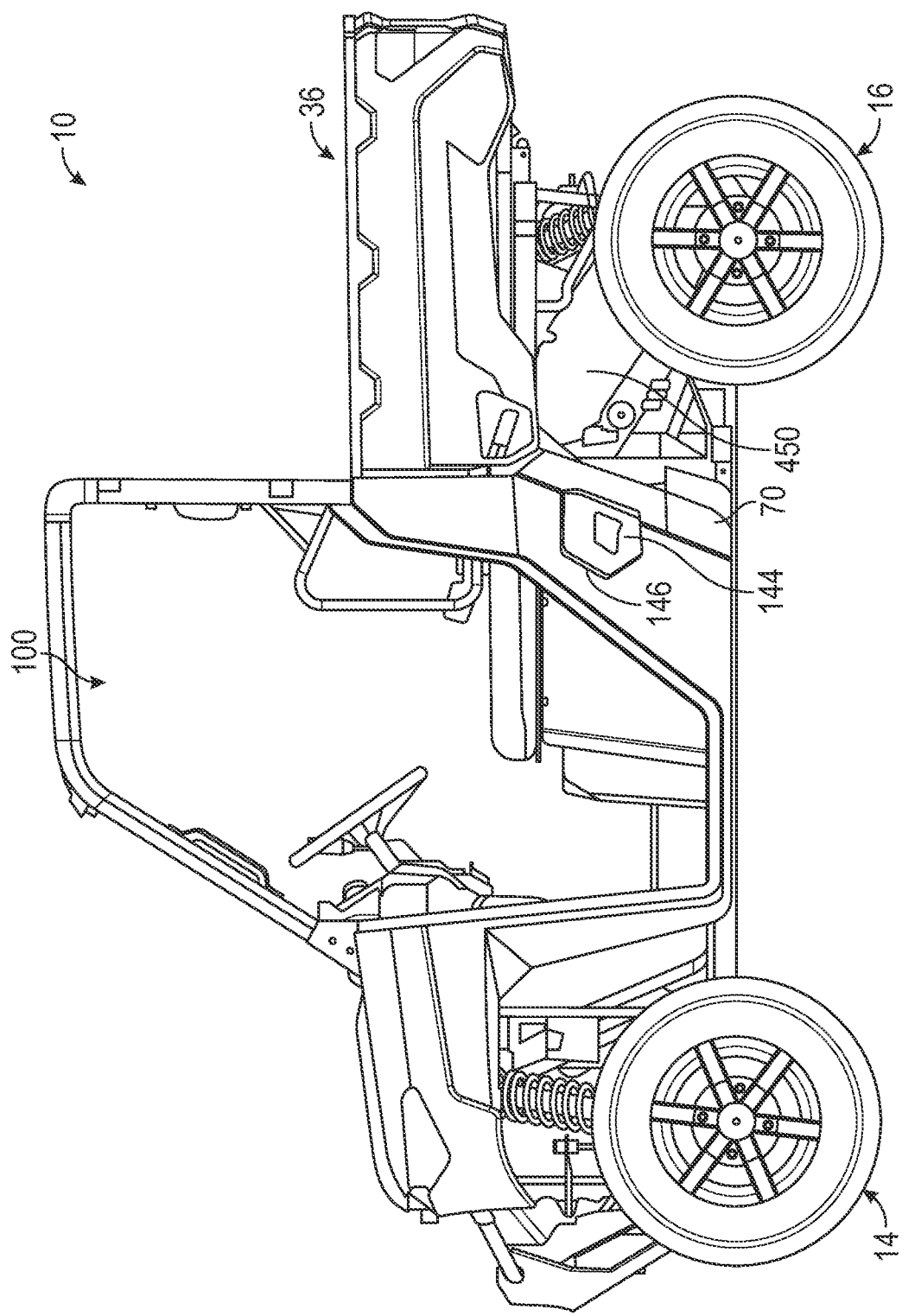
FIG. 13 illustrates a left side view of the exemplary recreational vehicle FIG. 1 with the left side shroud removed.
Figure 19:
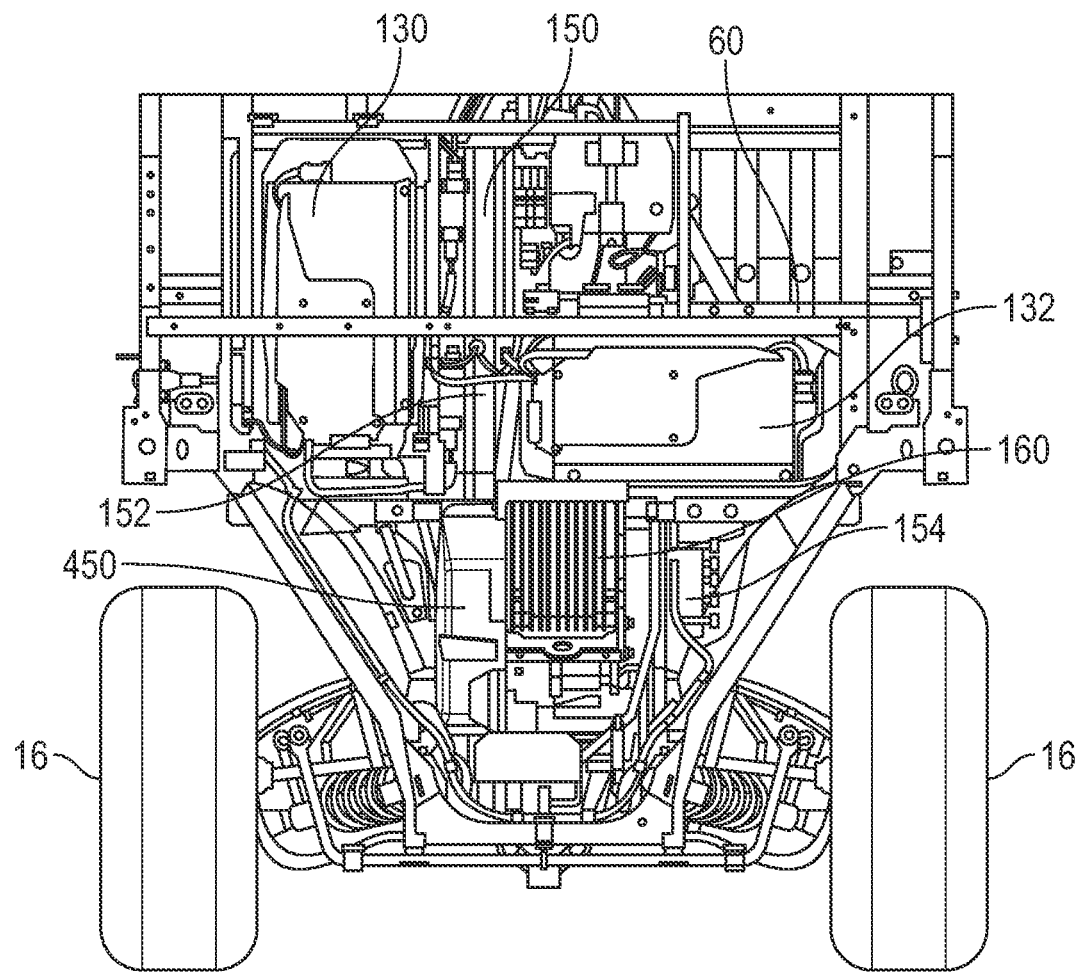
FIG. 19 illustrates the exemplary positions of various components of the electric powertrain of FIG. 18 in the frame of the exemplary recreational vehicle FIG. 1.
Figure 20:
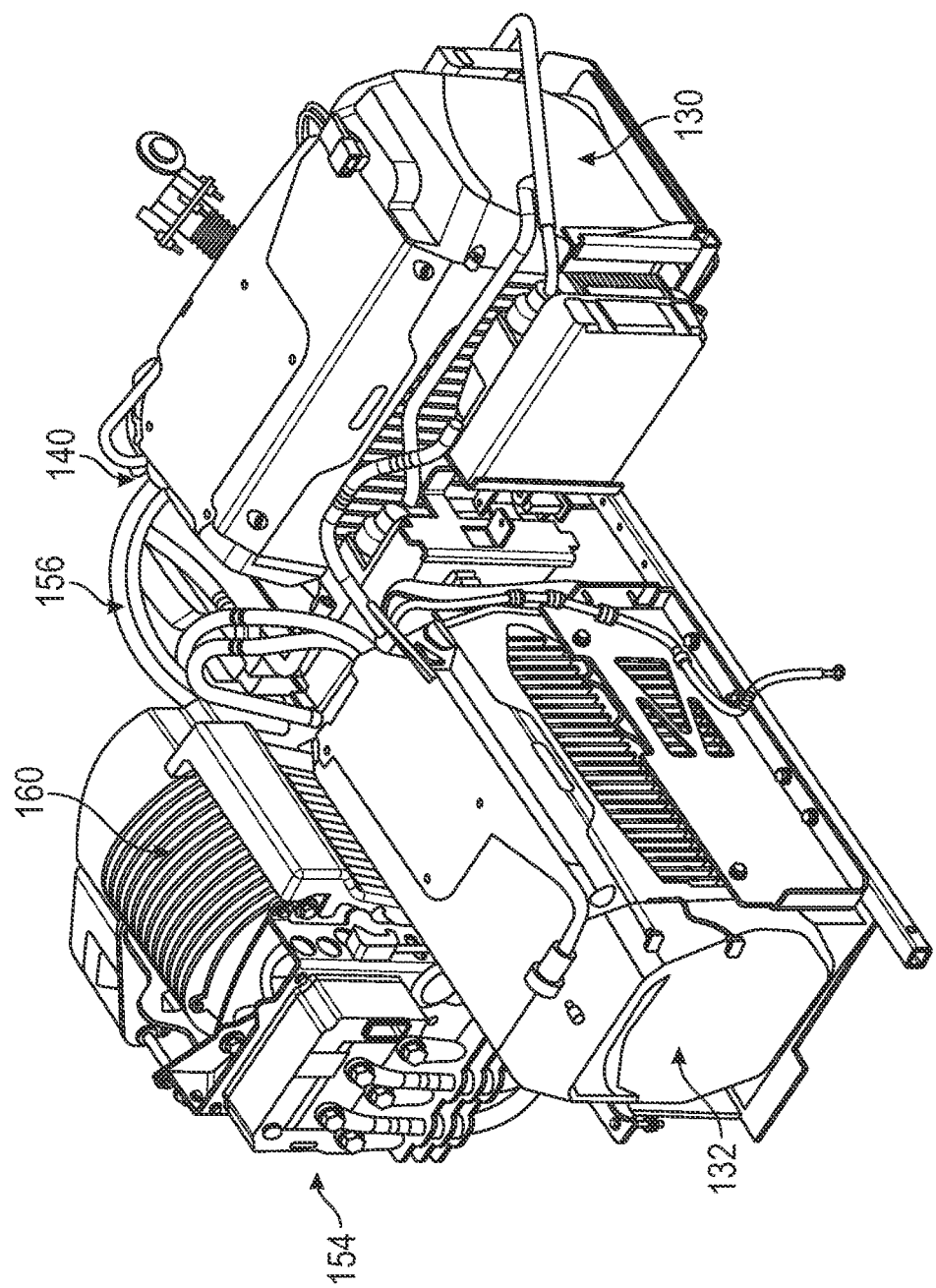
FIG. 20 illustrates a right front perspective view of various components of the electric powertrain as positioned in FIG. 19.

Referring to FIGS. 19-27, various components of electric powertrain 120 are illustrated positioned within frame assembly 20 of electric vehicle 10. Referring to FIG. 19, electric power source 60 includes a plurality of battery packs, illustratively battery pack 130 and battery pack 132. Battery pack 130 is positioned under a driver portion of seat 102 and battery pack 132 is generally positioned on a right side of electric vehicle 10 under a back portion of a passenger portion of seats 102. In other examples, battery packs 130 and 132 may be in other positions. For example, the position of battery backs 130 and 132 may be selected to improve a balance of vehicle 10, provide space in selected areas of operator area 100, improve heat dissipation or impact protection of batteries 130 and 132, or the like. The plurality of battery packs may be electrically coupled in series, in parallel, or a combination of both series and parallel connections. In some examples, the plurality of battery packs may be modular or expandable such that a selected number of battery packs and a selected configuration of the plurality of battery packs may be determined based on a pre-determined function or performance of vehicle 10. Battery packs 130, 132 are charged with a battery charger 140 (see FIG. 21) which receives electrical energy through a charge connector 142 (see FIGS. 12 and 21). Referring to FIG. 13, charge connector 142 is covered by a cover 144. Cover 144 is hinged to body panel 70 along edge 144. The hinged connection is angled relative both to horizontal and vertical. An advantage, among others, of this hinged configuration is that charge connector cover 144 will fall closed by gravity when charge connector 142 is not connected to an external electrical power source.

Figure 57:
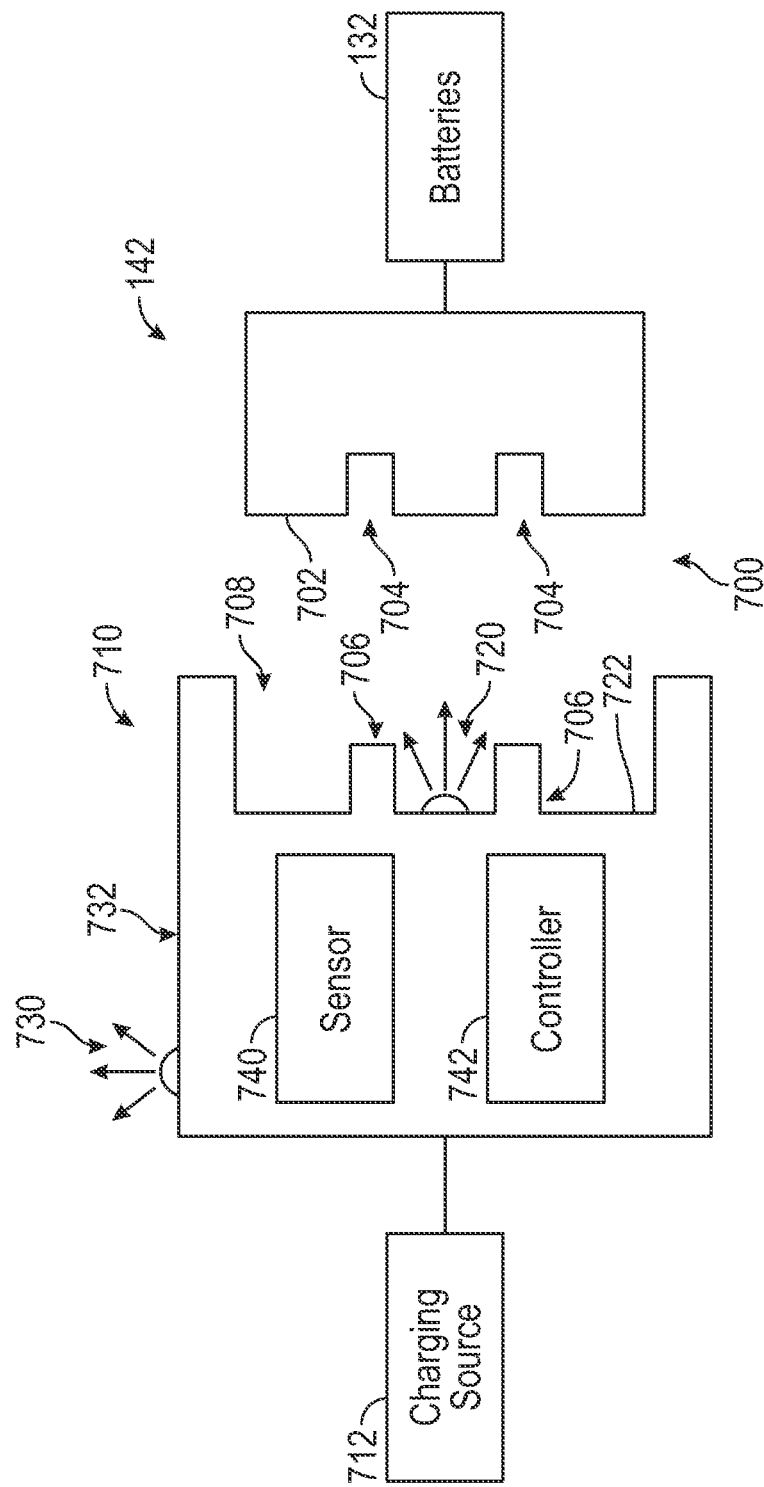
FIG. 57 is an exemplary schematic view of a charging cable and charge connector of the electric vehicle of FIG. 1.

Referring to FIG. 57, charge connector 142 includes an interface 700 on a front face 702. Interface 700 includes a plurality of connectors 704, represented as recesses, which receive corresponding connectors 706 of an interface 708 of a charging cable 710 when charging cable 710 is connected to charge connector 142. Charging cable 710 is operatively coupled to a charging source 712, such as an electrical grid or generator.

Charging cable 710 includes a first illumination source 720 which is provided on a face 722 of interface 708 to illuminate charge connector 142 as charging cable 710 is brought into proximity of charge connector 142. Although illumination source 720 is shown on face 722 of interface 708, first illumination source 720 may be supported on other portions of charging cable 710 as long as it either directly or indirectly (such as through mirrors or light guides) provides illumination to illuminate charge connector 142. A single first illumination source 720 is illustrated, but in embodiments more than one first illumination source 720 is provided. Exemplary first illumination source 720 include light emitting diodes, bulbs, and other suitable light sources.

In embodiments, charging cable 710 includes a release trigger (not shown) and first illumination source 720 is illuminated when the operator presses the release trigger. First illumination source 720 will remain on until the operator depresses the release trigger. In embodiments, release trigger either carries or actuates features on charging cable 710 which cooperate with features on charge connector 142 to hold charging cable 710 to charge connector 142 and when the release trigger is pressed the corresponding features are moved to permit separation of charging cable 710 from charge connector 142. In embodiments, first illumination source 720 may remain illuminated for a period of time after the release trigger is depressed.

In embodiments, charging cable 710 includes a second illumination source 730. Illumination source 730 is positioned on a top side 732 of charging cable 710 and serves as an indicator to an operator of whether charging cable 710 is properly connected to charge connector 142 or not. Although illumination source 730 is shown on top side 732 of charging cable 710, second illumination source 730 may be supported on other portions of charging cable 710 as long as it either directly or indirectly (such as through mirrors or light guides) provides a visual indicator or the operator of whether charging cable 710 is properly connected to charge connector 142 or not. A single second illumination source 730 is illustrated, but in embodiments more than one second illumination source 730 is provided. Exemplary second illumination source 730 include light emitting diodes, bulbs, and other sources of light. In embodiments, second illumination source 730 is one of replace or augmented by one or more of an audio indicator and a tactile indicator.

In embodiments, charging cable 710 includes a sensor 740 and a controller 742. In embodiments, sensor 740 senses if current is flowing through charging cable 710 from charging source 712 to charge connector 142. Based on sensor 740 controller 742 activates first illumination source 720 or deactivates second illumination source 730. For example, when charging cable 710 is connected to charge connector 142 and current flow is detected controller 742 causes second illumination source 730 to be activated to effect to provide a visual indication of proper connection. When current flow is not detected, controller 742 deactivates second illumination source 730.

Further, based on sensor 740 controller 742 may activate first illumination source 720 or deactivate first illumination source 720. For example, when charging cable 710 is disconnected from charge connector 142 controller 742 causes first illumination source 720 to be activated to effect illumination of charge connector 142 when charging cable 710 is approaching charge connector 142. When current flow is detected, charging cable 710 is connected to charge connector 142 and first illumination source 720 is deactivated by controller 742. In embodiments, charge connector 142 includes an accelerometer and controller 742 activates first illumination source 720 in response to a movement of charging cable 710.

Figure 14:
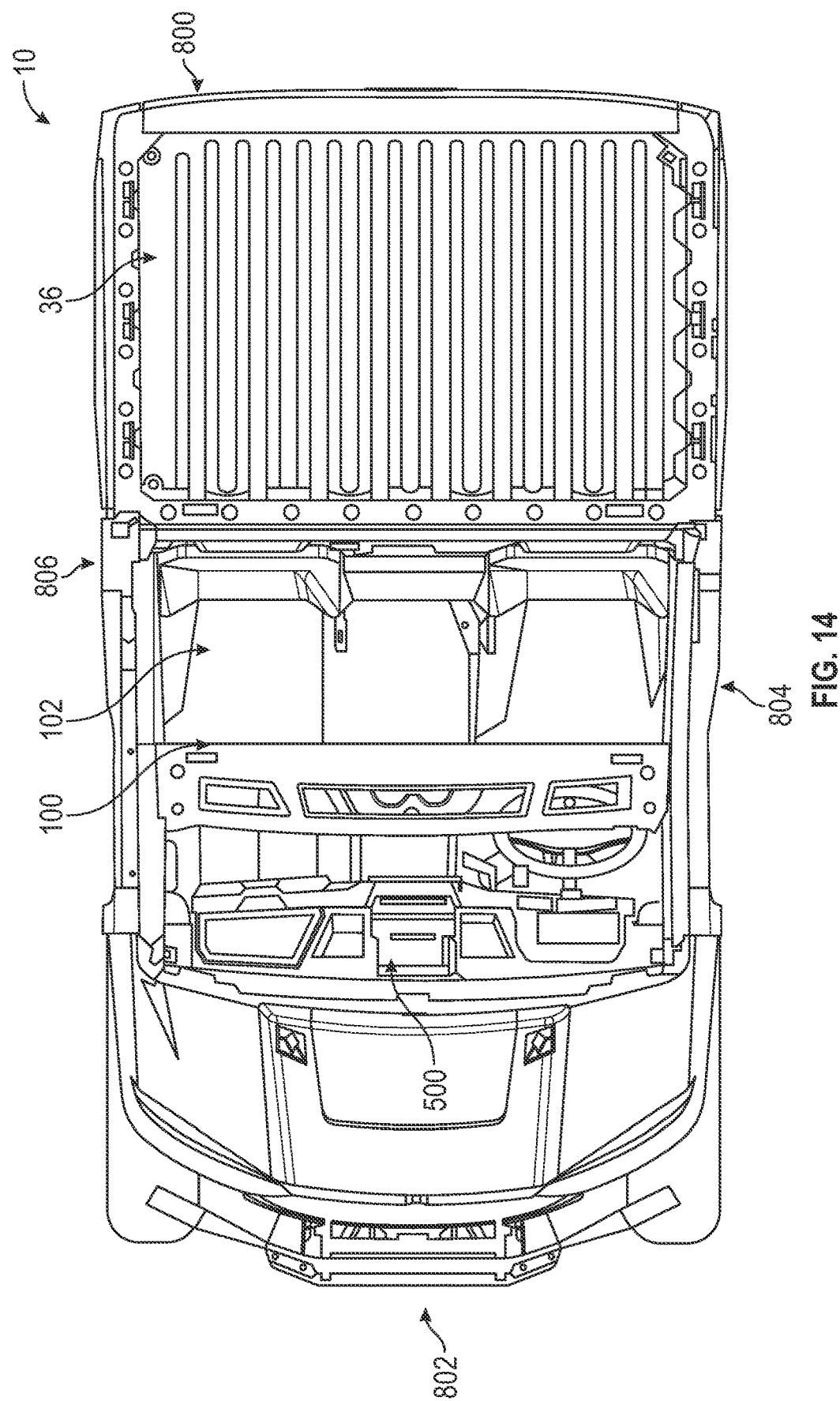
FIG. 14 illustrates a top view of the exemplary recreational vehicle FIG. 1.
Figure 15:
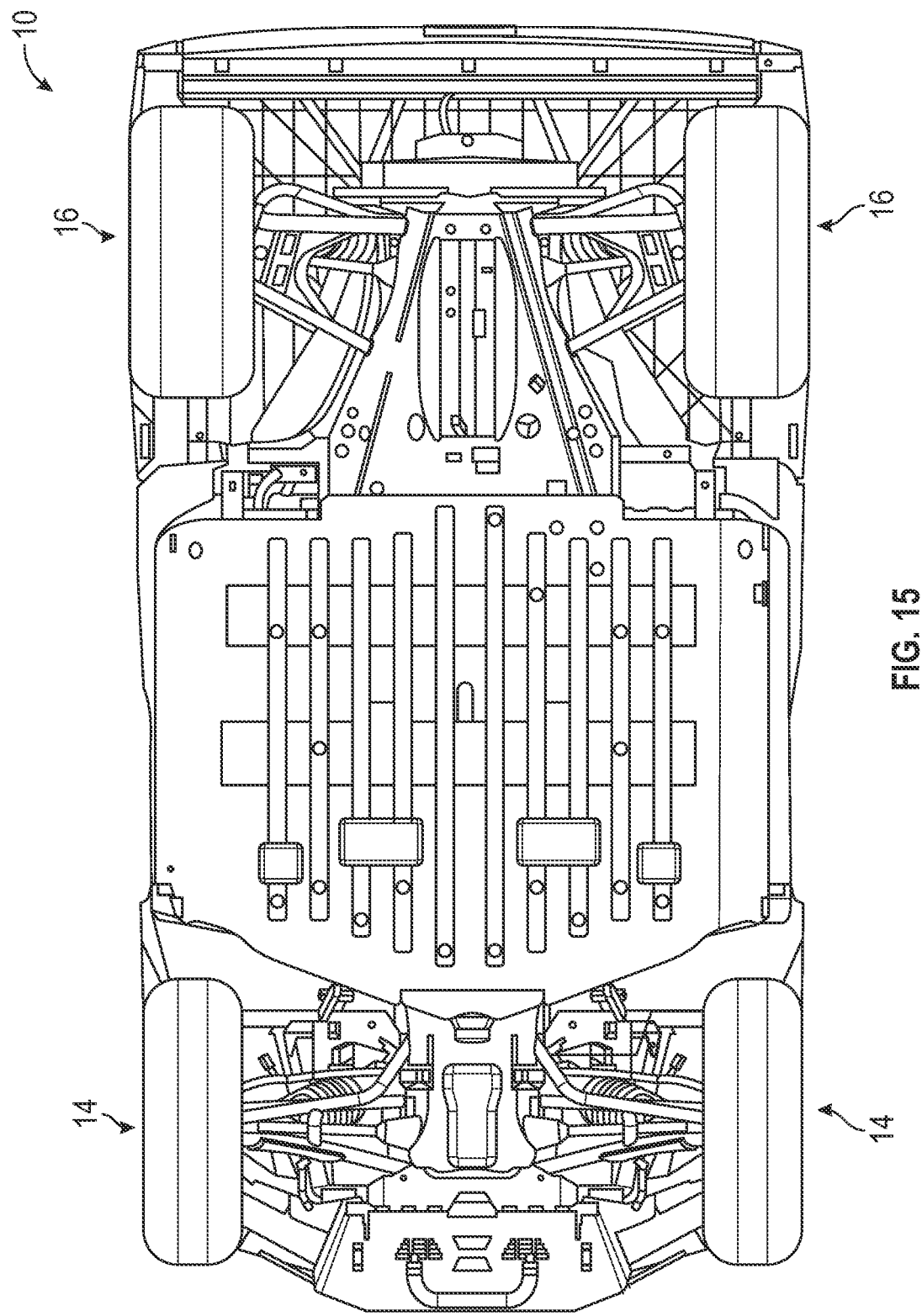
FIG. 15 illustrates a bottom view of the exemplary recreational vehicle FIG. 1.

In embodiments, electric vehicle 10 provides a visual indication to an operator positioned outside of an envelope of electric vehicle 10 of a charge status of electric vehicle 10 and/or a fault in the charging of electric vehicle 10. Referring to FIG. 14, an envelope of electric vehicle 10 has a horizontal extent bounded by a rear side 800 of electric vehicle 10, a front side 802 of electric vehicle 10, a left side 804 of electric vehicle 10, and a right side 806 of electric vehicle 10. The visual indication provided by electric vehicle 10 is visible from several feet away from electric vehicle 10 and without peering into operator area 100 of electric vehicle 10.

In embodiments, the visual indication is provided by one or more of the existing lights included on electric vehicle 10 for illumination of the surrounding environment or for indicating a state of the vehicle, such as braking. Referring to FIG. 16, electric vehicle 10 includes a light bar 810 positioned lower than a hood 812 of electric vehicle 10 and between headlights 814. In embodiments, light bar 810 is used to provide the visual indication of a charge status of electric vehicle 10 and/or a fault in the charging of electric vehicle 10. Thus, an operator in the surrounding environment may be able to ascertain the charging status of electric vehicle 10 by looking at front side 802 of electric vehicle 10.

Figure 58A:
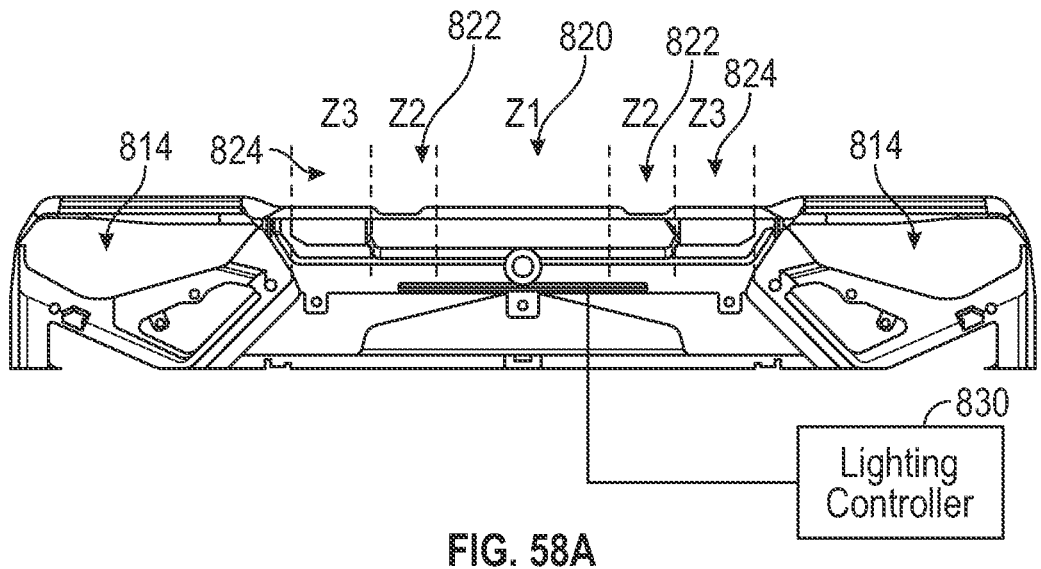
FIGS. 58A-C are exemplary visual indicators of charge status of the electric vehicle of FIG. 1.
Figure 58B:
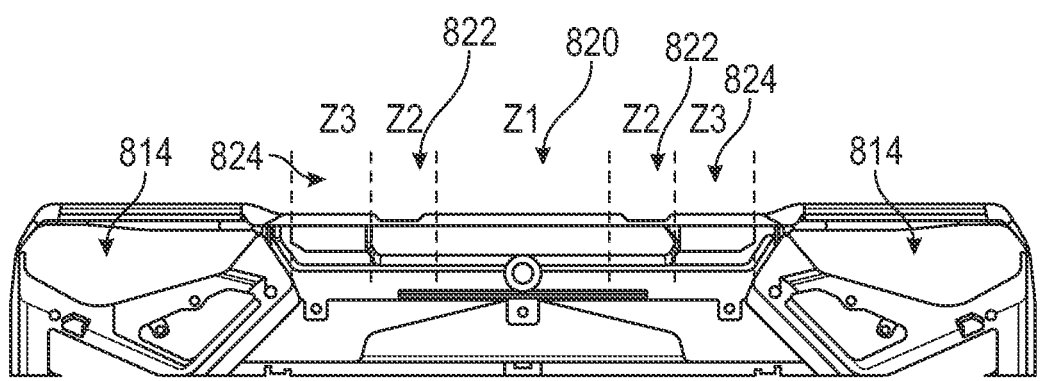
Figure 58C:
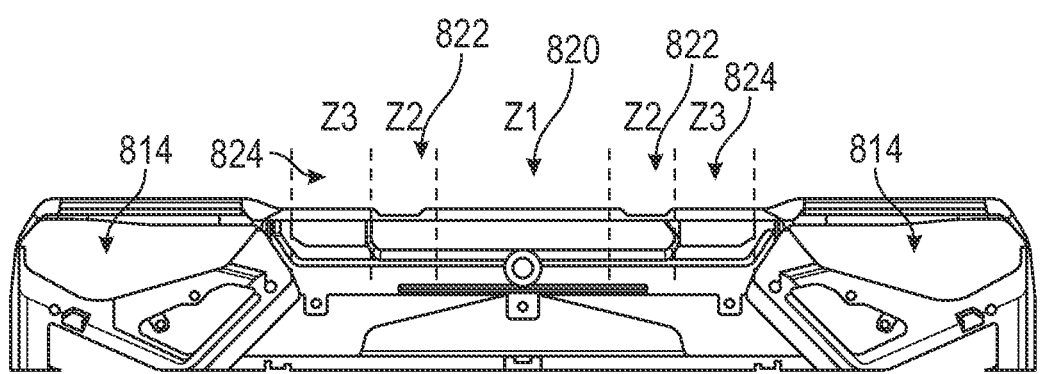

Referring to FIGS. 58A-C, light bar 810 includes a plurality of individually controllable zones including zone Z1 820, zone Z2 822, and zone Z3 824. Zone Z1 820 is a single segment while both of zone Z2 822 and zone Z3 824 include multiple non-connected segments. Each of zone Z1 820, zone Z2 822, and zone Z3 824 may include multiple illumination sources. Exemplary illumination sources include light emitting diodes, bulbs, and other suitable light sources. In embodiments, a lighting controller 830 (see FIG. 58A) of electric vehicle 10, which may be a part of an overall vehicle controller or other system controller, controls one or more illumination characteristics of the illumination sources of each of zone Z1 820, zone Z2 822, and zone Z3 824 to indicate a charging status of electric vehicle 10. Exemplary illumination characteristics include on/off, brightness level, color, and other suitable characteristics.

In an exemplary embodiment, lighting controller 830 receives input from high voltage control system 122 of a charge status of electric vehicle 10 and monitors a key switch status (on/off) of a key (not shown) for electric vehicle 10. If electric vehicle 10 is not charging and the key switch status is set to on, lighting controller 830 activates each of zone Z1 820, zone Z2 822, and zone Z3 824. If electric vehicle 10 is not charging and the key switch status is set to off, lighting controller 830 deactivates each of zone Z1 820, zone Z2 822, and zone Z3 824. If electric vehicle 10 is charging, regardless of key switch status, and the state-of-charge of electric power source 60 is between a first threshold and a second threshold, then lighting controller 830 sequentially turns on and off each of zone Z1 820, zone Z2 822, and zone Z3 824 starting with zone Z3 824, followed by zone Z2 822, followed by zone Z1 820, and repeating. If electric vehicle 10 is charging, regardless of key switch status, and the state-of-charge of electric power source 60 is between the second threshold and a third threshold, then lighting controller 830 turns on zone Z3 824 and pulses zone Z2 822 and zone Z1 820 on and off. If electric vehicle 10 is charging, regardless of key switch status, and the state-of-charge of electric power source 60 is between the third threshold and a fourth threshold, then lighting controller 830 turns on zone Z3 824 and zone Z2 822 and pulses zone Z1 820 on and off. Exemplary thresholds include 0% for the first threshold, 33% for the second threshold, 66% for the third threshold, and 100% for the fourth threshold. When the state-of-charge of electric power source 60 reaches the fourth threshold, each of zone Z1 820, zone Z2 822, and zone Z3 824 are turned on and left on if the key switch status is on and are turned on for a first time period and then turned off if the key switch status is off. An exemplary time period is five minutes.

Although light bar 810 is positioned on front side 802 of electric vehicle 10, light bar 810 or other indicator lights may be place on one or more of rear side 800 (such as tailgate), left side 804, and right side 806. Further, light bar 810 or other indicator lights may be place on roll cage 110.

Figure 21:
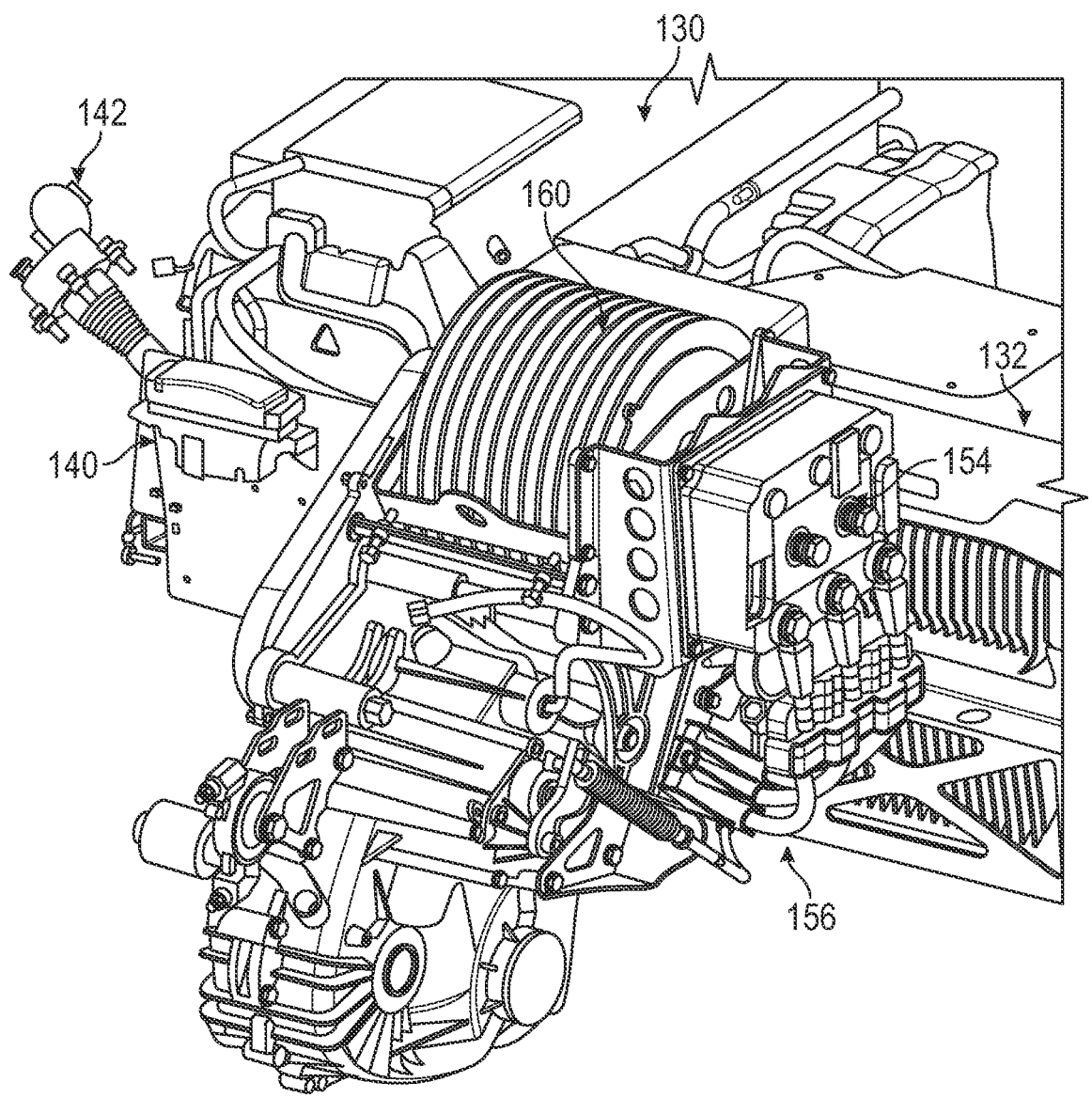
FIG. 21 illustrates a right rear perspective view of various components of the electric powertrain as positioned in FIG. 19.

Returning to FIG. 19, high voltage control system 122 includes a first battery controller 150 and a second battery controller 152 which connect battery pack 130 and battery pack 132 to a motor controller 154 through a plurality of high voltage cables 156 (see FIG. 21). First battery controller 150 and second battery controller 152 include contactors and control when each of battery pack 130 and battery pack 132 are connected to motor controller 154. Although described as including first battery controller 150 and second battery controller 152, in other examples, electric power train 120 may include a plurality of battery controllers, e.g., each battery controller associated with one or more respective battery packs. Motor controller 154 includes an inverter and associated circuitry to regulate the level of electrical power provided to electric motor 160 which is coupled to motor controller 154 through high voltage cables 156. In some examples, motor control 154 may be mounted to a unit carrying electric motor 160 and/or transmission 168.

Figure 23:
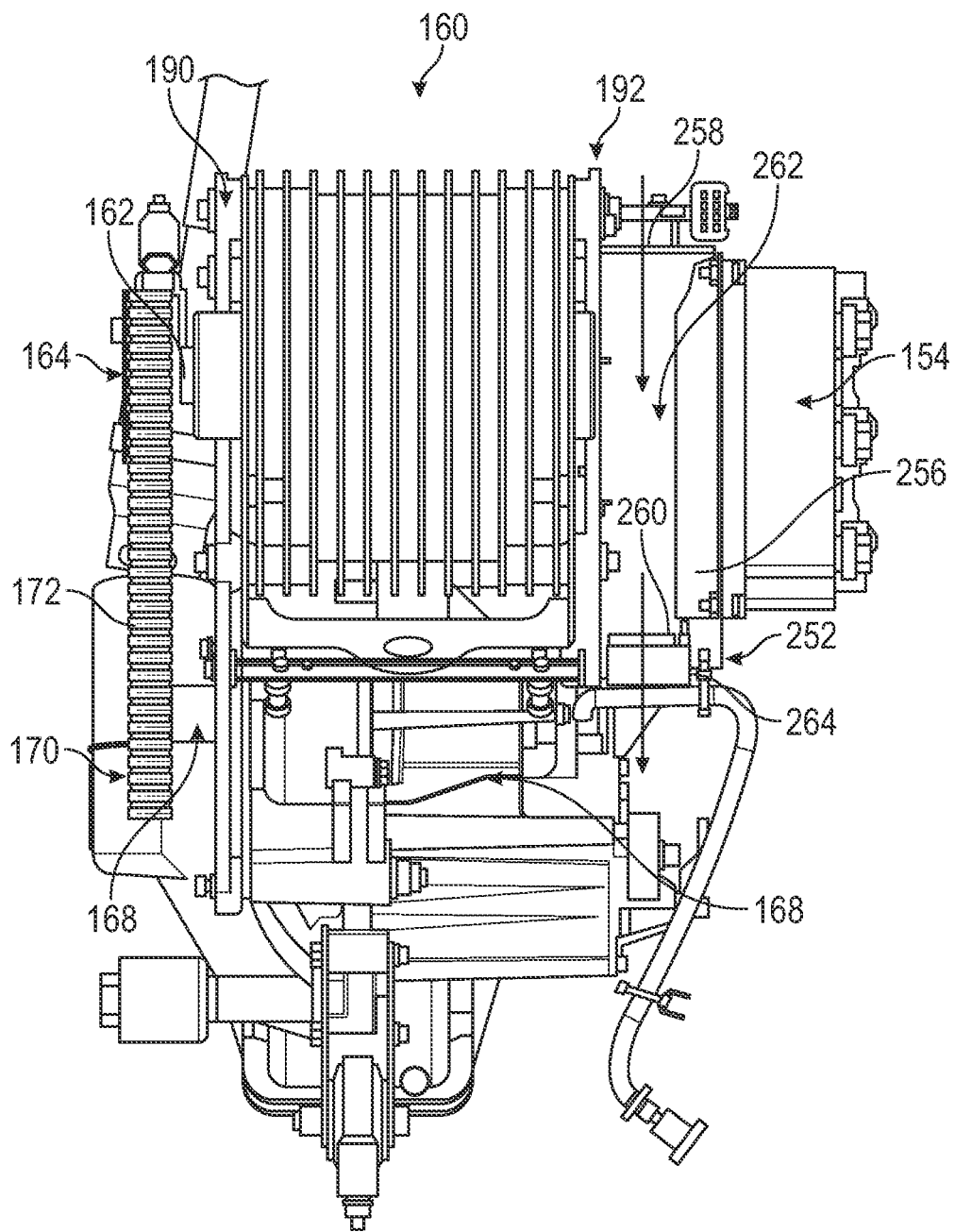
FIG. 23 illustrates a top view of various components of the electric powertrain as positioned in FIG. 22 with an air-cooled system for cooling the inverter and motor controller of the electric powertrain.
Figure 25A:
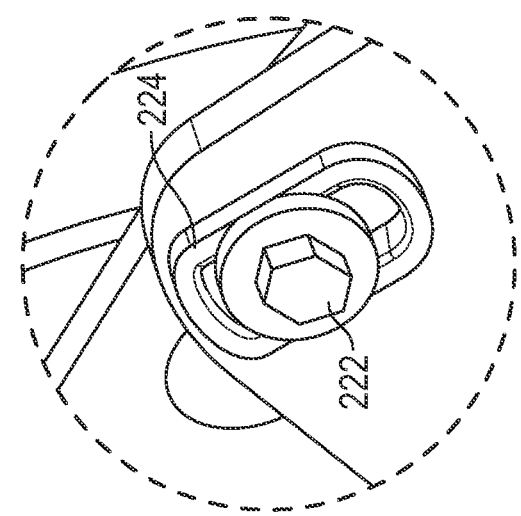
FIG. 25A illustrates a detail view of a coupling of FIG. 25.
Figure 25:
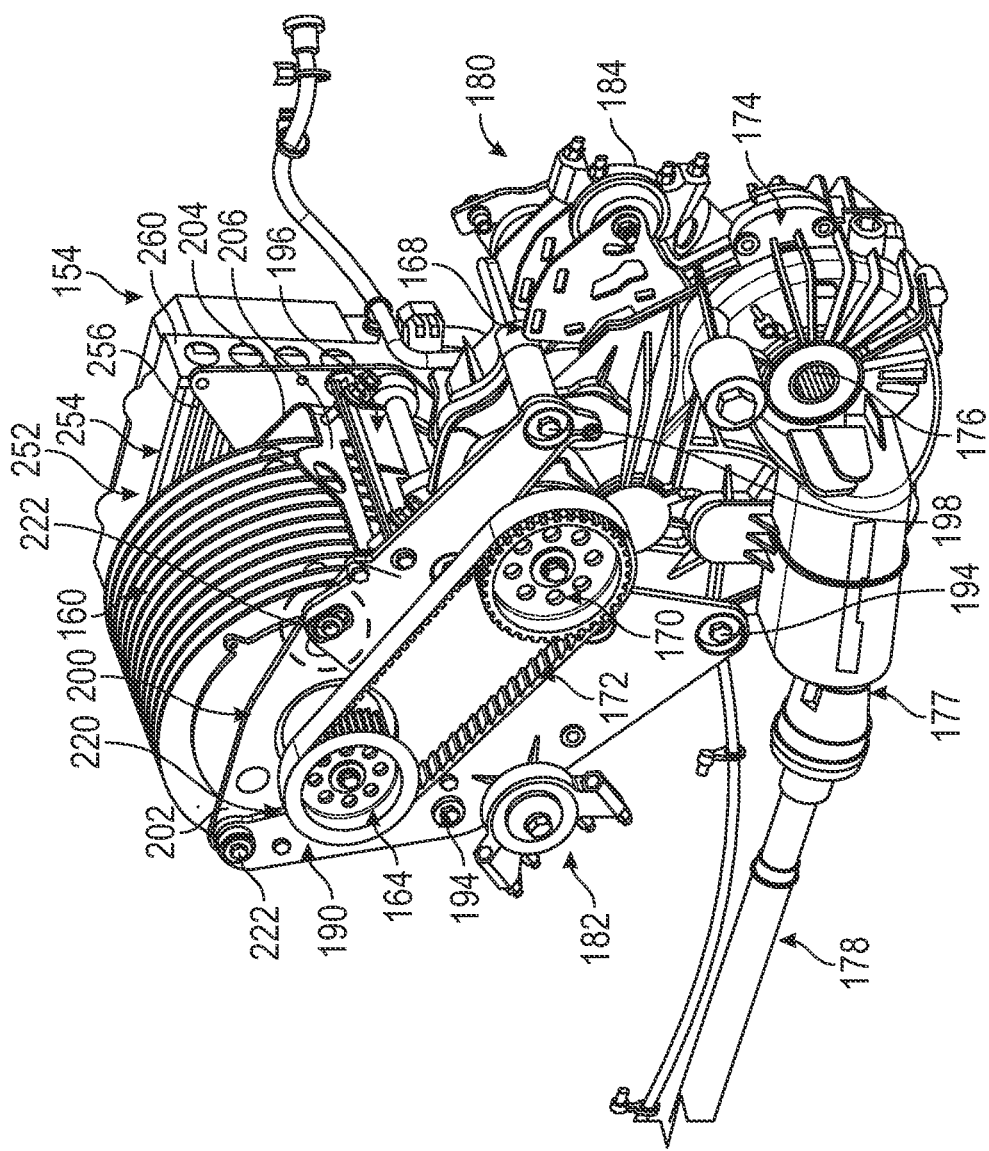
FIG. 25 illustrates a left rear perspective view of various components of the electric powertrain as positioned in FIG. 21.

Referring to FIG. 23, an output shaft 162 of electric motor 160 carries a first drive pulley 164 (see FIG. 25). An input shaft 166 of a transmission 168 carries a second drive pulley 170 (see FIG. 25). First drive pulley 164 is operatively coupled to second drive pulley 170 through a flexible endless coupler, illustratively a belt 172. As shown in FIG. 25, each of first drive pulley 164, second drive pulley 170, and belt 172 include laterally extending ribs which interleave to reduce slippage of belt 172 relative to either of first drive pulley 164 and second drive pulley 170.

Transmission 168 includes an integrated rear drive 174 having an output coupling 176. Integrated rear drive 174 is operatively coupled to rear wheels 16 through half shafts 178 (see FIG. 4). Transmission 168 further includes an output coupling 177 which is operatively coupled to front drive 64 through prop shaft 178 (see FIG. 45).

Figure 31:
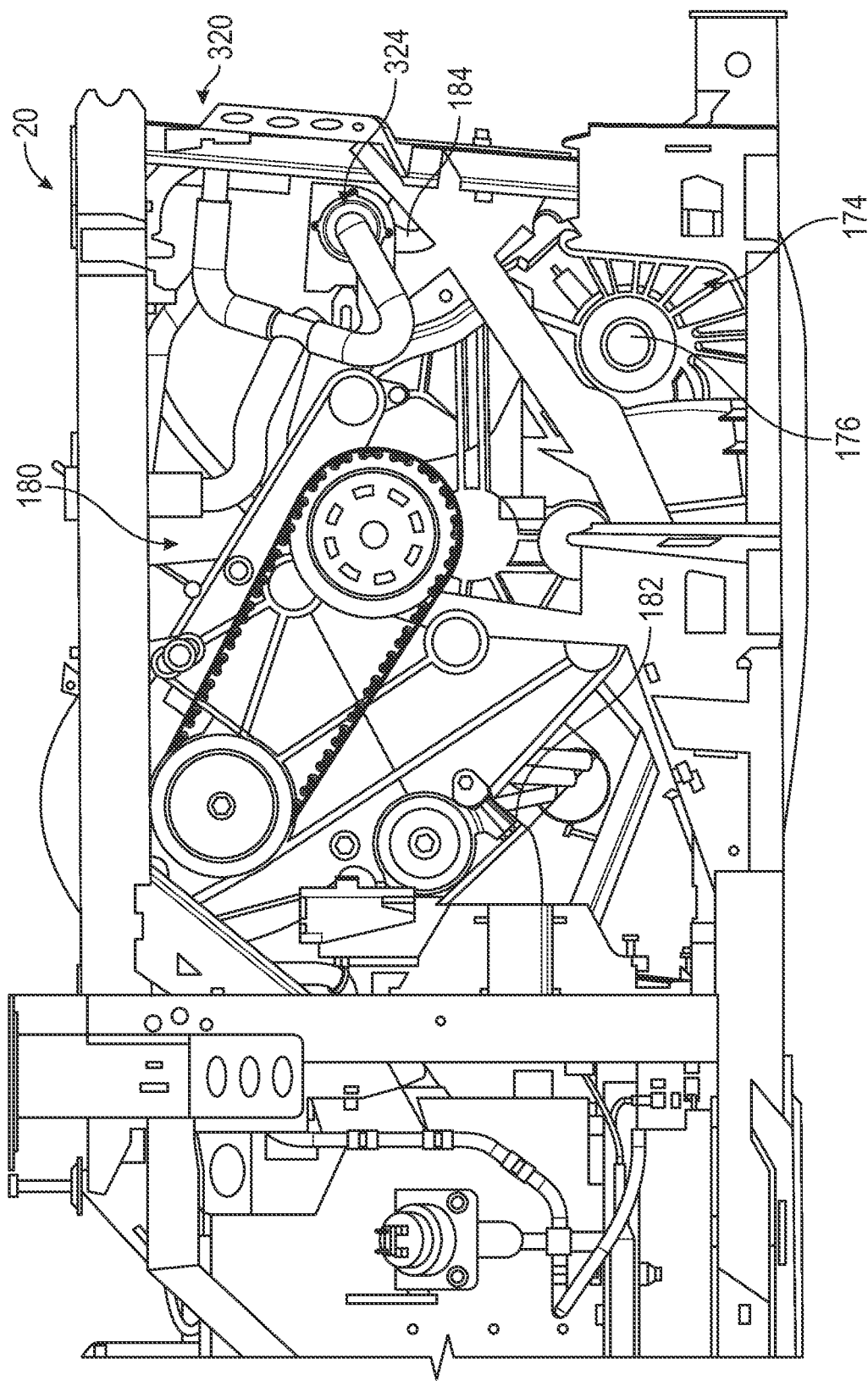
FIG. 31 illustrates various components of the electric powertrain as positioned in FIG. 22 with the liquid-cooled system of FIGS. 28 and 29 positioned in the frame of the exemplary recreational vehicle of FIG. 1.
Figure 32:
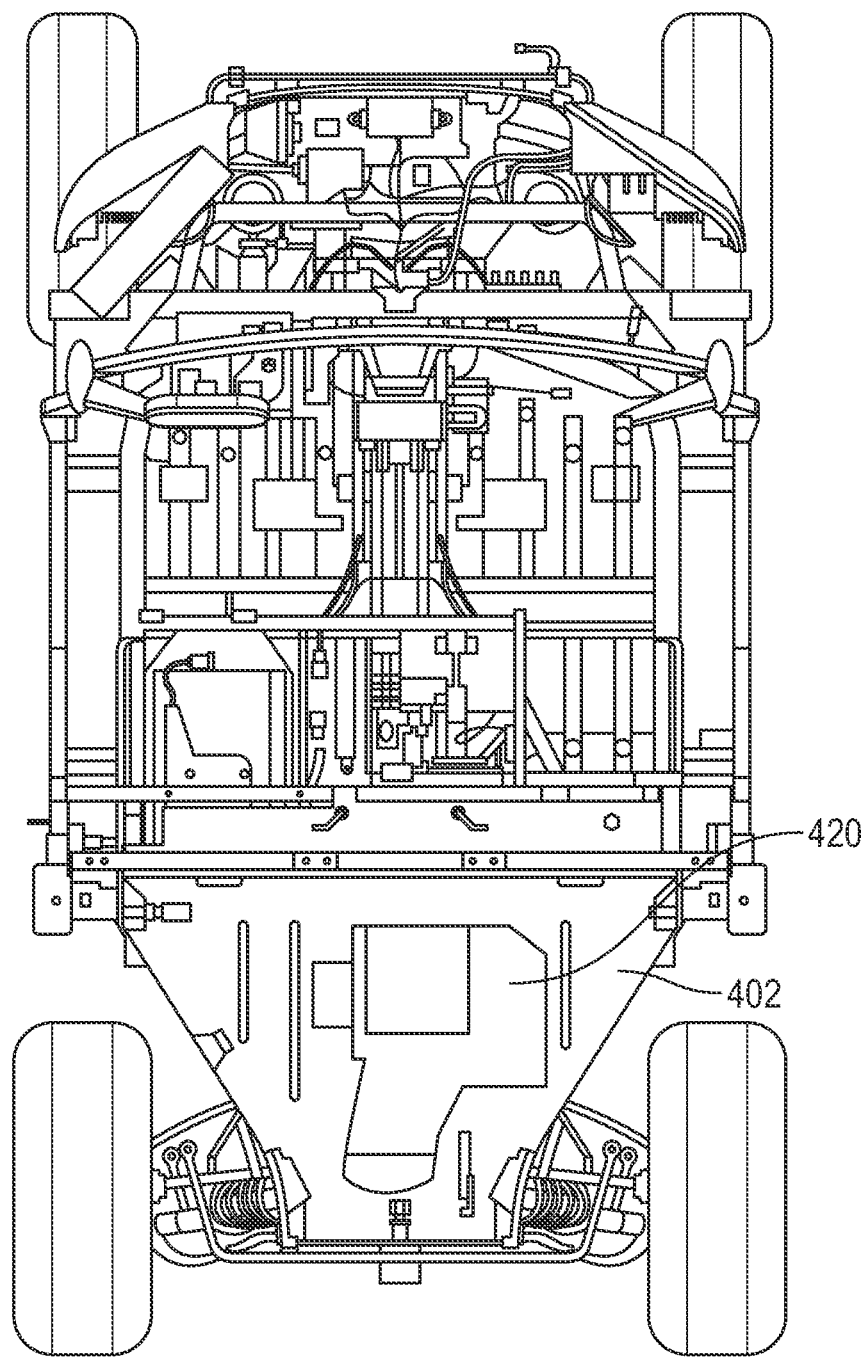
FIG. 32 illustrates a top view of the exemplary recreational vehicle of FIG. 1 with the roll cage, seats, floor panels, and body panels removed.

As shown in FIG. 25, electric motor 160 and transmission 168 are coupled together as a unit 180. Unit 180 is coupled to frame assembly 20 through a pair of front mounts 182 (a left side front mount shown in FIG. 25) and a rear mount 184. Unit 180 is supported by front mounts 182 and suspended from rear mount 184. FIG. 31 illustrates unit 180 mounted to frame assembly 20 through front mounts 182 and rear mount 184.

Figure 24:
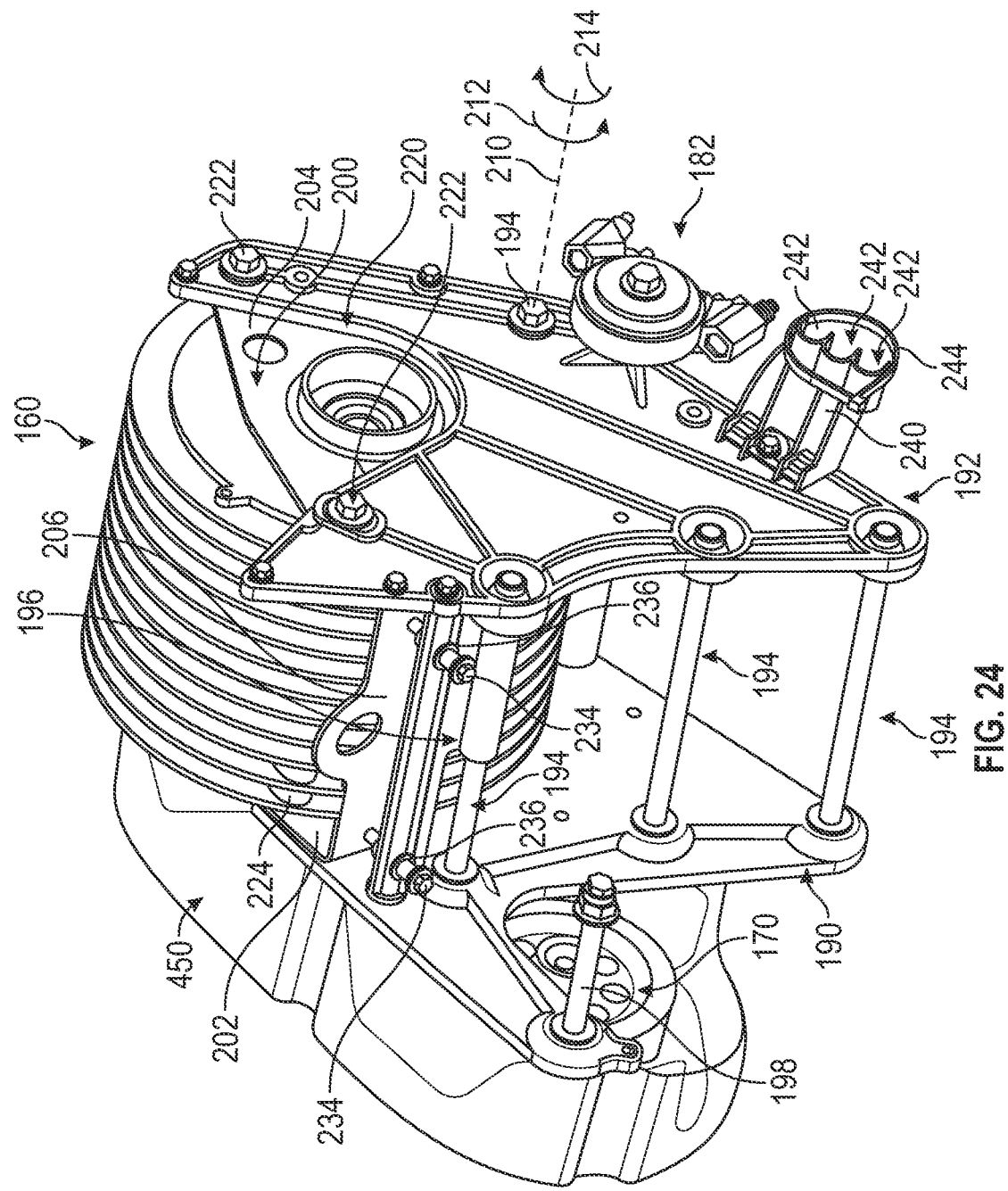
FIG. 24 illustrates a right rear perspective view of various components of the electric powertrain as positioned in FIG. 23 with the inverter, motor controller, and associated bracket removed.
Figure 27:
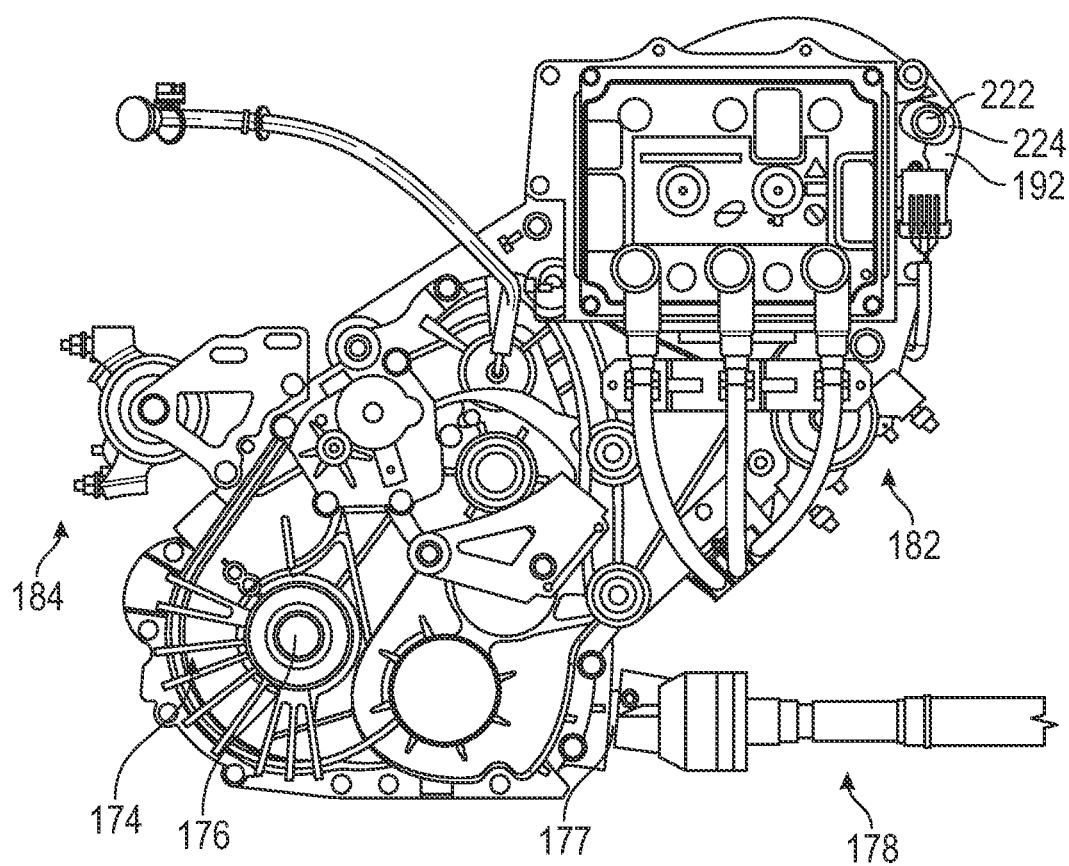
FIG. 27 illustrates a right side view of various components of the electric powertrain as positioned in FIG. 21.

Referring to FIG. 24, unit 180 includes a left side frame member 190 and a right side frame member 192. Right side frame member 192 is coupled to left side frame member 190 through a plurality of couplers 194 and a tension adjuster support bracket 196 further discussed herein. As shown in FIGS. 25 and 27, the two lower rear couplers 194 couple transmission 168 to left side frame member 190 and right side frame member 192. Further, a stub coupler 198 also couples transmission 168 to left side frame member 190.

Returning to FIG. 24, electric motor 160 is carried by a cradle 200. Cradle 200 includes a left side portion 202, a right side portion 204, and an interconnecting rear portion 206. Lower front coupler 194 proximate front mount 182 couples cradle 200 to left side frame member 190 and right side frame member 192. Cradle 200 is rotatable relative to left side frame member 190 and right side frame member 192 about axis 210 of lower front coupler 194 in directions 212 and 214. In embodiments, lower front coupler 194 passes through openings in both cradle 200 and electric motor 160. As cradle is moved in one of directions 212, 214 about axis 210, electric motor 160 also moves in one of directions 212, 214 about axis 210 with cradle 200.

As shown in FIGS. 24 and 25, each of left side frame member 190 and right side frame member 192 includes recesses 220 to permit the rotation of electric motor 160 relative to left side frame member 190 and right side frame member 192. Further, a plurality of couplers 222 further couple electric motor 160 to each of left side frame member 190 and right side frame member 192 to prevent rotation of electric motor 160 relative to left side frame member 190 and right side frame member 192. Each coupler 222 is received in a threaded boss 224 of electric motor 160 (see FIG. 24). Referring to FIG. 25A, an opening 224 in left side frame member 190 which receives couplers 222 is elongated to permit, when coupler 222 is loosened, electric motor 160 and cradle 200 to rotate as a unit about 210 (see FIG. 24).

Figure 26:
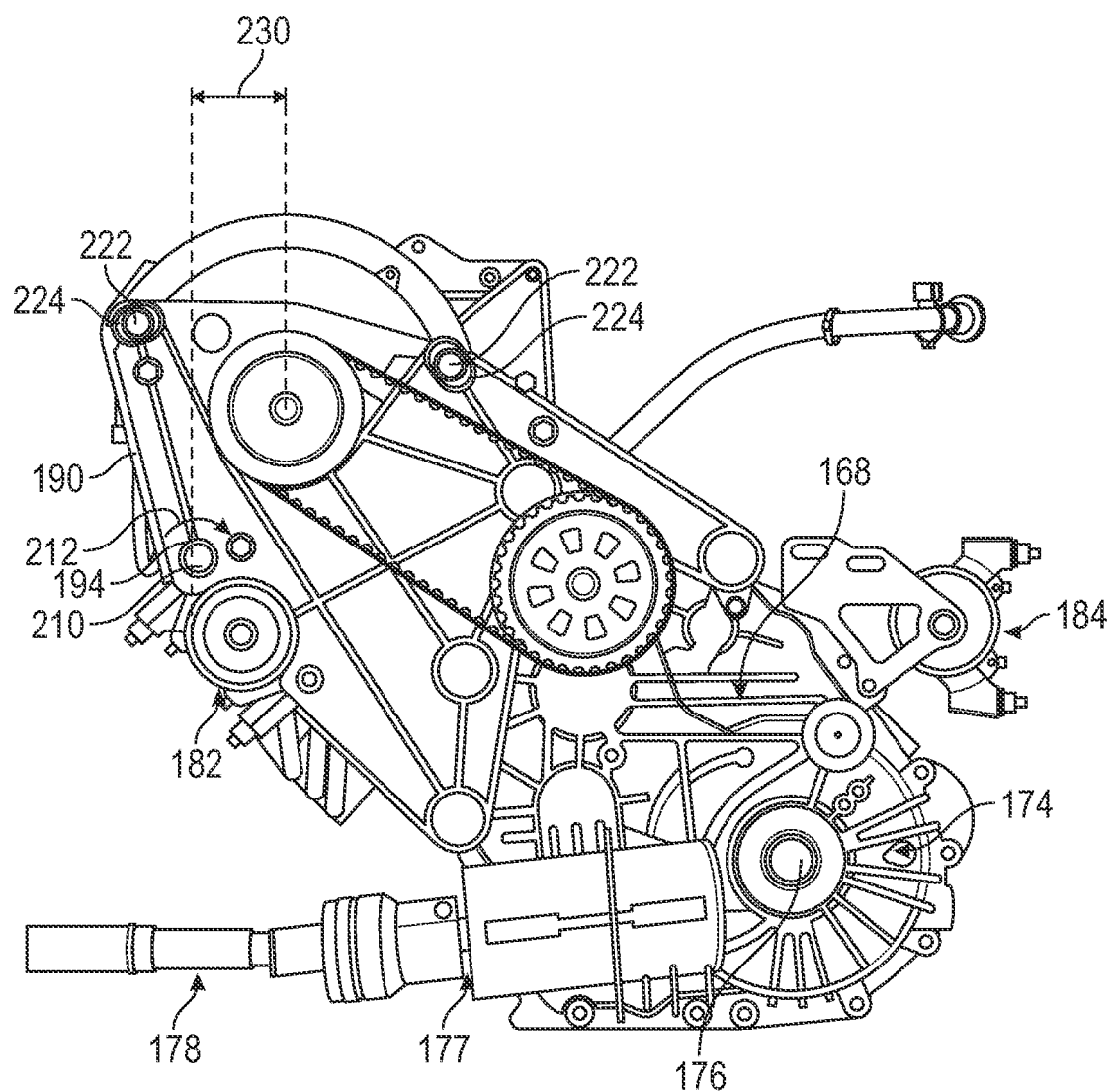
FIG. 26 illustrates a left side view of various components of the electric powertrain as positioned in FIG. 21.

Referring to FIG. 26, the rotational center of electric motor 160 is rearward of axis 210 of couplers 194 by a distance 230. This positioning urges electric motor 160 to rotate rearward in direction 212 when couplers 222 are loosened. Referring to FIG. 24, the rotation of cradle 200 and electric motor 160 in direction 212 is limited by tensioners 234 which extend from tension adjuster support bracket 196 and contact interconnecting rear portion 206 of cradle 200. In the illustrated embodiment, tensioners 234 are threaded bolts which are threadably received in apertures of tension adjuster support bracket 196. The position of tensioners 234 relative to tension adjuster support bracket 196 is held by locking nuts 236.

In operation, the tension on belt 172 due to the spacing between the rotational center of first drive pulley 164 (the output shaft of electric motor 160) and the rotational center of second drive pulley 170 (the input shaft of transmission 168) may be adjusted in the following manner. Couplers 222 are loosened on both left side frame member 190 and right side frame member 192. Tensioners 234 are adjusted relative to tension adjuster support bracket 196 towards the front of electric vehicle 10 to rotate cradle 200 and electric motor 160 in direction 214 to increase the spacing between the rotational center of first drive pulley 164 (the output shaft of electric motor 160) and the rotational center of second drive pulley 170 (the input shaft of transmission 168) and hence increase the tension on belt 172. In a similar manner, tensioners 234 are adjusted relative to tension adjuster support bracket 196 towards the rear of electric vehicle 10 to rotate cradle 200 and electric motor 160 in direction 212 to decrease the spacing between the rotational center of first drive pulley 164 (the output shaft of electric motor 160) and the rotational center of second drive pulley 170 (the input shaft of transmission 168) and hence decrease the tension on belt 172. Once in the desired position, locking nuts 236 are tightened to hold tensioners 234 in place.

Figure 22:
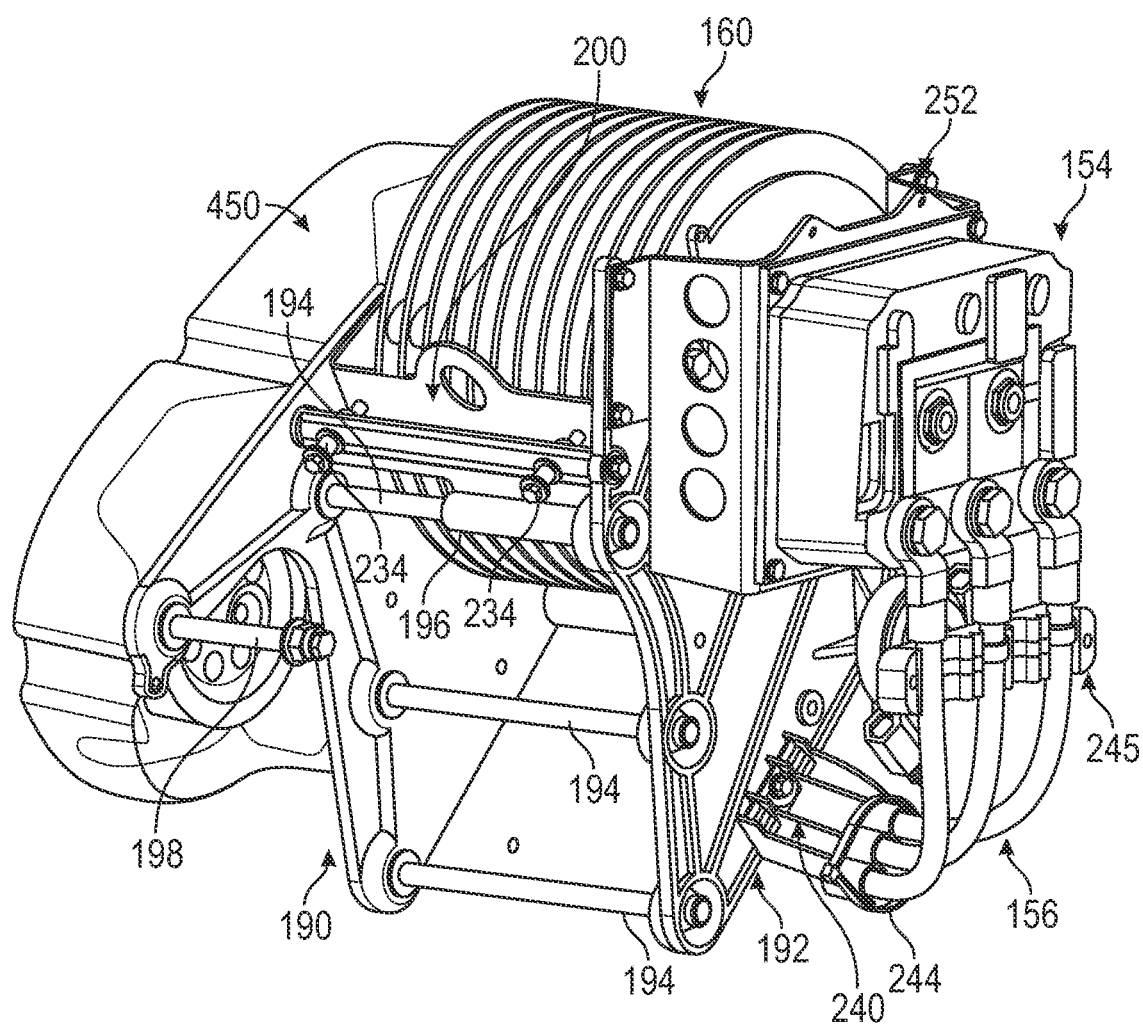
FIG. 22 illustrates a right rear perspective view of various components of the electric powertrain as positioned in FIG. 19 with the transmission and rear drive removed.

Referring to FIGS. 22 and 24, a cable holder 240 is coupled to right side frame member 192. Cable holder 240 includes a plurality of receivers 242 in which respective high voltage cables 156 are positioned. High voltage cables 156 are held in receivers 242 with a fastener, illustratively a zip-tie 244. In some examples, a cable harness 245 may be configured to retain and/or align cables 156. For example, during installation and/or operation, cable harness 245 may support cables 156 in a selected spacing and/or orientation.

Referring to FIG. 23, an exemplary air-cooled system 250 for motor controller 154 is represented. Motor controller 154 is coupled to right side frame member 192 through a U-shaped bracket 252 (see FIG. 22). Bracket 252 includes an opening 254 (see FIG. 25) through which a rear portion 256 of motor controller 154 extends. Similarly, a front wall 258 and a rear wall 260 of bracket 252 includes openings (see FIG. 25). Front wall 258 and rear wall 260 define an air channel 262 between right side frame member 192 and rear portion 256 of motor controller 154. Air is pulled through air channel 262 in the direction indicated by the arrows in FIG. 23 by one or more fans 264 positioned adjacent to rear wall 260 of bracket 252. The flow of air removes heat from rear portion 256 of motor controller 154. In embodiments, rear portion 256 of motor controller 154 includes heat sink fins to increase the surface area of rear portion 256 contacted by the cooling air.

Figure 28:
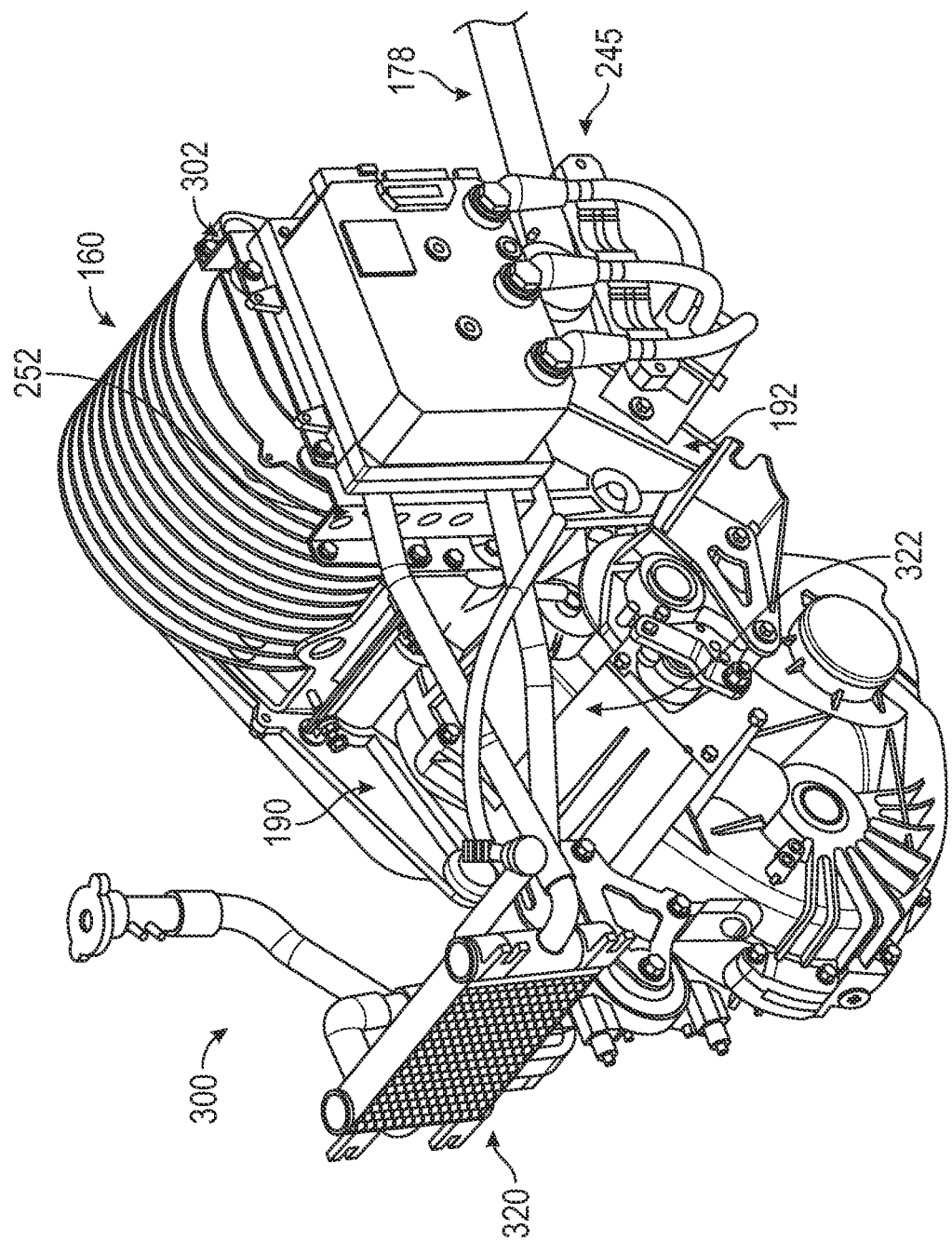
FIG. 28 illustrates a right rear perspective view of various components of the electric powertrain as positioned in FIG. 22 with a liquid-cooled system for cooling the inverter and motor controller of the electric powertrain.
Figure 29:
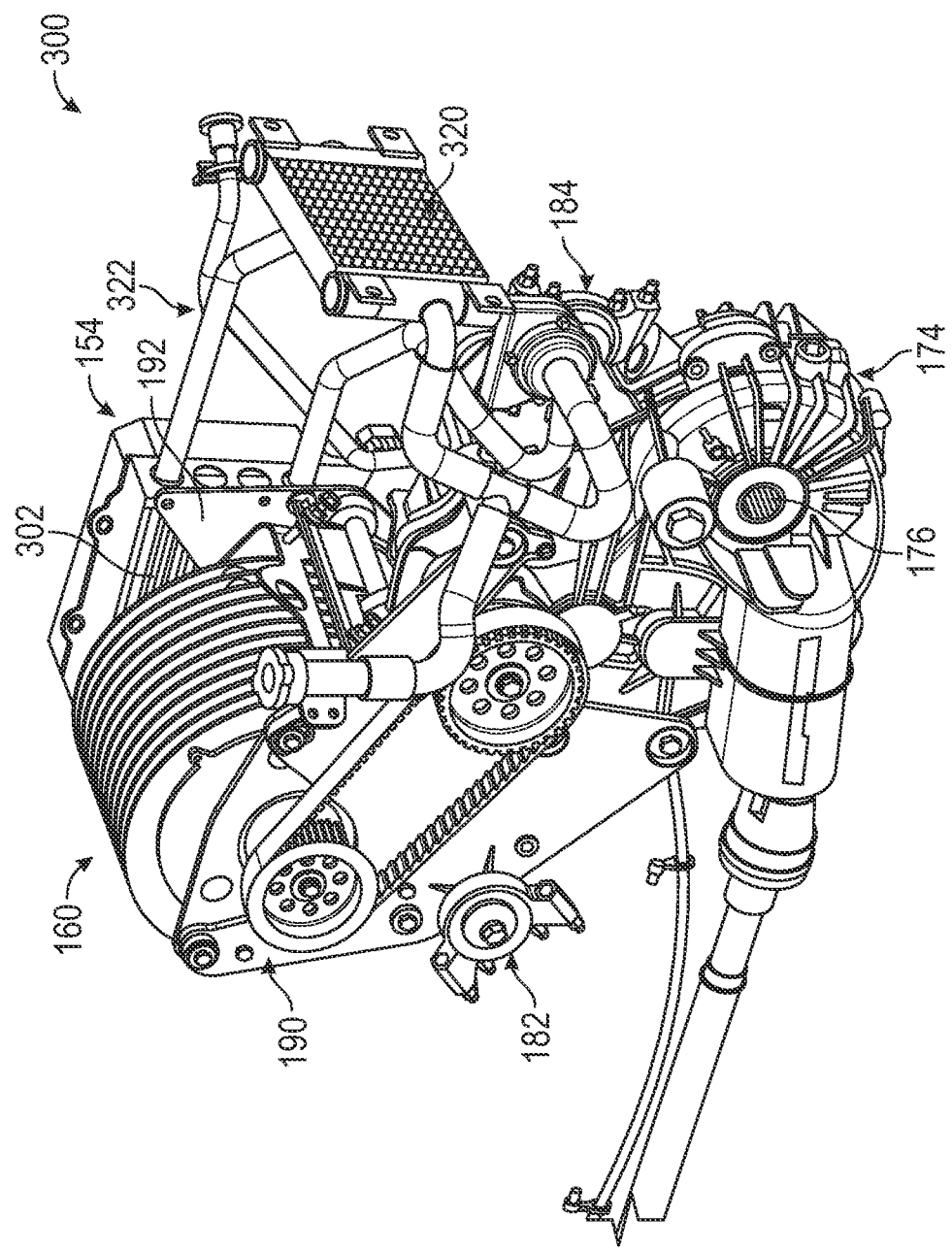
FIG. 29 illustrates a left rear perspective view of various components of the electric powertrain as positioned in FIG. 22 with a liquid-cooled system for cooling the inverter and motor controller of the electric powertrain
Figure 30:
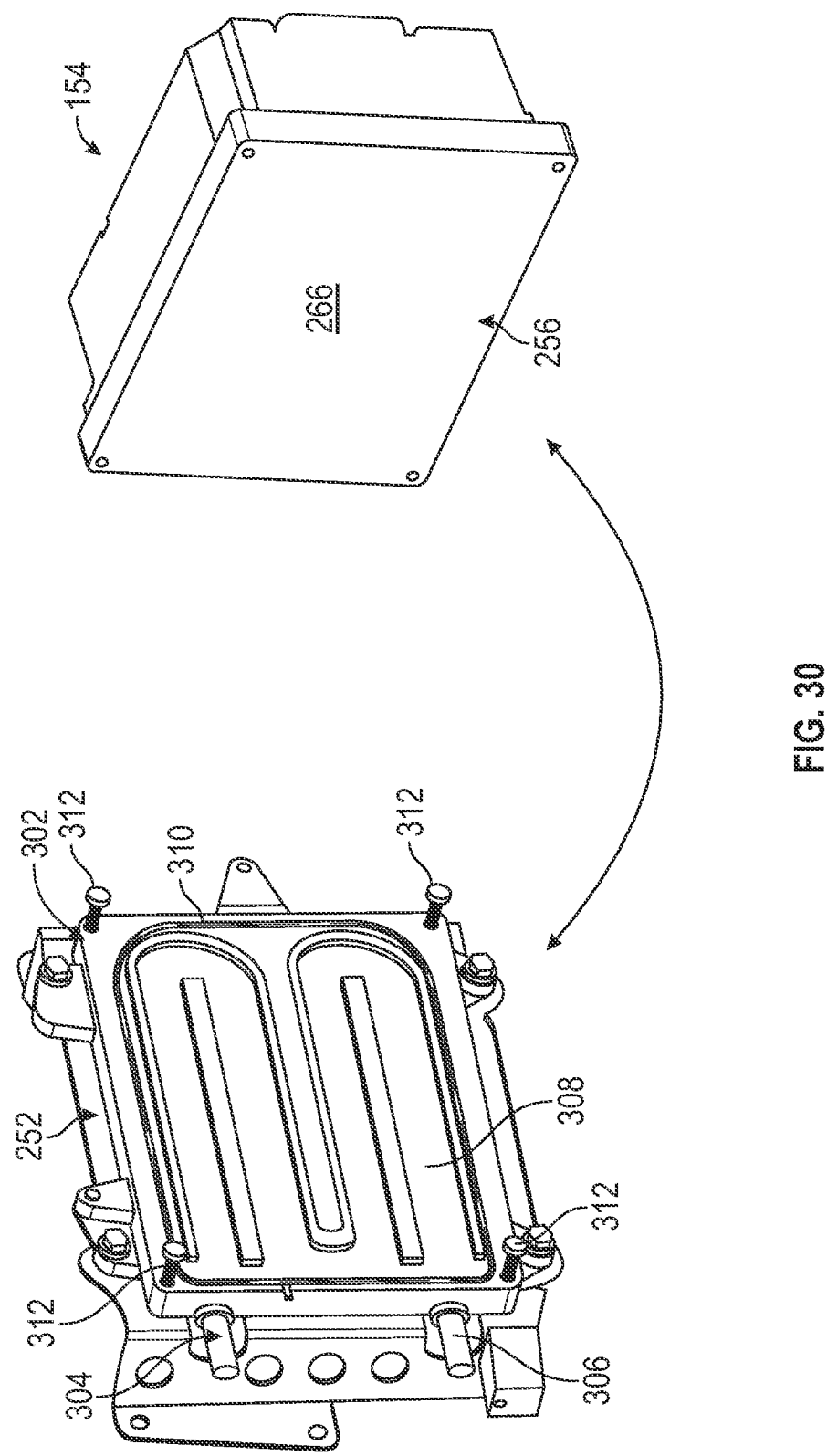
FIG. 30 illustrates components of the liquid-cooled system of FIGS. 28 and 29.

Referring to FIGS. 28-30, an exemplary liquid-cooled system 300 for motor controller 154 is represented. Referring to FIG. 30, a cooling plate 302 is coupled to U-shaped bracket 252 which illustratively has a flat rear surface 266. Cooling plate 302 includes a liquid fluid inlet 304, a liquid fluid outlet 306, and a serpentine fluid flow channel 308 connecting liquid fluid inlet 304 and liquid fluid outlet 306. Flat rear surface 266 of rear portion 256 of motor controller 154 forms a surface of serpentine fluid flow channel 308 and a seal 310 seals the connection between cooling plate 302 and rear portion 256 of motor controller 154 when rear portion 256 of motor controller 154 is coupled to cooling plate 302 with fasteners 312.

Referring to FIGS. 28 and 29, cooling plate 302 is coupled to an air-cooled radiator 320 through a coolant circuit 322 comprised of a plurality of hoses. A fluid pump 324 is also connected to coolant circuit 322 to pump the liquid coolant around coolant circuit 322 and through cooling plate 302 and air-cooled radiator 320. The position of air-cooled radiator 320 is at a rear end of electric vehicle 10 behind output 176 of integrated rear drive 174.

Figure 43:
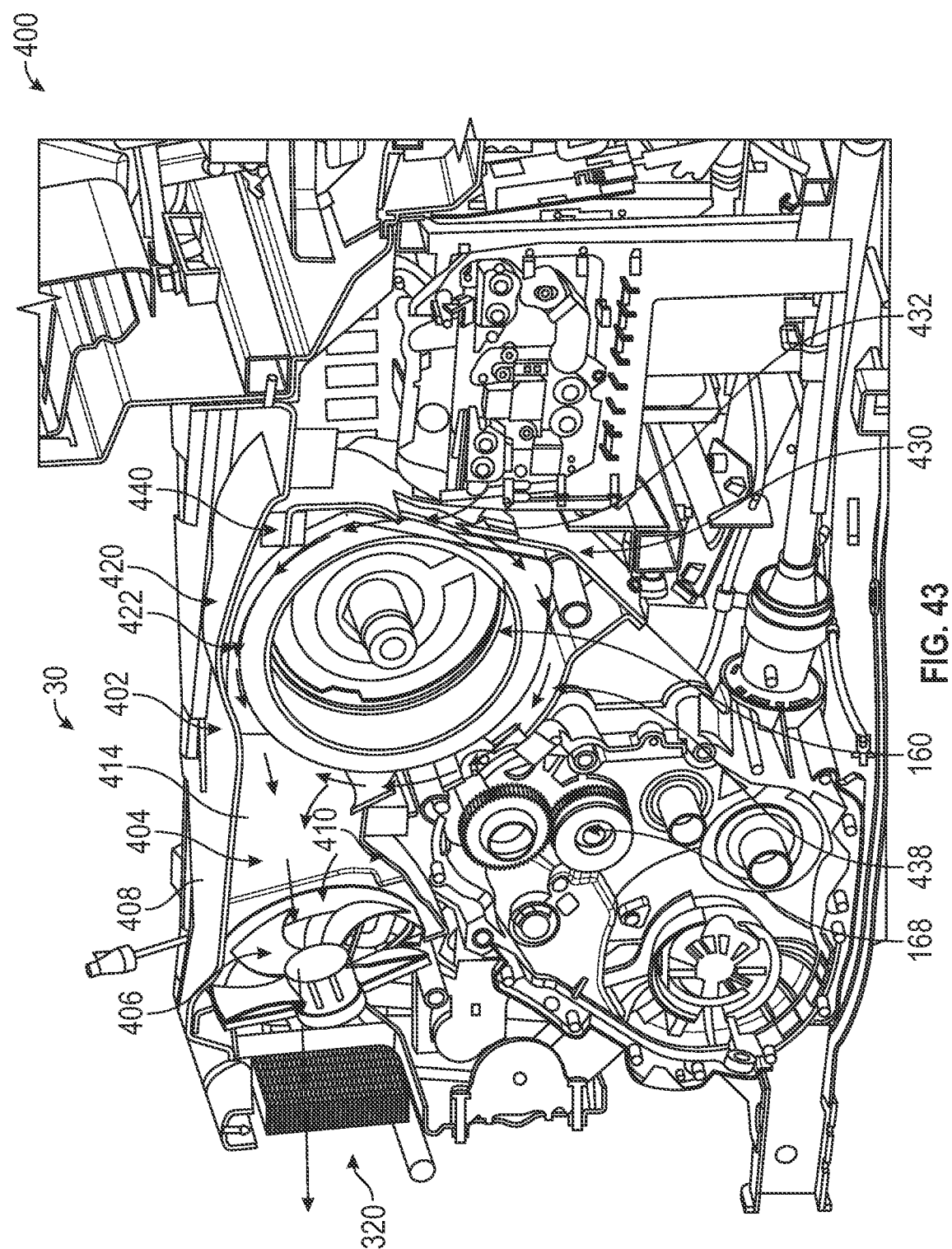
FIG. 43 illustrates a right front view of a sectional view along the longitudinal centerline of the exemplary vehicle of FIG. 1 illustrates components of the air-cooled system for the electric motor of the powertrain.
Figure 44:
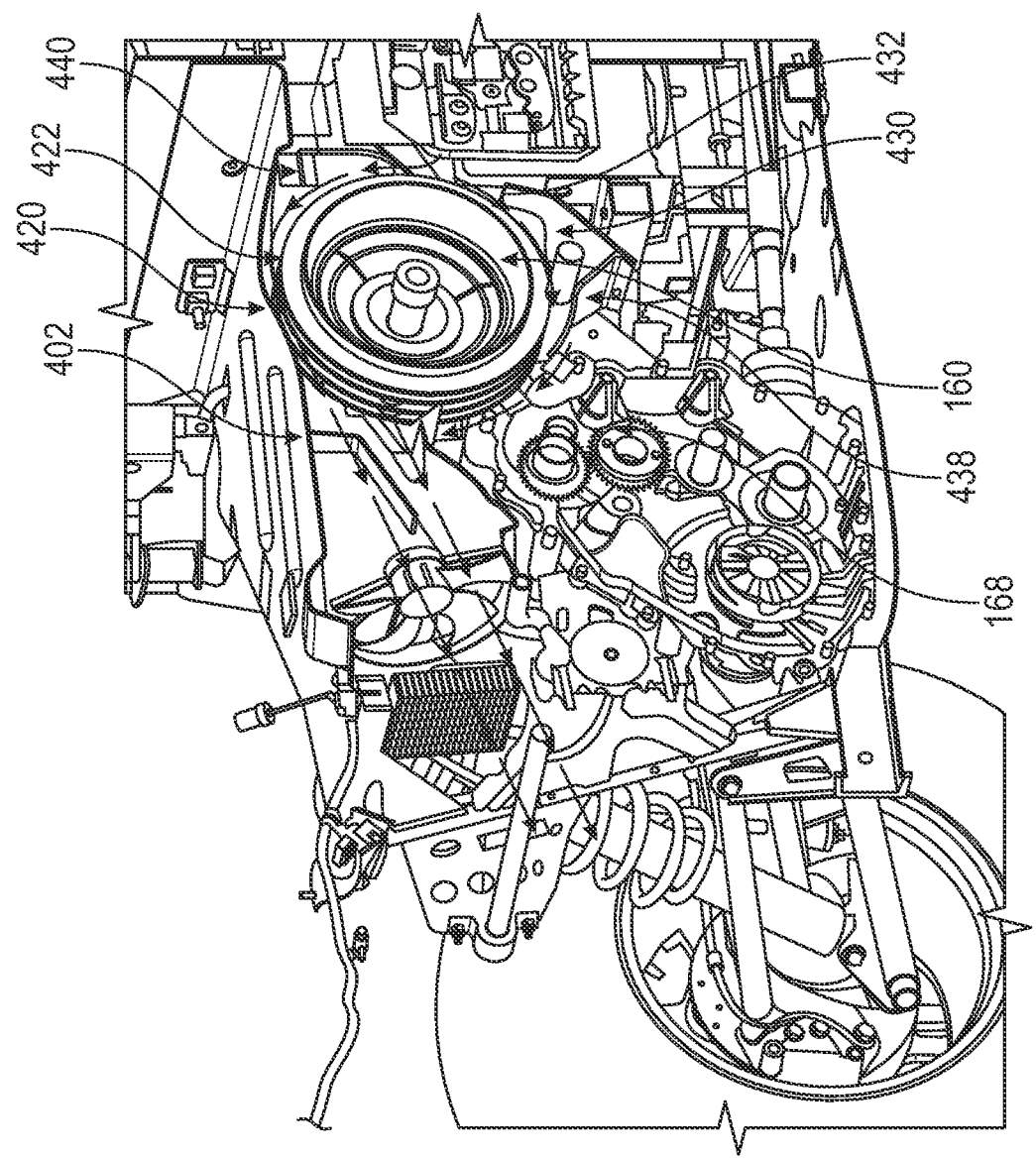
FIG. 44 illustrates a right rear view of a sectional view along the longitudinal centerline of the exemplary vehicle of FIG. 1 illustrates components of the air-cooled system for the electric motor of the powertrain.

Referring to FIGS. 43 and 44, an air-cooled system 400 for cooling electric motor 160 is shown. Shrouding assembly 30 of electric vehicle 10 forms part of air-cooled system 400. Referring to FIG. 43, a top shroud panel 402 defines an air channel 404 rearward of electric motor 160 between an upper portion 408, a lower portion 410, and side portions 412 (see FIGS. 40) and 414. A fan 406 is disposed at a rear end of air channel 404.

Top shroud panel 402 further includes a bump out 420 to define an air channel 422 between a top side of electric motor 160 and top shroud panel 402. Air channel 422 is in fluid communication with air channel 404. Shrouding assembly 30 further includes a front shroud panel 430 positioned forward of electric motor 160 and a lower shroud panel 438 positioned below electric motor 160 and forward of transmission 168. Front shroud panel 430 includes an opening 432 which serves as a primary air inlet for air-cooled system 400. The pull of fan 406 and direction of air channel 404 towards an upper portion of electric motor 160 and the presence of lower shroud panel 438 of shrouding assembly 30 results in air entering opening 432 of front shroud panel 430 being moved through air channel 422 across a top of electric motor 160, into air channel 404, and through fan 406 towards air-cooled radiator 320 (see FIGS. 43 and 44) as indicated by the arrows. In some examples, the air also may flow below electric motor 160 in a channel defined by lower shroud panel 438 and electric motor 160.

Figure 40:
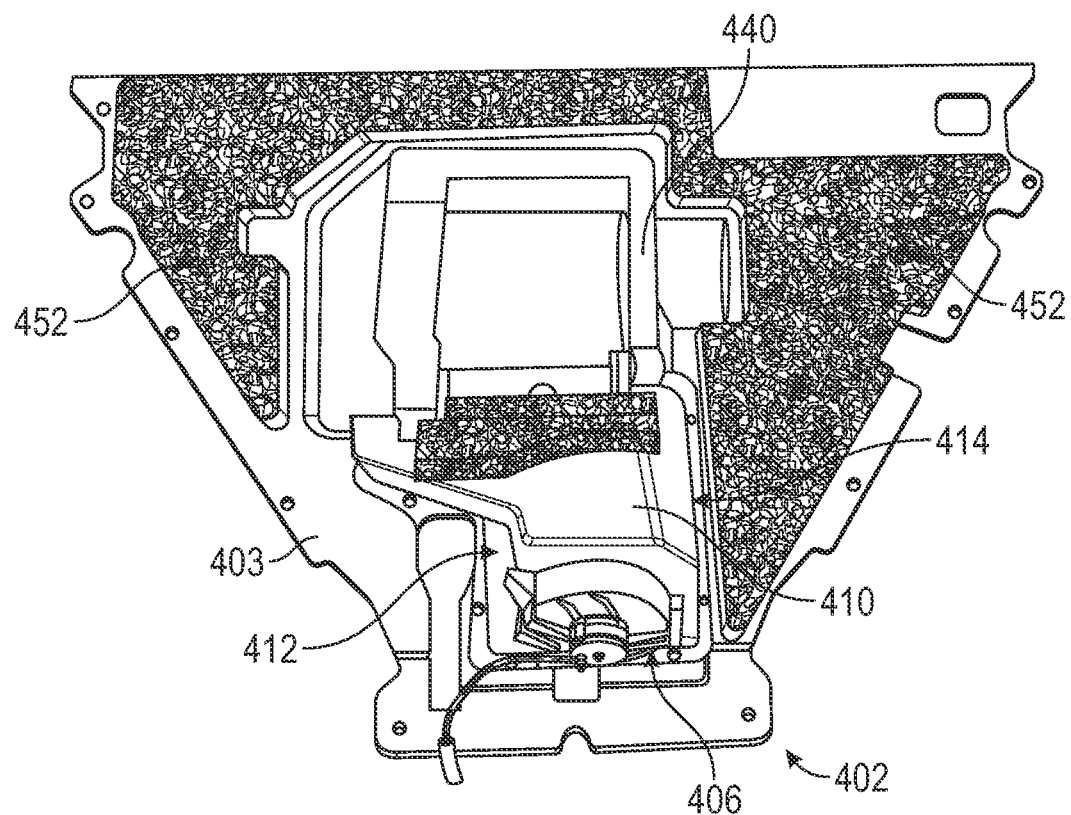
FIG. 40 illustrates an interior side view of the top shroud of the shrouding assembly of FIG. 39 including noise suppression material and a fluid conduit and fan of an air-cooled system for the electric motor of the powertrain.

To further enhance air flow, sealing material 440 is carried by top shroud panel 402 and positioned around the sides and front of electric motor 160 (see FIGS. 40, 43, and 44). Exemplary sealing material includes foam, rubber, and other suitable compliant materials. To further enhance cooling, electric motor 160 includes a plurality of heat sinks to increase the surface area contacted by air flow through air-cooled system 400.

This positioning of air-cooled radiator 320 permits air-cooled radiator 320 to be cooled by air exiting air-cooled system 400 through fan 406. Although the temperature of the air exiting air-cooled system 400 is likely at a temperature higher than the ambient air temperature, it likely remains at a temperature relative to the liquid coolant of liquid-cooled system 300 to remove sufficient heat to cool motor controller 154.

In some examples, air-cooled system 250 and/or liquid-cooled system 300 may include at least one controller configured to monitor a temperature of one or more portions of electric powertrain 120 and cause air-cooled system 250 and/or liquid-cooled system 300 to operate to maintain the temperature within a selected temperature range. The cooling system controller may be independent of other controls, such as first and second battery controllers 150 and 152. During operation, the cooling system controller, based on a monitored temperature of the electric power train, may control an operational state of fan 406 and/or fluid pump 324 (e.g., on/off state or motor speed). In some examples, the cooling system controller may operate with hysteresis. For example, the cooling system controller may determine selected temperature threshold (e.g., one or more bounds of a selected temperature range) based on a rate of change of the monitored temperature. In this way, the cooling system controller may operate using dynamic temperature thresholds. In some examples, the dynamic temperature thresholds may be based on a predicted state of electric powertrain 120, including, but not limited to, an increase motor output, a decreased motor output, an orientation of vehicle 100 (e.g., climbing or descending a slope), a change in steering input (e.g., coming out of a turn), or the other vehicle inputs that may change an output of electric powertrain 120.

In embodiments, a controller, such as an overall vehicle controller or high voltage control system 122, controls the operation of electric motor 62 and the cooling systems of electric vehicle 10, such as air-cooled system 400 and/or liquid-cooled system 300. Additionally, the controller may alter the operation of electric motor 62 and or the cooling systems based on various inputs including vehicle drive mode, vehicle ground speed, acceleration, historical driving information (vehicle speed over time, acceleration over time), motor current, braking events, motor temperature, and other suitable parameters. In embodiments, the controller selects a modulated drive profile for electric motor 62 based on one or more parameters to counter expected temperature rises, such as by motor 62, and thus a reduction in available torque. An advantage, among others, of selecting a modulated drive profile for electric motor 62 which derates the level of torque permitted by electric motor 62 is to increase the range of electric vehicle 10 and/or to maintain a "torque reserve" in needed to climb a hill.

Figure 59:
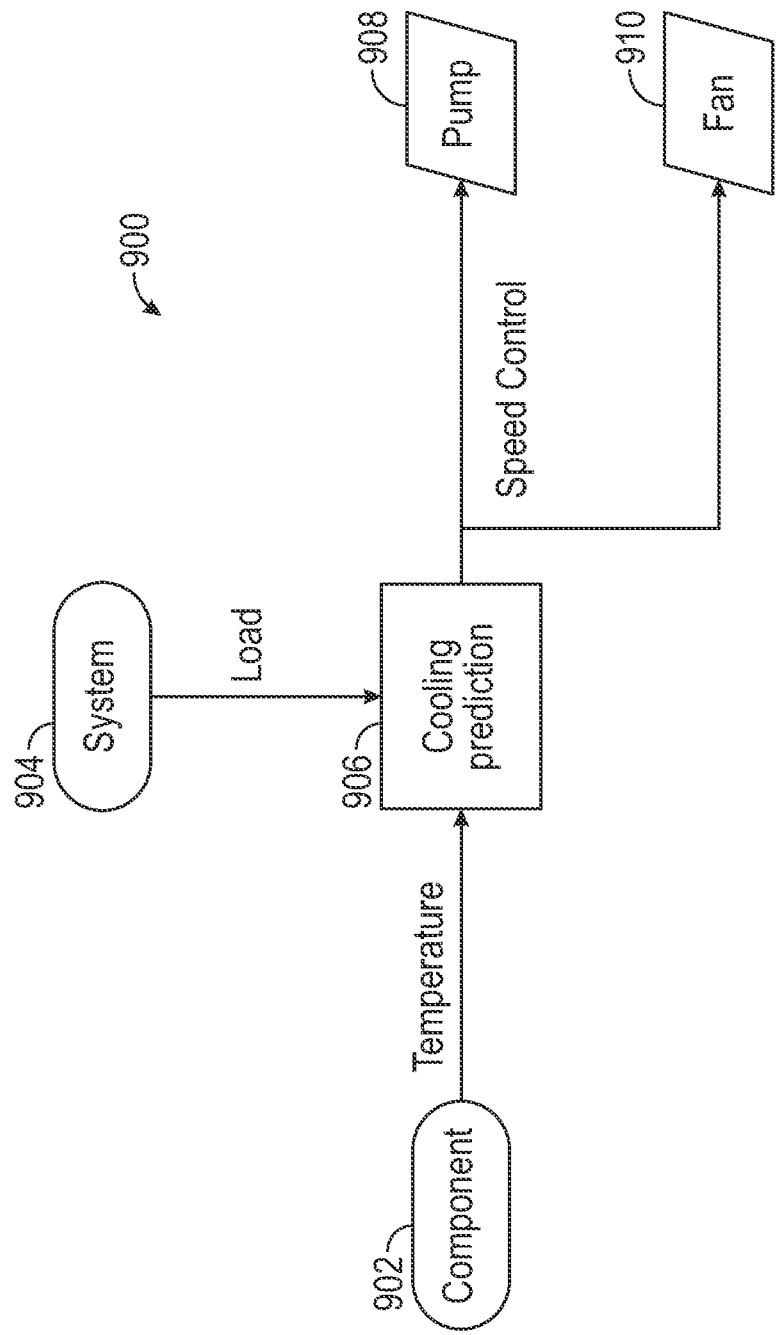
FIG. 59 is an exemplary processing sequence of a controller for an exemplary cooling system of the electric vehicle of FIG. 1.

In embodiments, the cooling systems of electric vehicle 10, such as air-cooled system 400 and/or liquid-cooled system 300, are controlled to anticipate heating of components, such as electric motor 62, which are subject to derating if overheated and to counter such heating prior to its occurrence. Referring to FIG. 59, a processing sequence 900 for the controller is shown. The controller monitors a current characteristic of a component being cooling by at least one of air-cooled system 400 and/or liquid-cooled system 300, as represented by block 902. In embodiments, the component is electric motor 62 and the characteristic is a temperature of electric motor 62. The controller further monitors a characteristic of a system of electric vehicle 10, as represented by block 904. In embodiments, the system is electric powertrain 120 and the characteristic is a load on the system. The load is a predictor of the temperature of electric motor 62. An exemplary load indicator is a phase current level of electric motor 62. Based on the current temperature of electric motor 62 and the load of electric powertrain 120, the controller predicts an expected temperature rise of electric motor 62, as represented by block 906, and adjusts the cooling system to counter the expected temperature rise. Exemplary adjusts include a speed control of fluid pump 324 (see FIG. 31) of liquid-cooled system 300, as represented by block 908, and a speed control of fan 406 (see FIG. 43) of air-cooled system 400, as represented by block 910.

Figure 60:
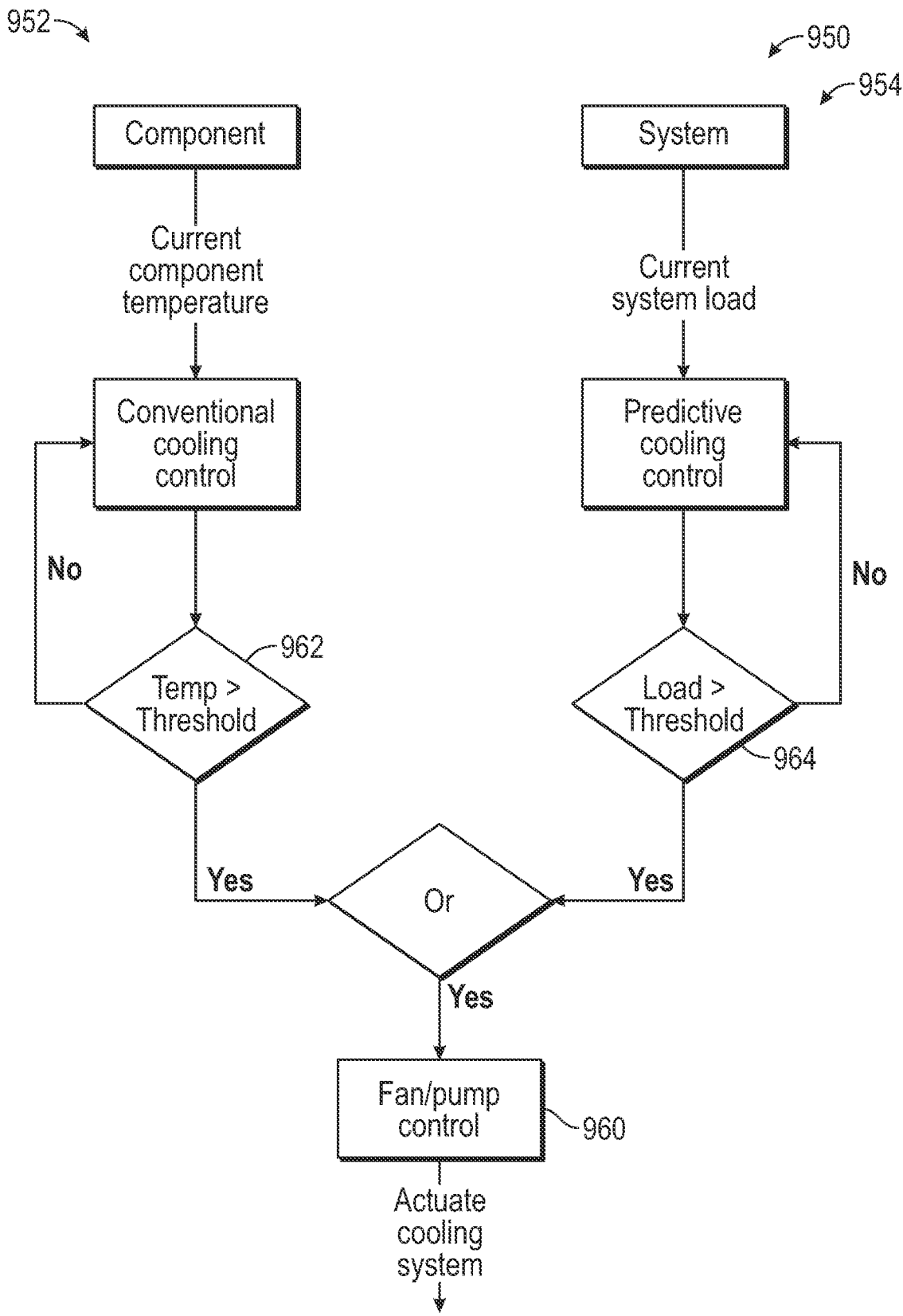
FIG. 60 is another exemplary processing sequence of a controller for an exemplary cooling system of the electric vehicle of FIG. 1.

Referring to FIG. 60, a processing sequence 950 for the controller is shown. The processing sequence has a conventional control 952 and a predictive control 954. If either of conventional control 952 or predictive control 954 detects a condition warranting a change in the cooling systems of electric vehicle 10, such as fan speed of air-cooled system 400 or pump speed of liquid-cooled system 300 then the controller makes the adjustment, as represented by block 960. The conventional control 952 is reactive and thus is slower to notice temperature increases while predictive control 954 anticipates temperature changes and is faster to act. An advantage, among others, of processing sequence 950 is that predictive control 954 may address expected temperature increases early and conventional control 952 can take over when system load reduces.

For conventional control 952, the controller monitors a temperature of a component being cooled and adjusts the cooling system of electric vehicle 10 when that monitored temperature exceeds a threshold, as represented by block 962. For predictive control 954, the controller monitors a load of the system, such as a phase current of electric motor 62, and adjusts the cooling system of electric vehicle 10 when that monitored load exceeds a threshold, as represented by block 962.

In embodiments, portions of the powertrain of electric vehicle 10 are positioned behind one or more shrouds of shrouding assembly 30. An advantage, among others, as mentioned herein of shrouding assembly 30 is noise suppression of noise from the powertrain to operator space 100. Further, additional portions of electric vehicle 10 include features to suppress noise from the powertrain to operator space 100.

Figure 41:
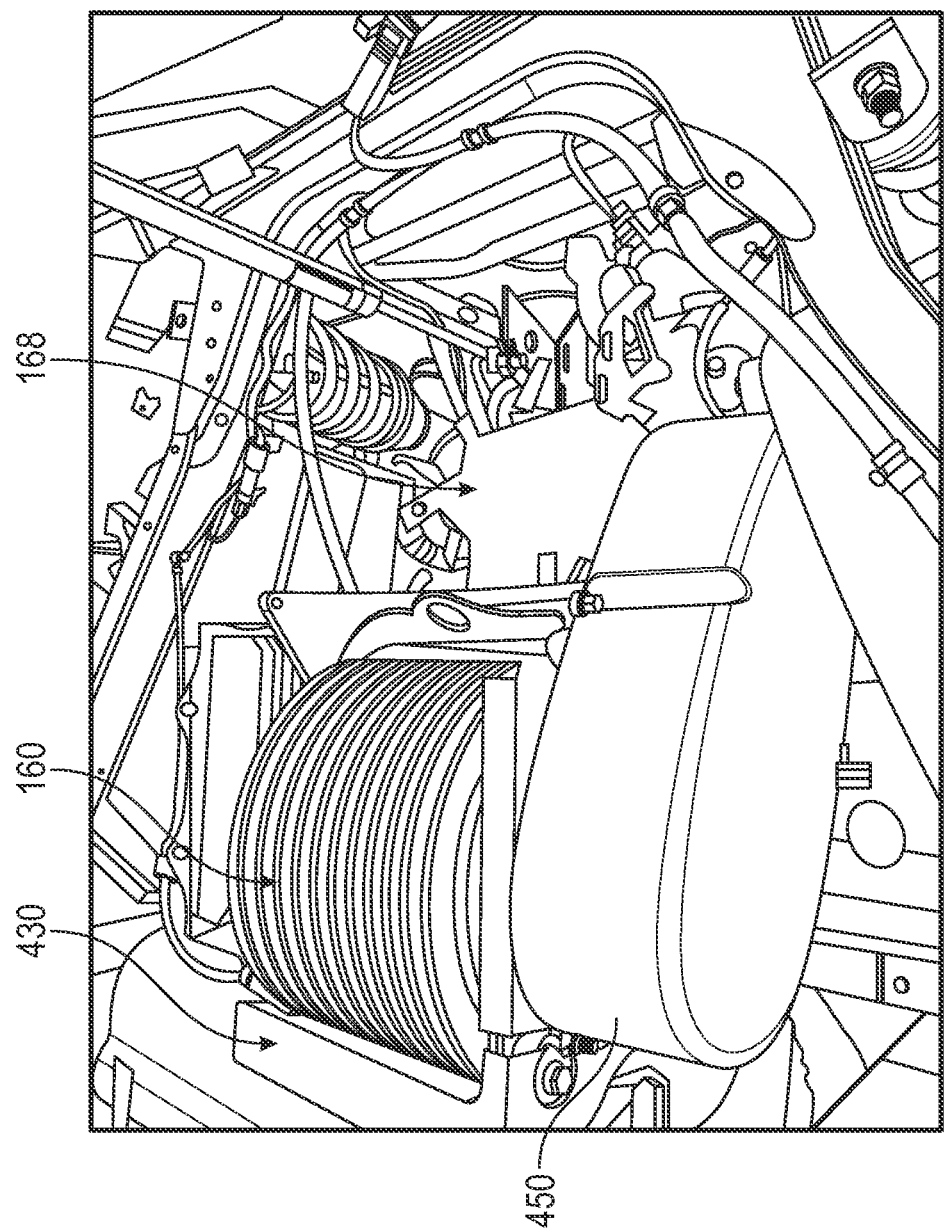
FIG. 41 illustrates a left side perspective view of various components of the electric powertrain with the top shroud of the shrouding assembly removed.
Figure 42:
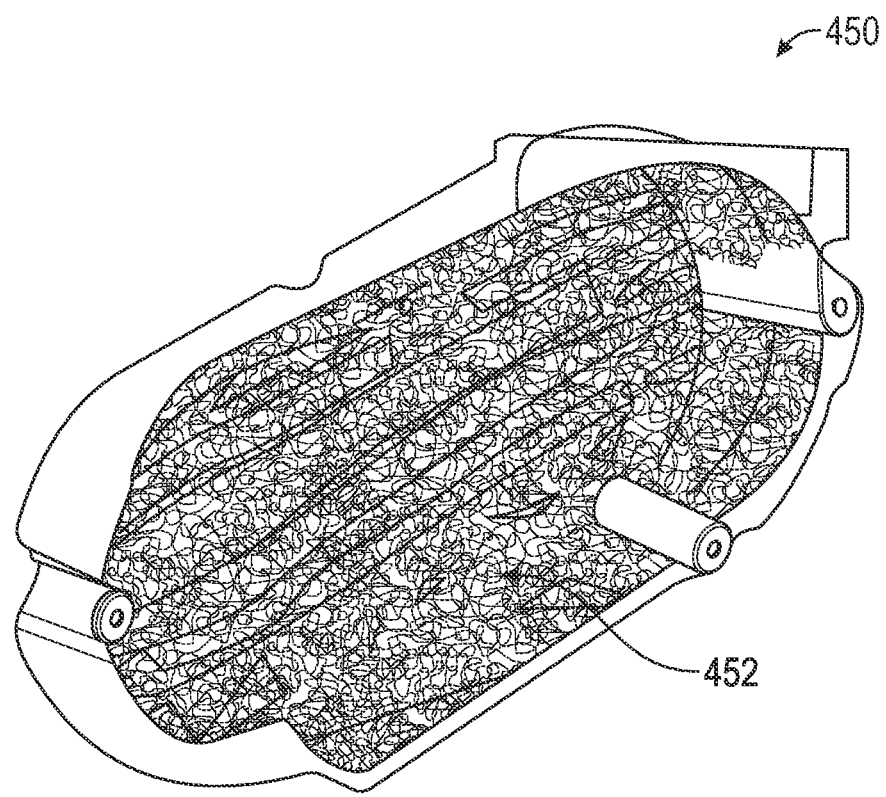
FIG. 42 illustrates an interior side of the belt cover of FIG. 41 with noise suppression material.

Referring to FIGS. 22, 41, and 42, first drive pulley 164, second drive pulley 170, and belt 172 are covered by a cover 450. Cover 450 is removably mounted to left side frame member 190. Referring to FIG. 42, a noise suppression material 452 is adhered or otherwise coupled to an internal side of cover 450. Exemplary noise suppression materials include a polymer-based material, foam, vinyl, felt, and other suitable acoustic damping materials. In embodiments, noise suppression material 452 is one of a spray-on foam or a foam insert.

Referring to FIG. 40, top shroud panel 402 of shrouding assembly 30 also includes noise suppression material 452 adhered or otherwise coupled to an internal surface 403 of top shroud panel 402. Further, in embodiments, sealing material 440 is made of a noise suppression material which also functions as a seal for air-cooled system 400. As illustrated in FIG. 40, noise suppression material 452 cover a portion of internal surface 403 of top shroud panel 402 outside of sealing material 440.

Figure 33:
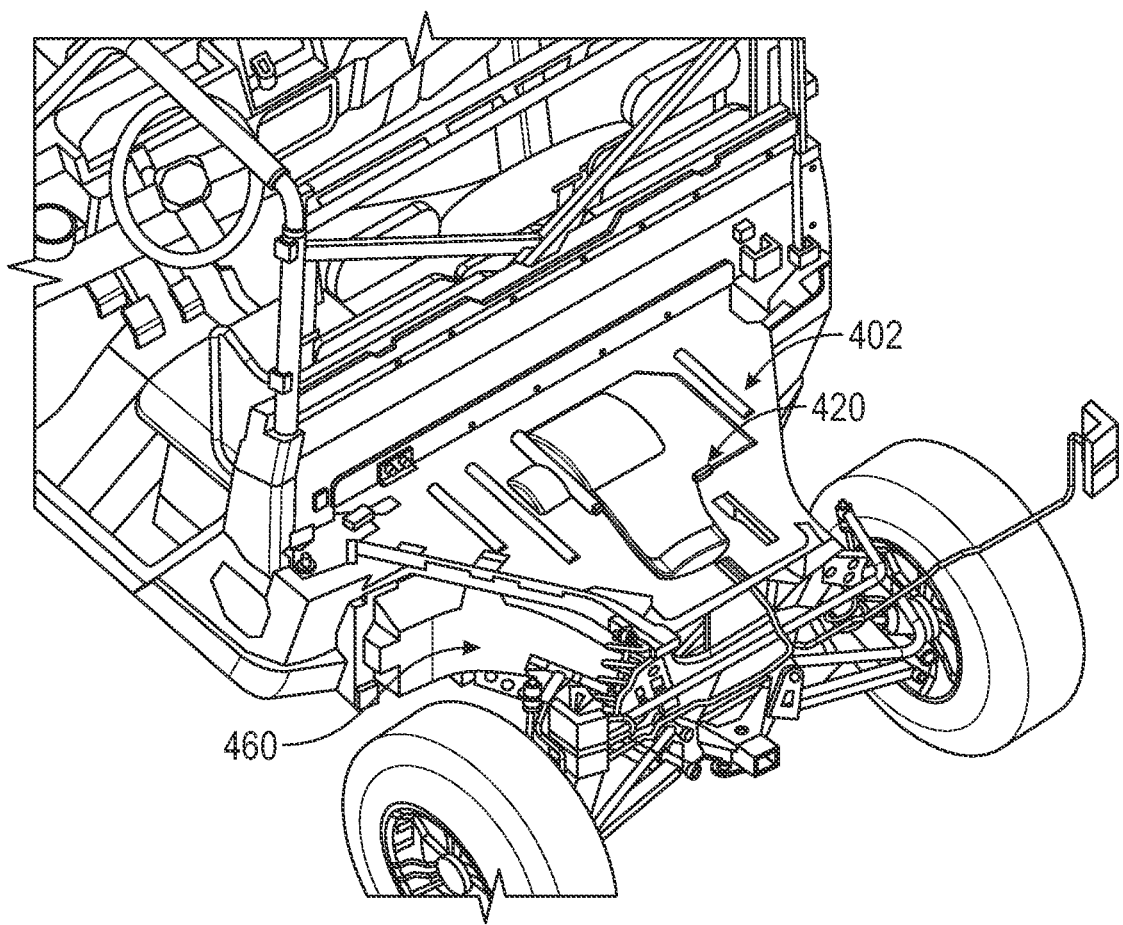
FIG. 33 illustrates a left rear perspective view of portions of the shrouding assembly of the exemplary recreational vehicle of FIG. 1.
Figure 34:
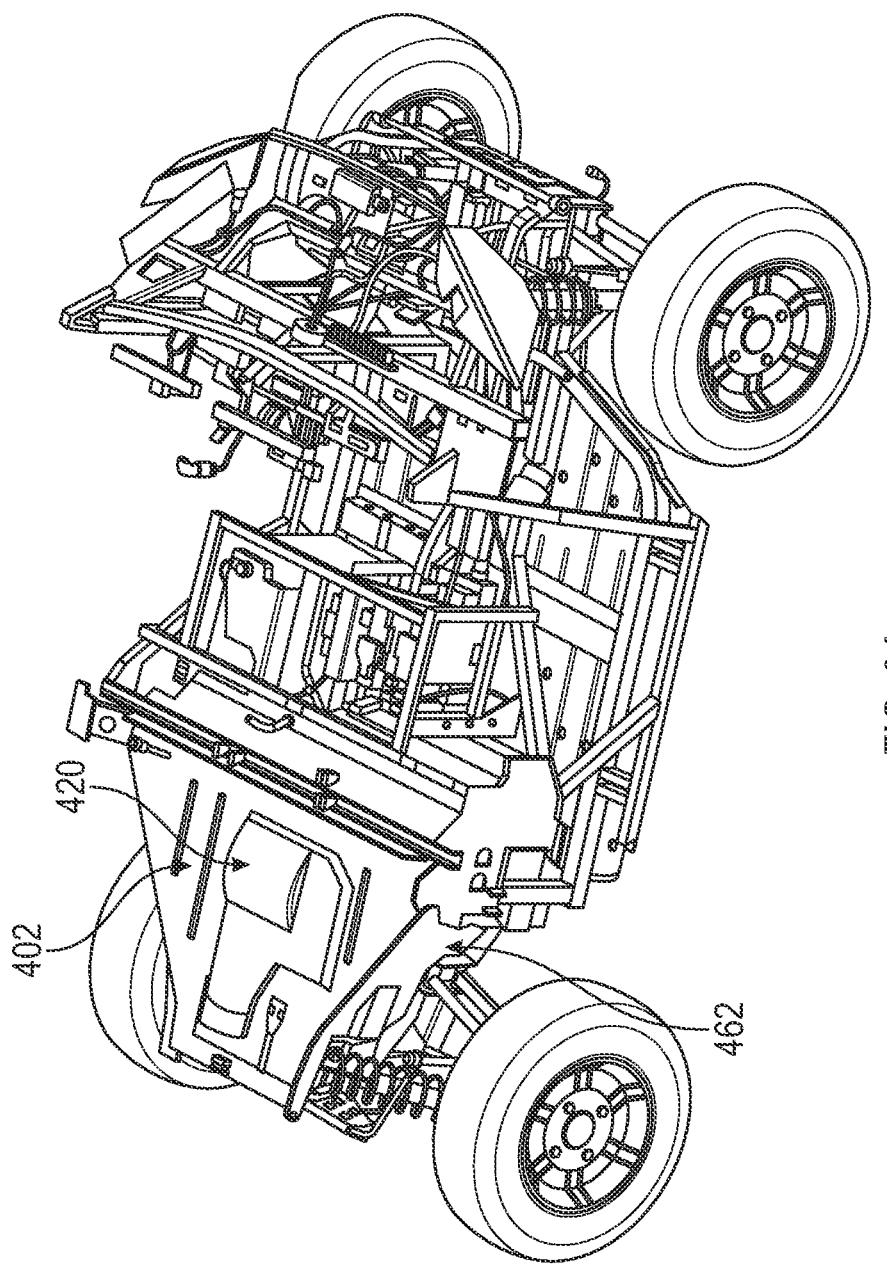
FIG. 34 illustrates a right perspective view of portions of the shrouding assembly of the exemplary recreational vehicle of FIG. 1.
Figure 35:
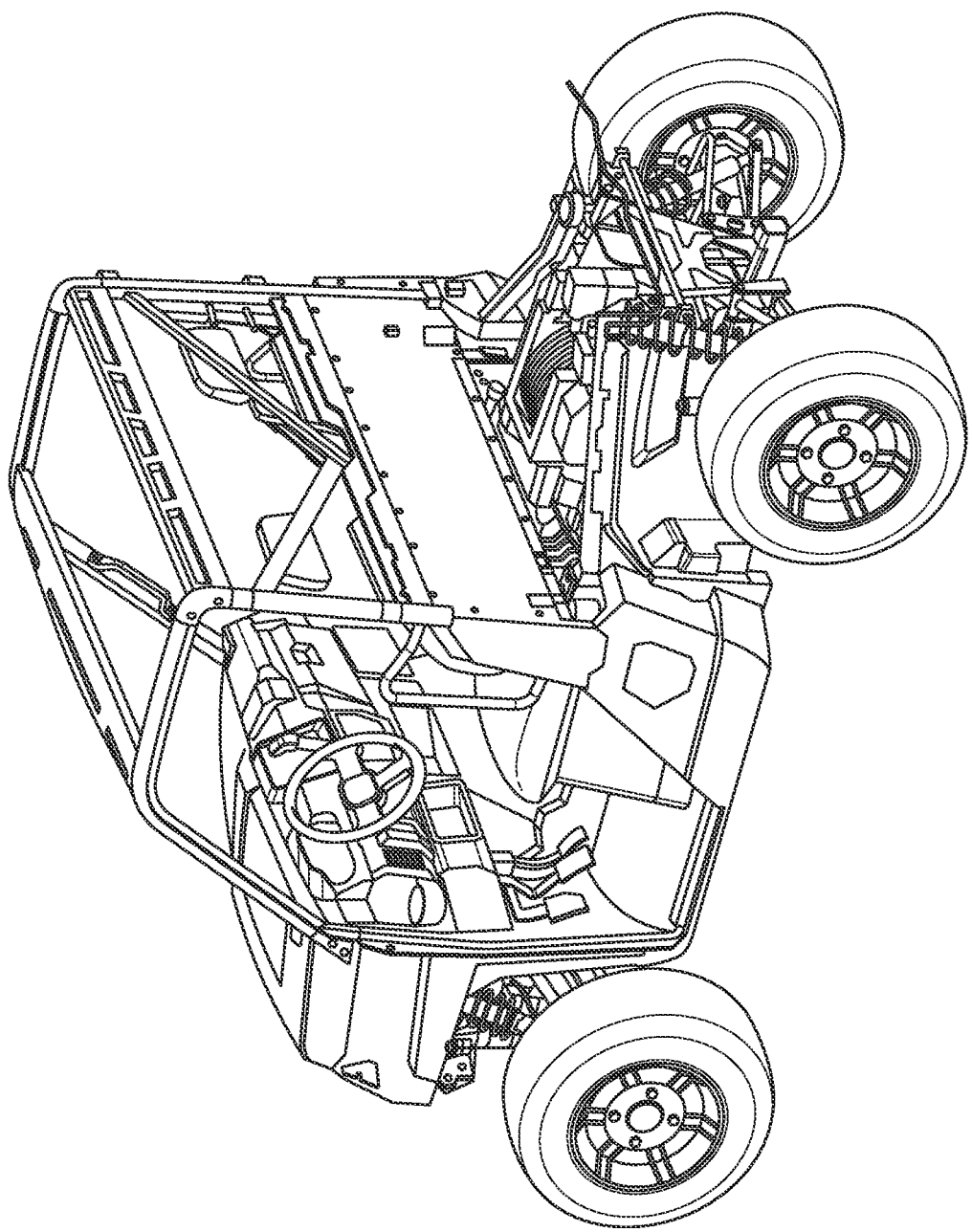
FIG. 35 illustrates a left rear perspective view of portions of the shrouding assembly of the exemplary recreational vehicle of FIG. 1 with a top shroud of the shrouding assembly removed.
Figure 37:
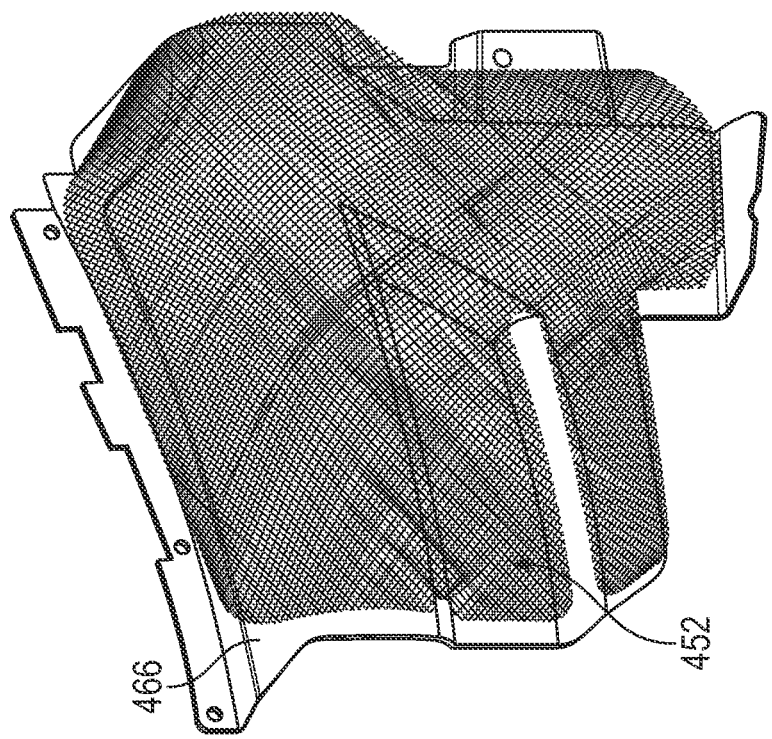
FIG. 37 illustrates an interior side view of a portion of the left side shroud of the shrouding assembly of FIG. 36 including noise suppression material.
Figure 36:
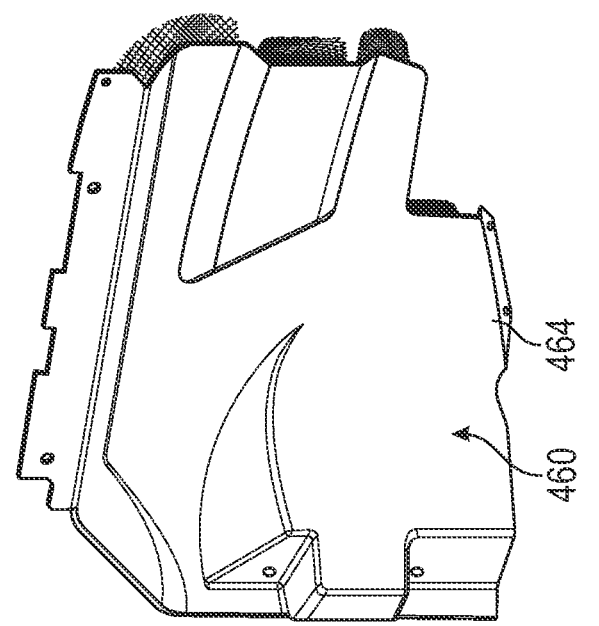
FIG. 36 illustrates an exterior side view of a portion of a left side shroud of the shrouding assembly.
Figure 38:
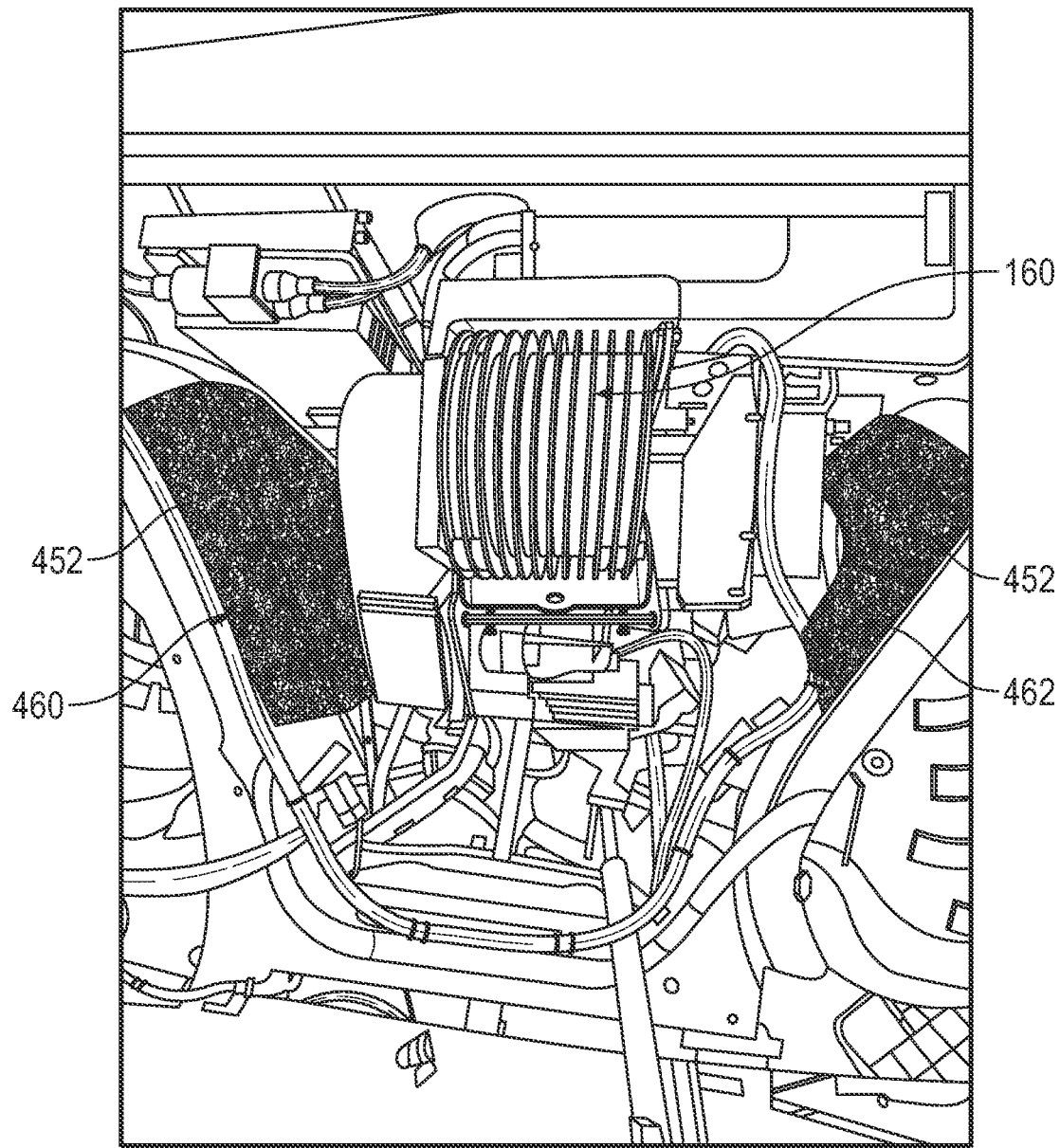
FIG. 38 illustrates a top view of portions of the shrouding assembly of the exemplary recreational vehicle of FIG. 1 with a top shroud of the shrouding assembly removed and illustrating placement of noise suppression material on the left shroud and the right shroud of the shrouding assembly.
Figure 39:
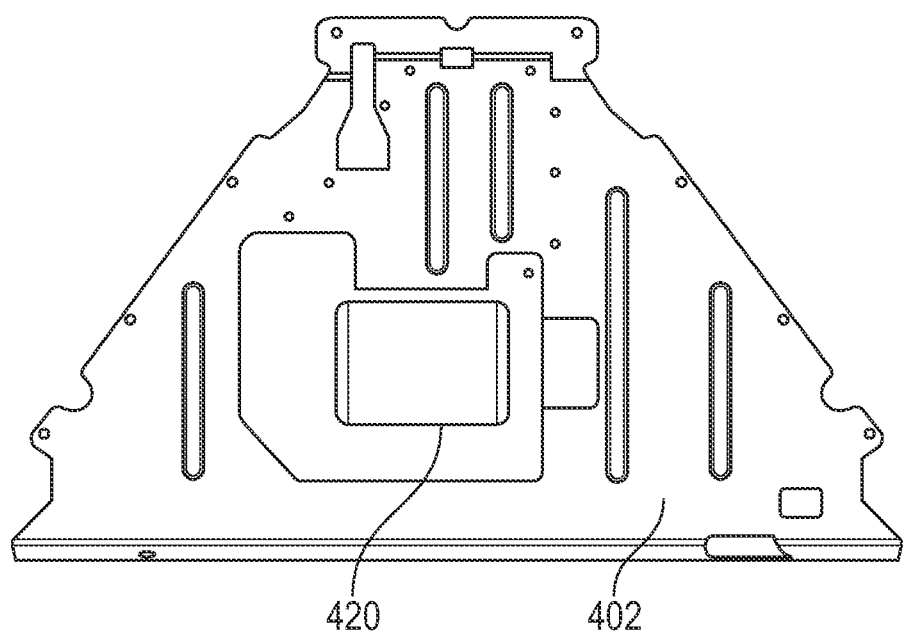
FIG. 39 illustrates an exterior side view of the top shroud of the shrouding assembly.

Referring to FIGS. 36 and 37, a portion of an exemplary left side shroud 460 of shroud assembly 30 is illustrated, an exterior side 464 in FIG. 36 and an interior side 466 in FIG. 37. Left side shroud 460 is shown assembled to frame assembly 20 is shown in FIG. 33. A similar right side shroud 462 is shown assembled to frame assembly 20 in FIG. 34. Referring to FIG. 37, interior side 466 of left side shroud 460 includes noise suppression material 452. Right side shroud 462 includes similar noise suppression material 452 on an interior side of right side shroud 462. Referring to FIG. 38, an exemplary arrangement of noise suppression material 452 on left side shroud 460 and right side shroud 462 is shown.

Figure 45:
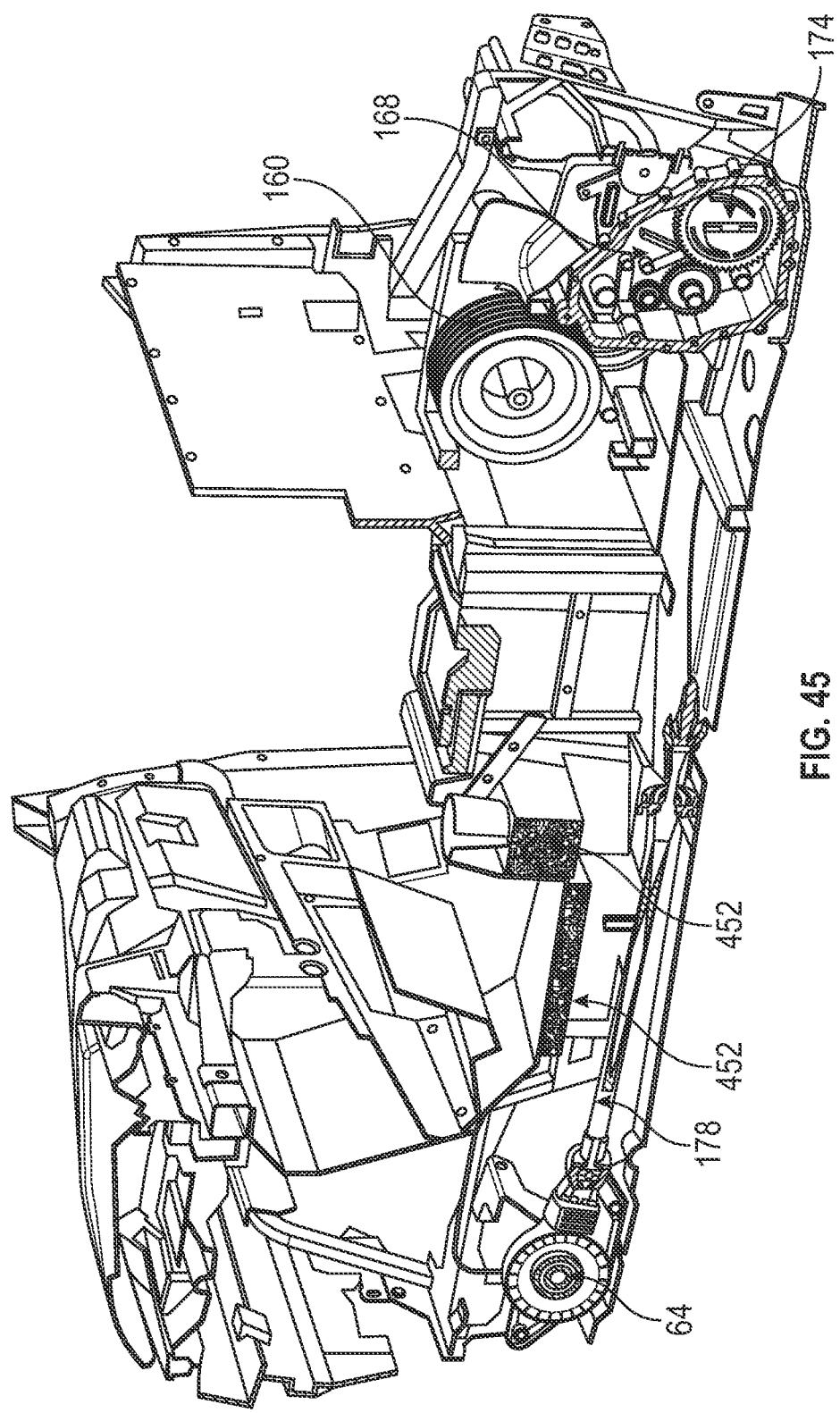
FIG. 45 illustrates a left rear view of a sectional view along the longitudinal centerline of the exemplary vehicle of FIG. 1 illustrates components of the electric powertrain and additional noise suppression material in the operator space of the exemplary vehicle of FIG. 1.
Figure 46:
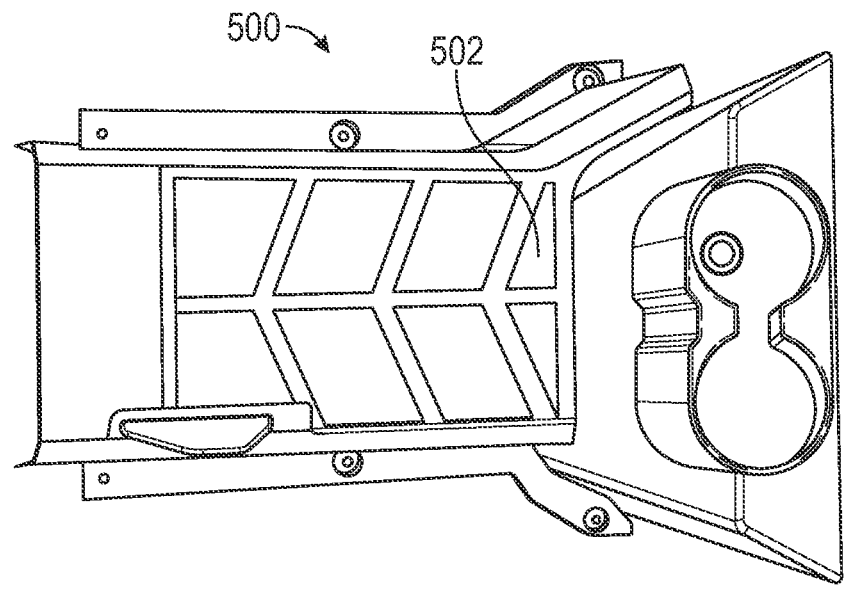
FIG. 46 illustrates an exterior side view of a floor and seat front panel of the exemplary vehicle of FIG. 1.
Figure 47:
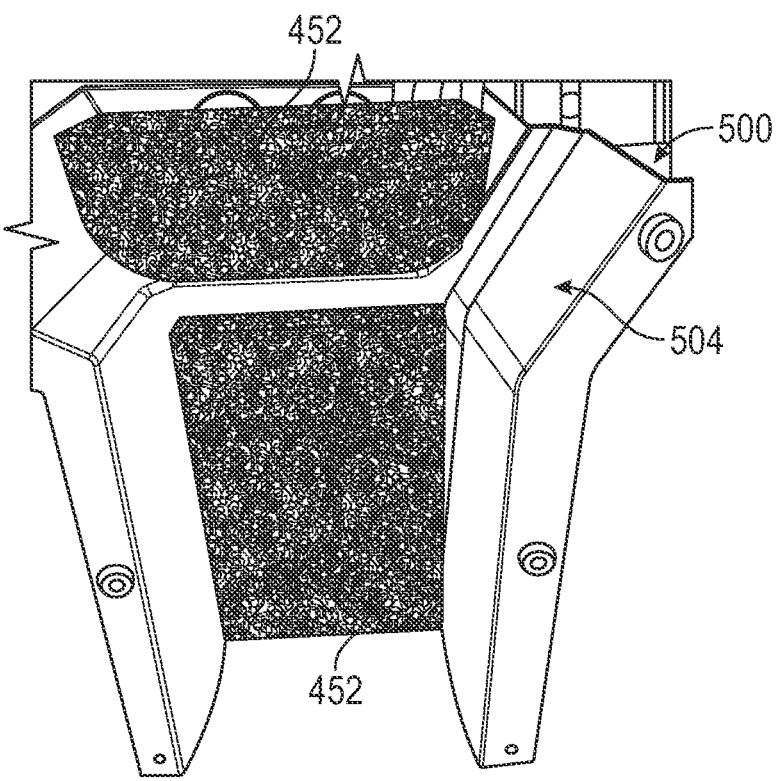
FIG. 47 illustrates an interior side view of the floor and seat front panel of FIG. 46 including noise suppression material.

Referring to FIG. 45, additional noise suppression material 452 is included along the area surrounding half shafts 178 and in particular within the longitudinal extent of operator space 100. Referring to FIGS. 14, 46, and 47, an operator space panel 500 includes an exterior side 502 (see FIG. 46) facing operator space 100 and an interior side 504 (see FIG. 47) facing prop shaft 178. The interior side 504 of operator space panel 500 includes noise suppression material 452 to assist in noise suppression from the rotating half shafts 178 and other portions of the powertrain.

Figure 48:
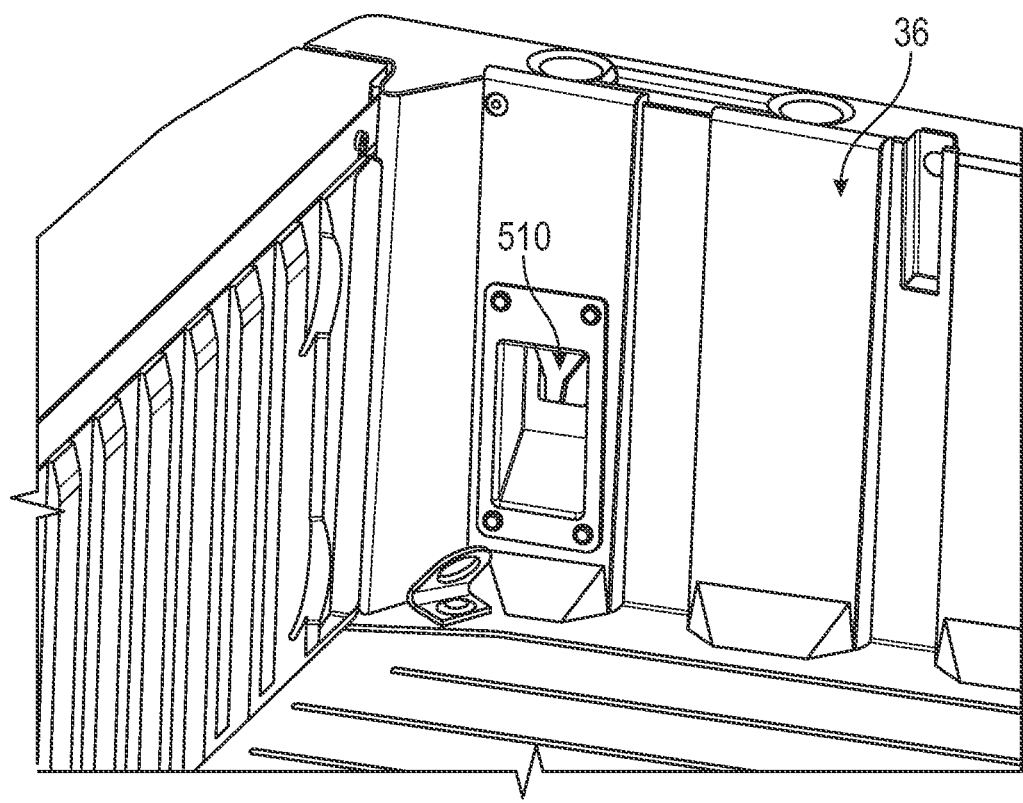
FIG. 48 illustrates an accessory port in the interior of the cargo bed of the exemplary recreational vehicle of FIG. 1.

Referring to FIG. 48, an interior of a portion of cargo box 36 is shown. The interior of cargo box 36 includes an accessory connector 510 to the electrical system of electric vehicle 10. In some examples, accessory connector 510 may include a low voltage power source, e.g., less than 12V or less than 24V, or a higher voltage power source, e.g., greater than 24V, such as about 120V. In some examples, cargo box 36 may include a hinge configured to actuate the cargo box, e.g., into a dump box configuration. In some examples, electrical wires coupling accessory connector 510 to the electrical system of electric vehicle 10 may include one or more flexible members configured to allow the electrical wires to move and/or protect the electrical wires when cargo box 36 is moved into a dumping box configuration.

Figure 49:
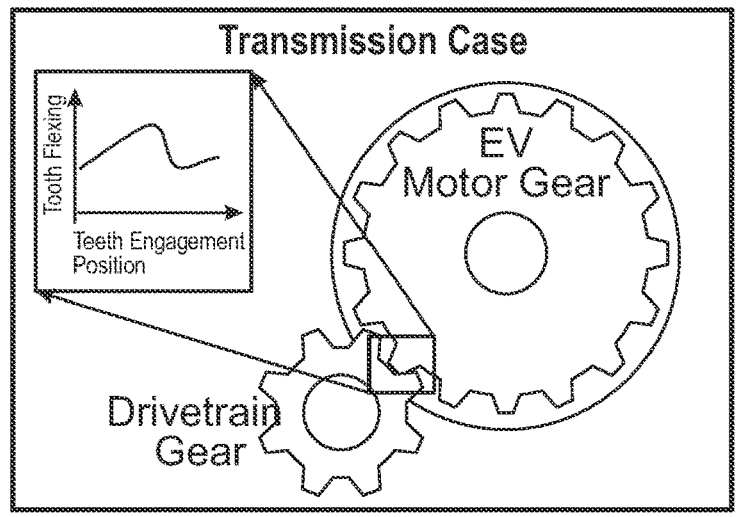
FIG. 49 is a schematic view of a transmission system of the electric vehicle of FIG. 1.

Referring to FIG. 49, various applications of the vehicle of the present disclosure may require quiet or reduced-noise powertrain assemblies. However, many conventional gear sets and drivetrains may contribute to increased vehicle noise at high speeds due to the sound produced by the gear teeth meshing together. To remedy this, the vehicle of the present application may utilize a method of sensing the noise generated from a gearbox when the teeth of the EV motor gear and the teeth of the drivetrain gear mesh together. The noise from the teeth meshing may be sensed by an inertial measurement unit ("IMU") of the vehicle and the sensed noise may be provided as feedback into a MCU-regulated PID loop to drive phase-shifted oscillating torque to the electric motor (e.g., motor 1002) to cancel the noise from the gear teeth meshing. More particularly, fast (e.g., millisecond) responsive torque vectoring may be controlled by a controller for motors 1002 to rapidly adjust the torque from motors 1002 when noise at the gearbox exceeds a predetermined threshold. This noise-cancelling method may be used any time the noise at the gearbox exceeds a predetermined threshold or may be used only when the vehicle is operating in one or more predetermined driving modes (e.g., a Stealth Mode). In the latter embodiment, noise may only be sensed at the gearbox and/or phase-shifted oscillating torque adjustments may occur in response to the actuation of the predetermined drive mode. These examples, along with noise reduction, may also be implemented to provide vibration damping for improved rider comfort and/or durability.

Figure 50:
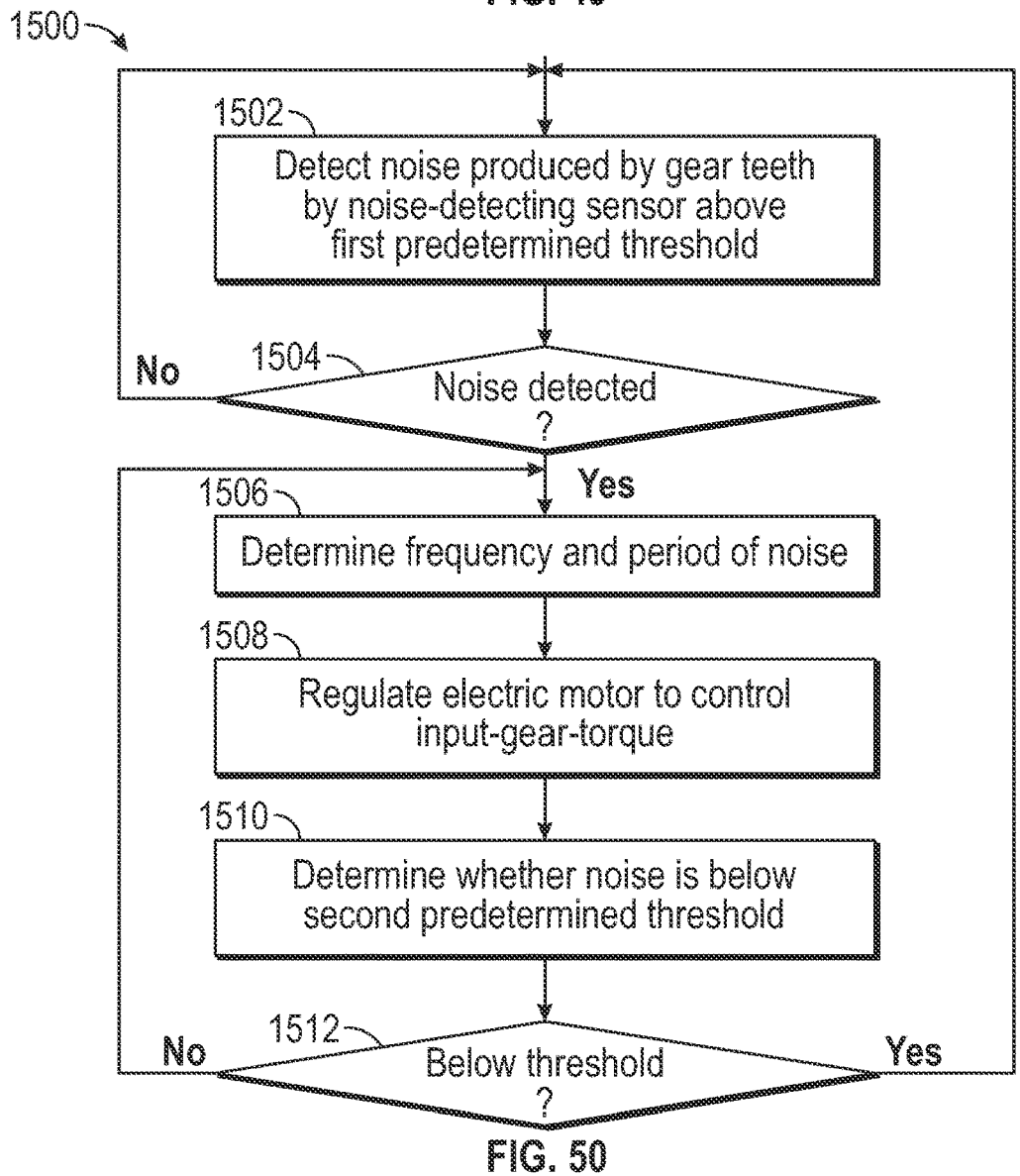
FIG. 50 is a flow diagram illustrating a computer-implemented method for reducing gear noise of the exemplary electric vehicle FIG. 1.

Referring now to FIG. 50, a computer-implemented method 1500 for reducing gear noise of an electric vehicle is shown. A gearbox in the electric vehicle may produce noise from teeth meshing between an electric motor gear and a drivetrain gear. Specifically, the source of the noise is micro-meter scale flexing of gear teeth as the gear teeth are engaging and disengaging while the gear rotates. Gear noise then resonates into a transmission of the electric vehicle. To reduce gearbox noise, a noise-detecting sensor may be used to detect noise generated in the gearbox from teeth meshing. The detected noise is then used as feedback into a microcontroller (MCU)-regulated proportional-integral-derivative (PID) loop to drive phase-shifted oscillating torque to an electric motor to cancel the noise in the gears at a given motor speed.

In the illustrative embodiment, method 1500 is performed by a controller of an electric vehicle. In block 1502, the controller monitors noise in a gearbox to detect noise generated in the gearbox from teeth meshing that exceeds a first predetermined threshold. For example, the controller may be communicatively coupled to a noise-detecting sensor, such as an inertial measurement unit (IMU), that is positioned on a gearbox housing to detect noise from the gearbox.

If the noise is not detected in block 1504, method 1500 loops back to block 1502 to continue monitoring noise in the gearbox. If, however, the noise is detected in block 1504, method 1500 advances to block 1506.

In response to detecting noise, the controller drives phase-shifted oscillating torque to an electric motor to cancel the noise in the gears. To do so, the controller determines a frequency and a period of the detected noise, as indicated in block 1506.

In block 1508, the controller regulates one or more electric motors to control an input-gear-torque to lower the tooth flexing. For example, a speed that a typical gear teeth would be meshing at for a 32 inch tire at 60 MPH is in the 350 Hz range. The controller may be configured to regulate the one or more electric motors to keep the frequency within a range from about 300 Hz to about 400 Hz, such as within a range from about 325 Hz to about 375 Hz, or another selected frequency range.

In the illustrative embodiment, the one or more electrical motors are regulated via pulse-width modulation (PWM) with a millisecond-scale torque accuracy. As such, to regulate the one or more electrical motors, the controller adds a superimposed sinusoidal similar-frequency torque signal to a main motor power signal to shift the power signal in phase.

Subsequently, in block 1510, the controller receives a feedback from the transmission noise-detecting sensor and determines whether the noise is below a second predetermined threshold. If not, method 1500 loops back to block 1506 to continue regulate the electric motor based on the updated frequency and period of the detected noise. If, however, the controller determines that the noise is below the second predetermined threshold, method 1500 loops back to block 1502 to continue monitor noise produced by the gear teeth to detect noise exceeding the first predetermined threshold.

In some embodiments, the controller may determine whether the noise is maximally reduced. For example, the controller determines that the noise is maximally reduced if the feedback from the transmission noise-detecting sensor indicates that the noise level is plateaued and adding additional sinusoidal similar-frequency torque signal to the main motor power signal does not further reduce the noise.

In a geared transmission driven system with a single electric motor, sizes of front and rear half-shafts are generally determined in order to withstand a maximum torque a driveline can provide. This typically adds cost and weight to the half-shafts and also may limit the half-shaft joint articulation angles. Therefore, the required size of half-shafts are often a limiting factor for a steering angle and/or a suspension travel of the vehicle.

Figure 51:
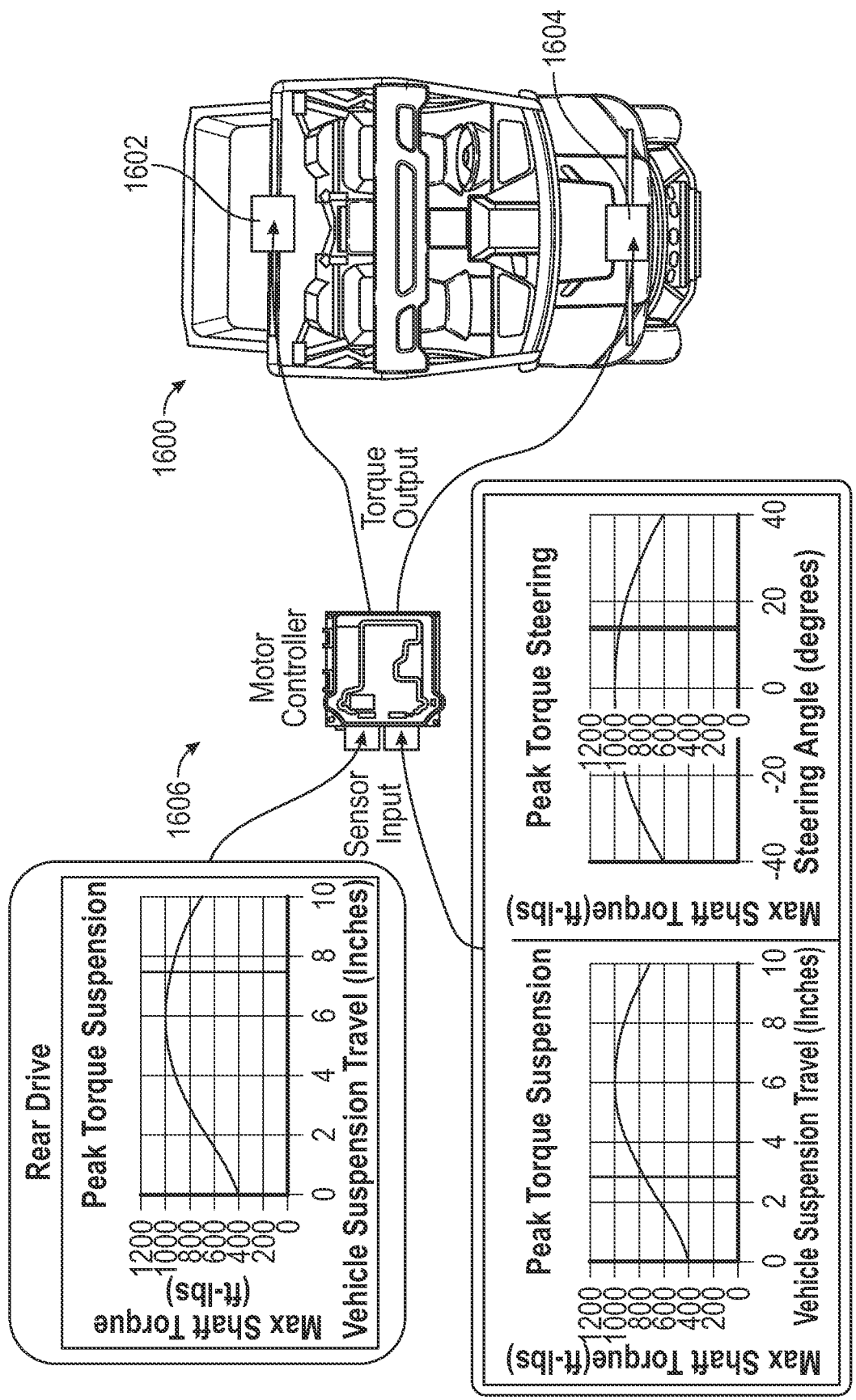
FIG. 51 illustrates a transmission system of the exemplary electric vehicle of FIG. 1 with separate electric motors for front and rear axles.

In contrast, as shown in FIG. 51, a transmission system of an electric vehicle 1600 that has separate electric motors 1602, 1604 for front and rear axles may be controlled by a motor controller 1606 to provide higher articulation angles for tighter turning. By doing so, the weight and cost of these axles may be reduced and axle life may be increased.

Specifically, motor controller 1606 is configured to control the transmission system of the electric vehicle 1600 to protect the axles. Since the front and rear axles of an electric vehicle are driven by separate electric motors, a peak torque of each electric motor can be controlled to remain below the limits of the respective axles. For example, as shown in FIG. 24, a rear axle of the electric vehicle 1600 is a non-steering axle and a front axle of the electric vehicle 1600 is a steering axle.

For the non-steering axle(s), motor controller 1606 is configured to monitor the peak torque suspension of the rear drive to control the motor torque output of the rear axle to not exceed the limits or threshold of the respective axles.

For the steered axle(s), motor controller 1606 is configured to monitor the steering angle of the front axle. Because the strength of the front axles depends at least in part on an angle of the joints at the end of the axles, the joint gets weaker and certain torque thresholds may lead to failure at more extreme angles. Therefore, as the wheels are turned more than a threshold angle, motor controller 1606 is configured to decrease a motor torque output supplied to the steered axle to prevent any damage to the axles. Additionally, motor controller 1606 is further configured to monitor a suspension position, such as with an accelerometer, of the front axle to control the motor torque output. For example, motor controller 1606 may increase torque output as the half-shafts approach straighter angles or decrease torque output as the half-shaft angles increase.

In other words, for an electric vehicle with individual front and rear axle motors, motor controller 1606 allows the electric vehicle 1600 to use joints with much higher angularity to provide tighter turning radius and increase suspension travel.

Figure 52:
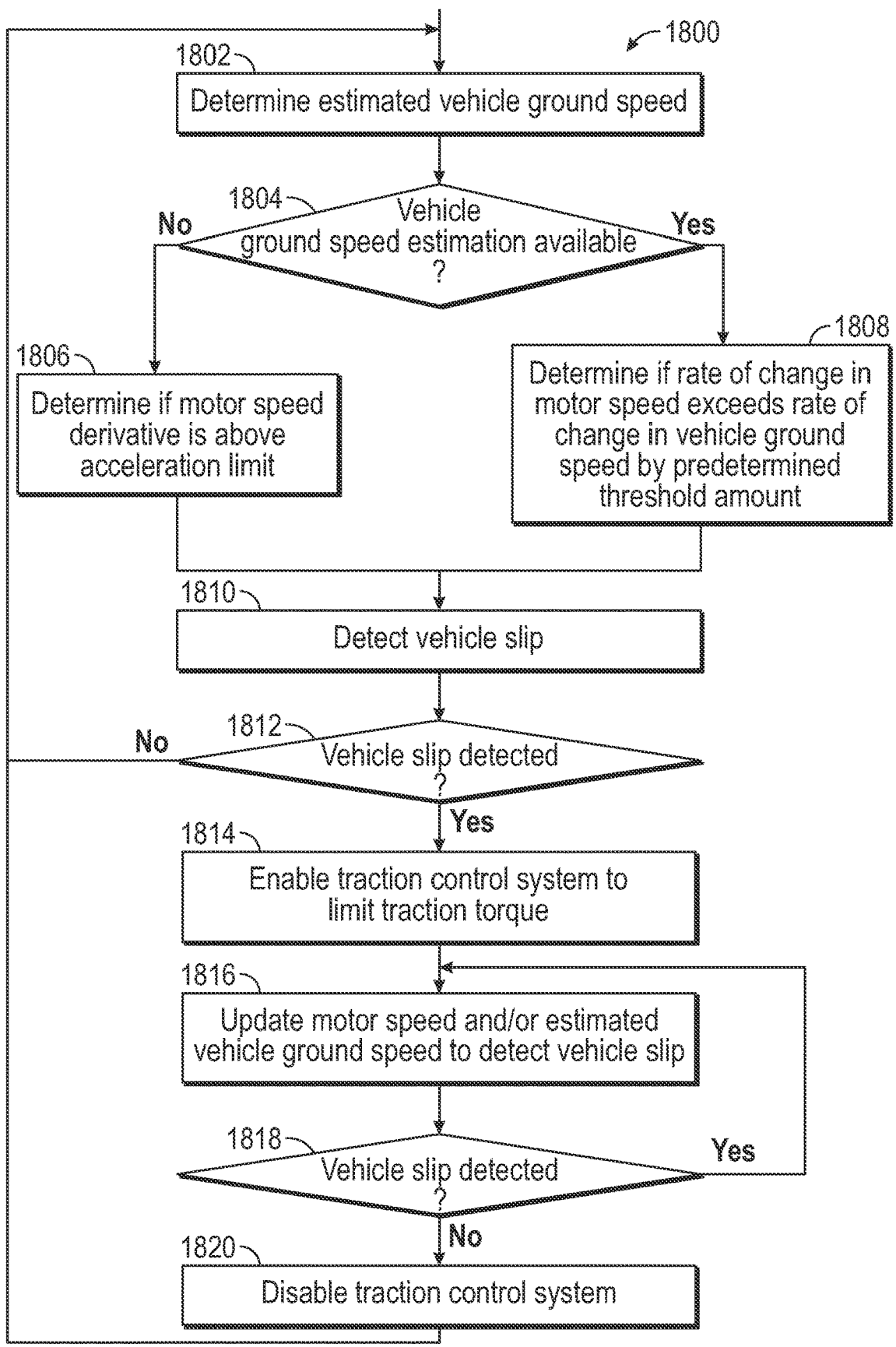
FIG. 52 is a flow diagram illustrating a computer-implemented method for controlling a traction torque of an electric vehicle.

Referring now to FIGS. 52 and 53, a controls schematic and a computer-implemented method 1800 for controlling torque of an electric vehicle is shown. In the illustrative embodiment, the electric vehicle may include a traction control system that is configured to provide quick (e.g., milliseconds) and precise control of torque in order to improve vehicle stability and safety. For example, when towing with an electric vehicle, there may be potential to overpower the tires and lose traction. In such an example, the traction control system may be enabled to limit the traction torque. To do so, a vehicle controller of the electric vehicle is configured to detect a loss of traction (e.g., a slip). If the electric vehicle has a wheel speed sensor, the vehicle controller may directly measure a vehicle ground speed based on a wheel speed to detect changes in its speed due to a loss of traction. However, not all electric vehicles have a wheel speed sensor. If an electric vehicle does not have a wheel speed sensor, the electric vehicle may rely on a vehicle speed sensor on a gearbox output to detect a loss of traction. However, the vehicle speed sensor on the gearbox output may not compensate for slip conditions and may not allow proper vehicle speed measurement under various conditions. In such an embodiment, method 1800 may be performed by an electric vehicle to detect a loss of traction and enable a traction control system.

In the illustrative embodiment, method 1800 may be performed by a vehicle controller of an electric vehicle to enable a traction control system. To do so, in block 1802, the vehicle controller determines an estimated vehicle ground speed. For example, if the electric vehicle does not have a wheel speed sensor, the vehicle ground speed may not be reliably measured under all conditions. As such, the vehicle controller estimates a vehicle ground speed by using a sensor fusion approach (e.g., a Kalman filter). The Kalman filter is an algorithm that provides estimates of some unknown variables given the measurements observed over time. In this case, the Kalman filter estimates a vehicle ground speed based on at least one of GPS data, IMU data (e.g., 3-axis accelerometer data), and vehicle speed sensor (on gearbox-output) data measured and observed over time. All Kalman Filter input signals are running through a plausibility check before processing. It should be appreciated that Kalman Filter input signals may run through a plausibility check before processing.

If the vehicle controller determines that a vehicle ground speed estimation is not available in block 1804, method 1800 proceeds to block 1806. In block 1806, the vehicle controller determines if a motor speed derivative is above a predetermined acceleration limit.

If, however, the vehicle controller determines that a vehicle ground speed estimation is available in block 1804, method 1800 proceeds to block 1808. In block 1808, the vehicle controller determines if a rate of change in motor speed exceeds a rate of change in vehicle ground speed by a predetermined threshold amount.

Subsequently, in block 1810, the vehicle controller detects a vehicle slip. For example, a vehicle slip may be detected if the vehicle controller determines that the motor speed derivative is above the predetermined acceleration limit in block 1806. Alternatively, a vehicle slip may be detected if the vehicle controller determines that the rate of change in the motor speed exceeds the rate of change in vehicle ground speed by the predetermined threshold amount in block 1808. In other words, a vehicle slip is detected if the motor speed is changing too quickly compared to the vehicle ground speed.

If a vehicle slip is not detected in block 1812, method 1800 loops back to block 1802 to continue determine an estimated vehicle ground speed to detect a vehicle slip. If, however, a vehicle slip is detected, method 1800 advances to block 1814 to enable a traction control system of the electric vehicle to limit a traction torque (e.g., torque reduction). It should be appreciated that the traction control system may also consider a driver torque request, a driver brake request, an actual motor torque and/or speed, a maximum motor torque and/or speed of the electric vehicle, and/or motor phase currents and/or voltages for reducing the torque of the electric vehicle. It should be appreciated that the use of one or more electric motors in the electric vehicle allows the traction control system to provide fast and precise torque control.

Subsequent to enabling the traction control system, method 1800 proceeds to block 1816 to detect whether the vehicle slip is still detected based on an updated vehicle ground speed estimation and an updated motor speed. If the vehicle slip is still detected in block 1818, method 1800 loops back to block 1816 to continue detecting until the vehicle slip is no longer detected. In other words, the traction control may act as a torque control loop.

If the vehicle controller determines that the vehicle slip is no longer detected in block 1818, the vehicle controller disables the traction control system, which increases the traction torque again to a normal range, as indicated in block 1820. Subsequently, method 1800 loops back to block 1802 to continue determine an estimated vehicle ground speed to detect a vehicle slip.

It should be appreciated that, if the electric vehicle has a single motor, the traction control system is configured to control the single electric motor. If the electric vehicle has multiple electric motors, the traction control system may control each axis individually or even each wheel if each electric motor is associated with a single wheel. Additionally, in some embodiments, an operator of the electric vehicle may have an option to manually enable or disable the traction control system and/or the traction control system may be automatically actuated based on a vehicle operating or drive mode.

Referring now to FIGS. 54A-E, an architecture for a DC/DC converter integration on an electric vehicle with uncontrolled 12V loads is disclosed. In the illustrative embodiment, before closing a main battery contactor to enable high-voltage components, a pre-charge circuit is enabled to decrease an inrush current. However, due to a limited current supply capability of a pre-charge circuit, pre-charge may fail if loads exist on the high-voltage system. Since an operator and/or passengers of the electric vehicle may utilize a 12V battery as a constant supply for on-board electronics and/or accessory components, there remains a need to develop a mechanism to disconnect a DC/DC converter which supply a 12V system during pre-charge.

Figure 54A:
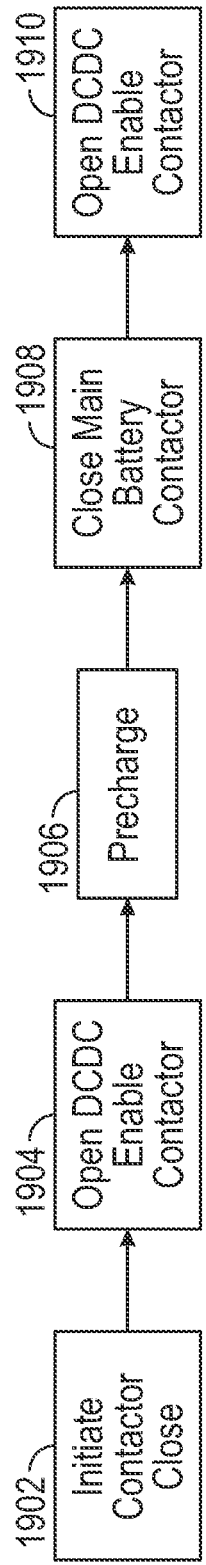
FIGS. 54A-E illustrate architectures for a DC/DC converter integration on an electric vehicle with uncontrolled 12V loads.

To do so, a vehicle controller of the electric vehicle is configured to control a relay or connector to disconnect a DC/DC converter. As shown in FIG. 54A, the vehicle controller initiates Contactor close in block 1902. In embodiments, the contactor is the main battery contactor(s) which triggers precharge and DC/DC relay operation as initial conditions. In block 1904, the vehicle controller opens a DC/DC Enable Contactor. Subsequently, the pre-charge circuit is enabled in block 1906 and a Main Battery Contactor is closed in block 1908. It should be noted that the DC/DC converter is still disconnected. Subsequently, in block 1910, the DC/DC Enable Contactor is closed to supply power to the 12V system.

Figure 54B:
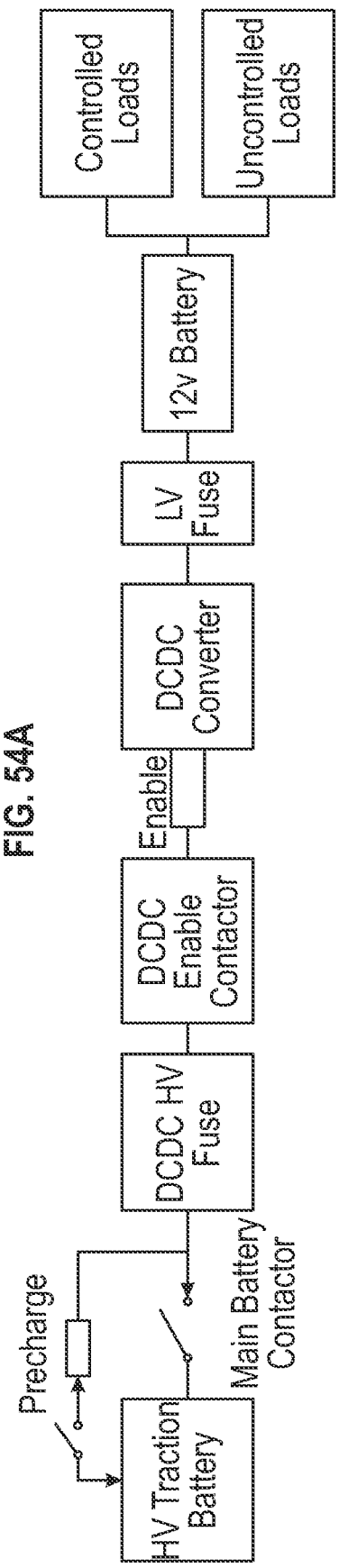

Four potential configurations, based on DCDC Component capabilities and system power levels:

High Voltage Contactor on DC/DC Enable and Power Line, to break all HV voltage to DCDC Circuit (FIG. 54B)

Figure 54C:
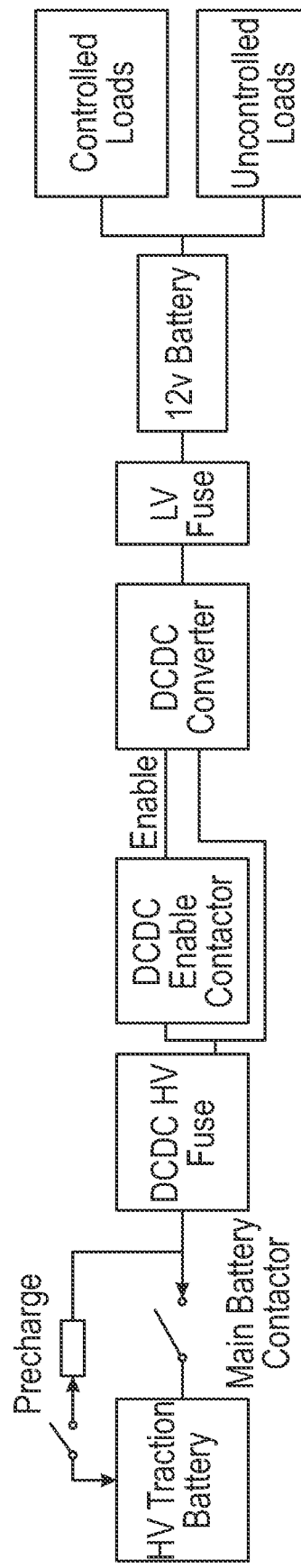

High Voltage Contactor on DC/DC Enable Line, to only switch power to Enable circuit within DCDC converter, if recommended by DCDC manufacturer. (FIG. 54C)

Figures 54D, 54E:
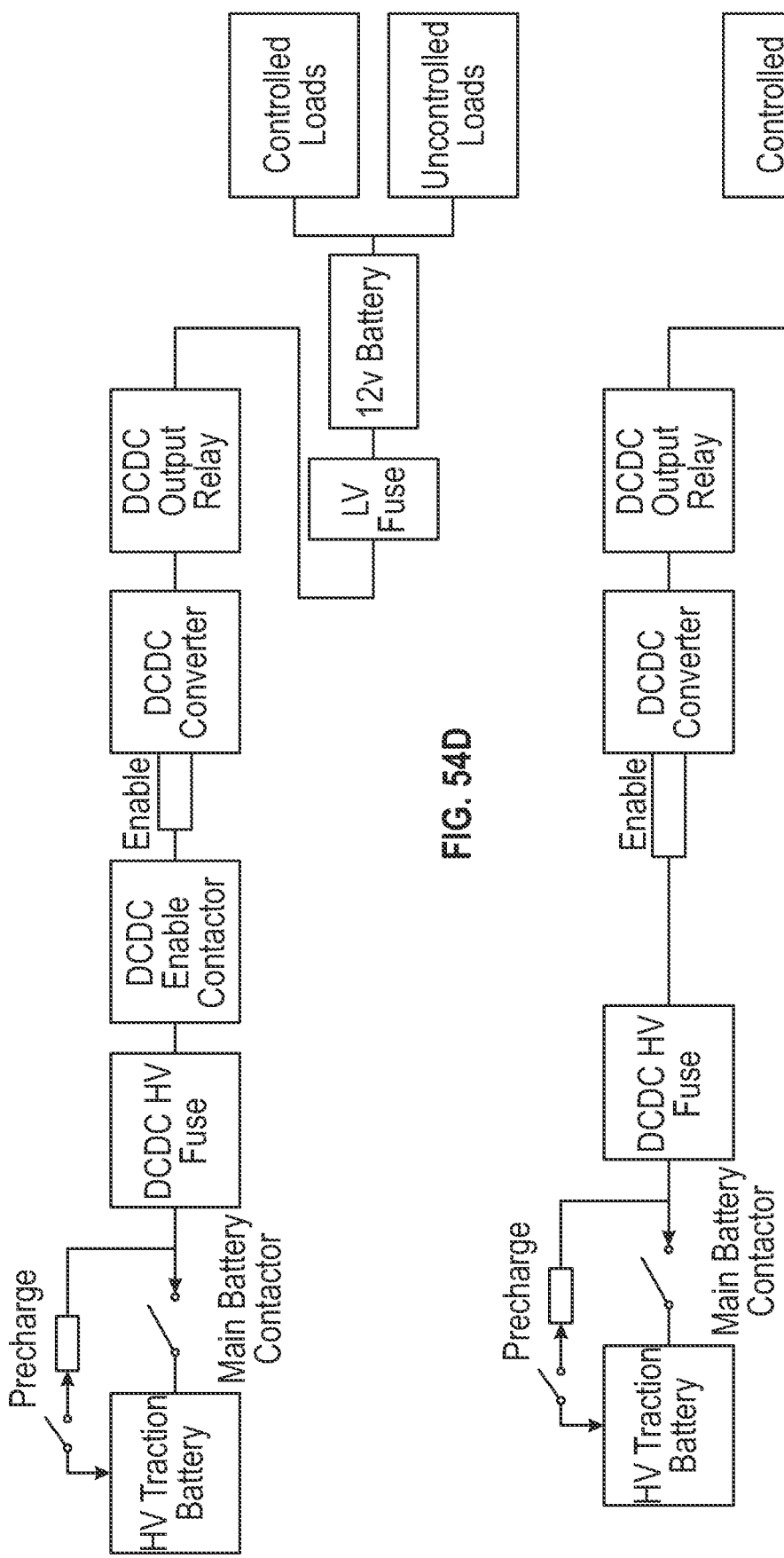

High Voltage Contactor on DC/DC Enable and Power Line, with additional Low Voltage Relay on DCDC Output if necessary based on DCDC Component Requirements (FIG. 54D)

Low Voltage Relay on DCDC Output to disconnect 12v battery and loads from DCDC Converter and prevent draw on HV system (FIG. 54E)

In some embodiments, a two-step process (e.g., two deliberate and distinctive actions) may be required to be performed by an operator in order to select an active driving mode of the vehicle. For example, for a vehicle with the transmission in Park, an operator of the vehicle may select an active driving mode from one or more driving modes by performing the following two steps: (1) Key On, and (2) Shift from Park to any driving gear (see FIG. 55). In step (2), the driving gear may be a gear associated with a particular driving mode (e.g., reverse, drive, high, low) or it may be possible to actuate a driving mode by merely shifting to any driving gear from Park. For example, if a Rock Crawl driving mode is desired, it may be necessary to shift from Park to a low gear. Conversely, if a Sport or High Performance driving mode is desired, it may be desired to shift from Park to high gear or Drive. Alternatively, any driving mode may be actuated by shifting from Park to any driving gear. If the vehicle is in a driving gear prior to Key On, it may be necessary to first shift the transmission into Park before returning to a driving possible gear. Alternatively, in another example, the operator may select an active driving mode by (1) Key On, and (2) Shift from a current gear to a new driving possible gear. Alternatively, if the vehicle is in Park or Neural, the operator may select an active driving mode by (1) Key On, and (2) Shift from Park or Neutral to any driving possible gear.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electric vehicle having a vehicle maximum lateral width, the electric vehicle comprising:
   a plurality of ground engaging members;
   a frame assembly supported by the plurality of ground engaging members, the frame assembly including a front frame assembly, a middle frame assembly, and a rear frame assembly;
   a seating area supported by the middle frame assembly;
   a roll cage extending over the seating area;
   electric powertrain components supported by the frame assembly, the electric powertrain components including an electric motor and a drive train operative to provide power from the electric motor to at least one ground engaging member; and
a shrouding assembly coupled to the rear frame assembly, the shrouding assembly having a maximum shrouding lateral width, the maximum shrouding lateral width being less than the vehicle maximum lateral width, wherein the shrouding assembly includes a top shroud portion extending across a top of the electric powertrain components, and the top shroud portion includes an air conduit formed on a lower side and a fan positioned to move air through the air conduit.

2. The electric vehicle of claim 1, wherein the shrouding assembly includes a left side shroud portion extending from a lower portion of the rear frame assembly to an upper portion of the rear frame assembly.

3. The electric vehicle of claim 2, further comprising a left rear suspension moveably coupling a first one of the plurality of ground engaging members to the frame assembly, the left rear suspension including first suspension arm moveably coupled to the frame assembly and a second suspension arm moveably coupled to the frame assembly independent of the first suspension arm, wherein the left side shroud portion is positioned completely forward of a first connection point of the first suspension arm to the frame assembly.

4. The electric vehicle of claim 1, wherein the top shroud portion extends across a longitudinal centerline of the electric vehicle.

5. The electric vehicle of claim 4, further comprising a cargo bed supported by the rear frame assembly, the top shroud portion extending under the cargo bed.

6. The electric vehicle of claim 5, wherein the top shroud portion is coupled to the rear frame assembly independent of the cargo bed.

7. An electric vehicle having a vehicle maximum lateral width, the electric vehicle comprising:
a plurality of ground engaging members;
a frame assembly supported by the plurality of ground engaging members, the frame assembly including a front frame assembly, a middle frame assembly, and a rear frame assembly;
  a first rear suspension having a first suspension arm moveably coupled to the frame assembly and a second suspension arm moveably coupled to the frame assembly independent of the first suspension arm, the first suspension coupling a first ground engaging member of the plurality of ground engaging members to the frame assembly;
a seating area supported by the middle frame assembly;
a roll cage extending over the seating area;
a cargo box coupled to the frame assembly;
electric powertrain components supported by the frame assembly, the electric powertrain components including an electric motor and a drive train operative to provide power from the electric motor to at least one ground engaging member; and
a shrouding assembly coupled to the rear frame assembly, the shrouding assembly including a top portion extending across a top of the electric powertrain components and across a longitudinal centerline of the electric vehicle and a first side portion extending downward from the top portion, wherein the top portion includes an air conduit formed on a lower side and a fan positioned to move air through the air conduit.

8. The electric vehicle of claim 7, wherein the first side portion is completely forward of a first connection of the first suspension arm to the frame assembly.

9. An electric vehicle comprising:
a plurality of ground engaging members;
a frame assembly supported by the plurality of ground engaging members, the frame assembly including a front frame assembly, a middle frame assembly, and a rear frame assembly;
a seating area supported by the middle frame assembly;
a cargo bed supported by the rear frame assembly; and
an electric powertrain supported by the frame assembly, the electric powertrain including:
  one or more batteries positioned under the seating area;
  a unit mounted to the frame assembly through a plurality of mounts, the unit including:
    at least one frame member;
    an electric motor electrically coupled to the one or more batteries and coupled to the at least one frame member;
    a transmission coupled to the at least one frame member; and
    a flexible endless coupler operatively coupling an output of the electric motor to an input of the transmission;
  a driveshaft operative to provide power from the transmission to at least one ground engaging member; and
a shrouding assembly coupled to the frame assembly, wherein the shrouding assembly includes a top shroud member extending across a top of the unit and the top shroud member includes an air conduit formed on a lower side and a fan positioned to move air through the air conduit.

10. The electric vehicle of claim 9, wherein the electric motor is carried by a cradle which is rotatably coupled to the at least one frame member.

11. The electric vehicle of claim 9, wherein the unit includes at least one tensioner which rotates the electric motor away from the transmission to increase a tension on the flexible endless connector.

12. The electric vehicle of claim 9, wherein the top shroud member and the electric motor cooperate to form a second air conduit over a top of the electric motor.

13. The electric vehicle of claim 12, wherein air passing through the second air conduit enters the air conduit of the top shroud member.

14. The electric vehicle of claim 9, wherein the unit further comprises a motor controller operatively coupled to the electric motor and a cooling system to regulate a temperature of the electric motor.

15. The electric vehicle of claim 14, wherein the cooling system is air cooled.

16. The electric vehicle of claim 14, wherein the cooling system is liquid cooled.

17. The electric vehicle of claim 16, wherein the cooling system includes a radiator positioned rearward of the fan of the top shroud member.

18. The electric vehicle of claim 9, further comprising:
a light bar supported by the frame assembly, the light bar including a plurality of individually controllable zones including a first central zone, a second zone having a first second zone section on a first side of the first central zone and a second zone section on a second side of the first central zone, and a third zone having a first third zone section on the first side of the first central zone and a second third zone section on the second side of the first central zone; and
a lighting controller operatively coupled to each of the first central zone, the second zone, and the third zone of the light bar, the lighting controller controls at least one illumination characteristic of each of the first central zone, the second zone, and the third zone of the light bar to indicate a charging status of the one or more batteries of electric powertrain.

19. The electric vehicle of claim 9, further comprising a cable holder coupled to the at least one frame member, and a plurality of cables operably coupled to the one or more batteries and positioned within the cable holder.

\* \* \* \* \*